(12) United States Patent
Chun et al.

(10) Patent No.: US 10,128,925 B2
(45) Date of Patent: Nov. 13, 2018

(54) METHOD FOR UPLINK MULTI-USER TRANSMISSION IN WIRELESS COMMUNICATION SYSTEM AND APPARATUS THEREFOR

(71) Applicant: LG ELECTRONICS INC., Seoul (KR)

(72) Inventors: Jinyoung Chun, Seoul (KR); Kiseon Ryu, Seoul (KR); Wookbong Lee, Seoul (KR); Jinsoo Choi, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/505,561

(22) PCT Filed: Aug. 24, 2015

(86) PCT No.: PCT/KR2015/008845
§ 371 (c)(1),
(2) Date: Feb. 21, 2017

(87) PCT Pub. No.: WO2016/028131
PCT Pub. Date: Feb. 25, 2016

(65) Prior Publication Data
US 2017/0272138 A1 Sep. 21, 2017

Related U.S. Application Data

(60) Provisional application No. 62/120,883, filed on Feb. 26, 2015, provisional application No. 62/049,368, (Continued)

(51) Int. Cl.
*H04B 7/02* (2018.01)
*H04B 7/06* (2006.01)
(Continued)

(52) U.S. Cl.
CPC ......... *H04B 7/0613* (2013.01); *H04B 7/0452* (2013.01); *H04L 1/0643* (2013.01); *H04L 69/323* (2013.01); *H04W 74/006* (2013.01)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS

| 2013/0286959 A1 | 10/2013 | Lou et al. |
| 2014/0192788 A1 | 7/2014 | Park et al. |

(Continued)

FOREIGN PATENT DOCUMENTS

| WO | 2011108832 | 9/2011 |
| WO | 2013115629 | 8/2013 |
| WO | 2013129861 | 9/2013 |

OTHER PUBLICATIONS

PCT International Application No. PCT/KR2015/008845, International Search Report dated Dec. 10, 2015, 2 pages.

*Primary Examiner* — Zewdu Kassa
(74) *Attorney, Agent, or Firm* — Lee Hong Degerman Kang Waimey

(57) ABSTRACT

In the present invention, disclosed is a method for uplink multi-user transmission in a wireless communication system and an apparatus therefor. Specifically, a method for performing, by a station (STA), uplink (UL) multi-user (MU) transmission in a wireless communication system comprises the steps of: receiving, from an access point (AP), a trigger frame including information for UL MU transmission; and transmitting an UL MU PPDU on the basis of the information for UL MU transmission, wherein the trigger frame is a medium access control (MAC) frame, a MAC header of the trigger frame includes a type field and a subtype field,
(Continued)

and the type of the trigger frame may be indicated by the type field and the subtype field.

13 Claims, 26 Drawing Sheets

Related U.S. Application Data filed on Sep. 12, 2014, provisional application No. 62/040,431, filed on Aug. 22, 2014.

(51) Int. Cl.
*H04B 7/0452* (2017.01)
*H04L 29/08* (2006.01)
*H04W 74/00* (2009.01)
*H04L 1/06* (2006.01)

(58) Field of Classification Search
CPC ............ H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ................ 375/267, 260, 259, 316, 219, 295
See application file for complete search history.

(56) References Cited

U.S. PATENT DOCUMENTS

2016/0029373 A1* 1/2016 Seok ..................... H04L 5/0055
                                                                     370/338
2017/0126293 A1* 5/2017 Chen ..................... H04B 7/0452

\* cited by examiner

[FIG. 1]
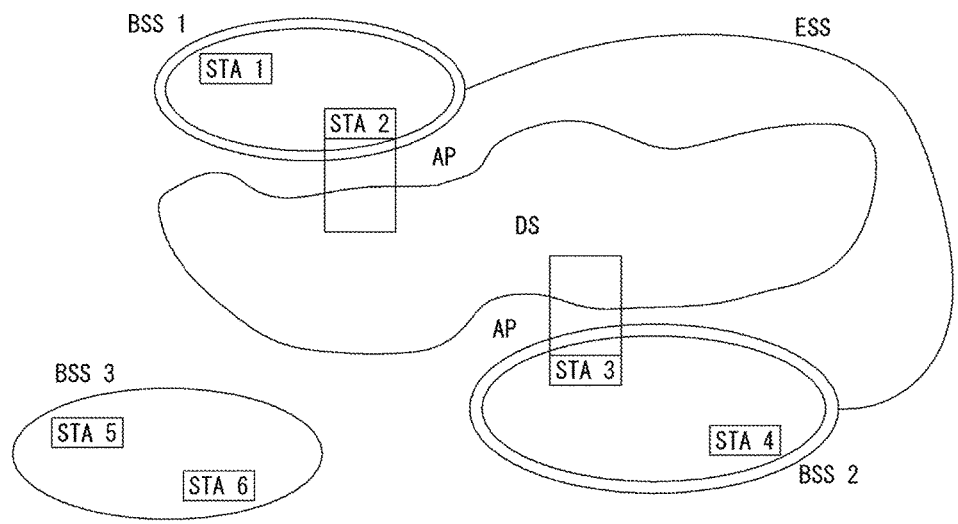

[FIG. 2]
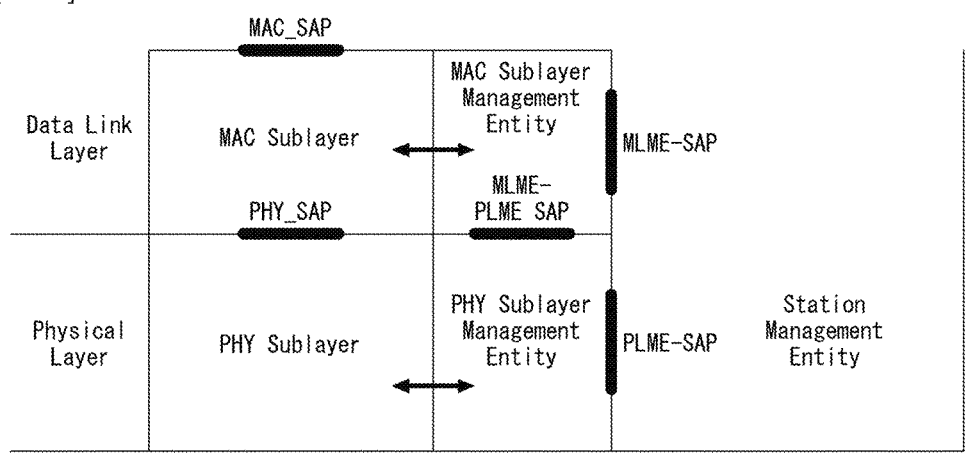

[FIG. 3]
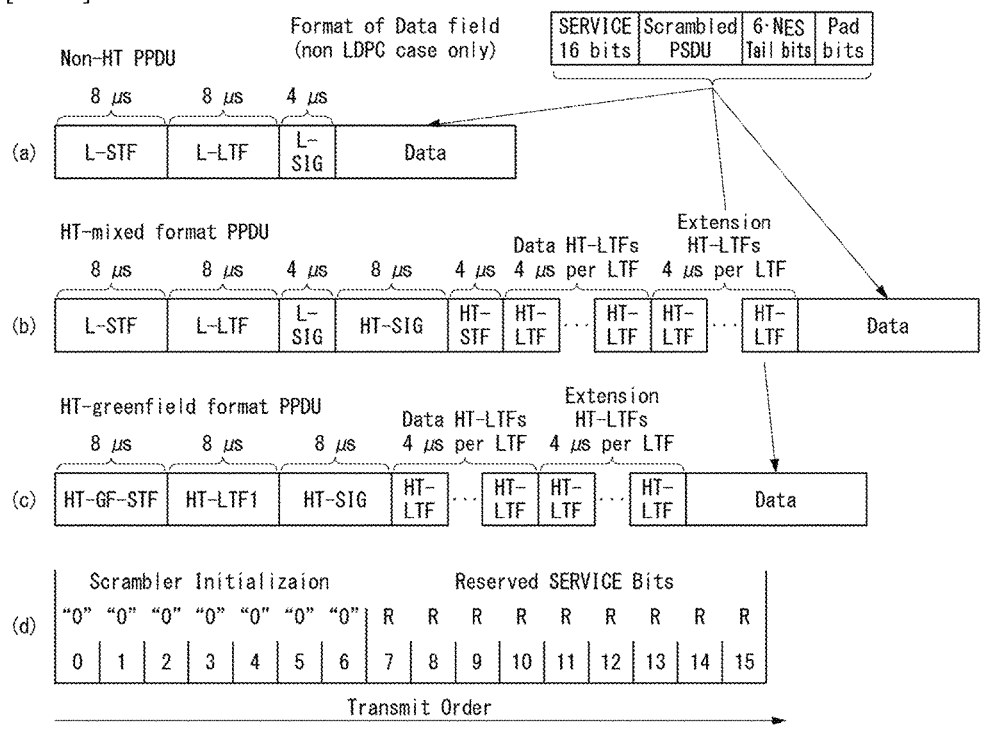

[FIG. 4]
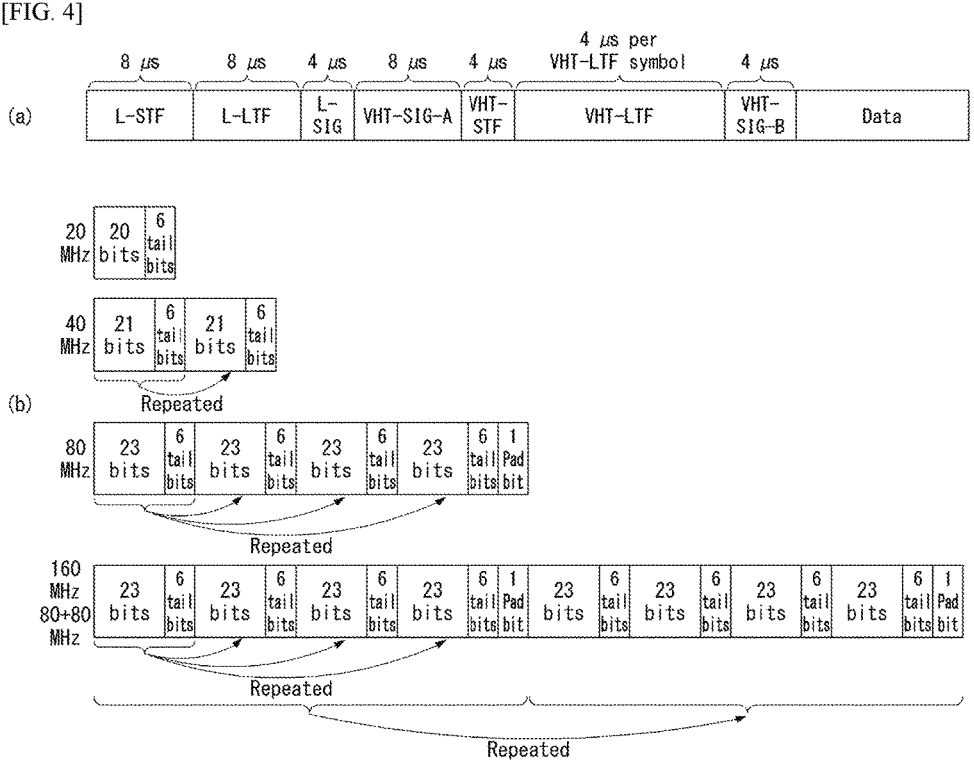

[FIG. 5]
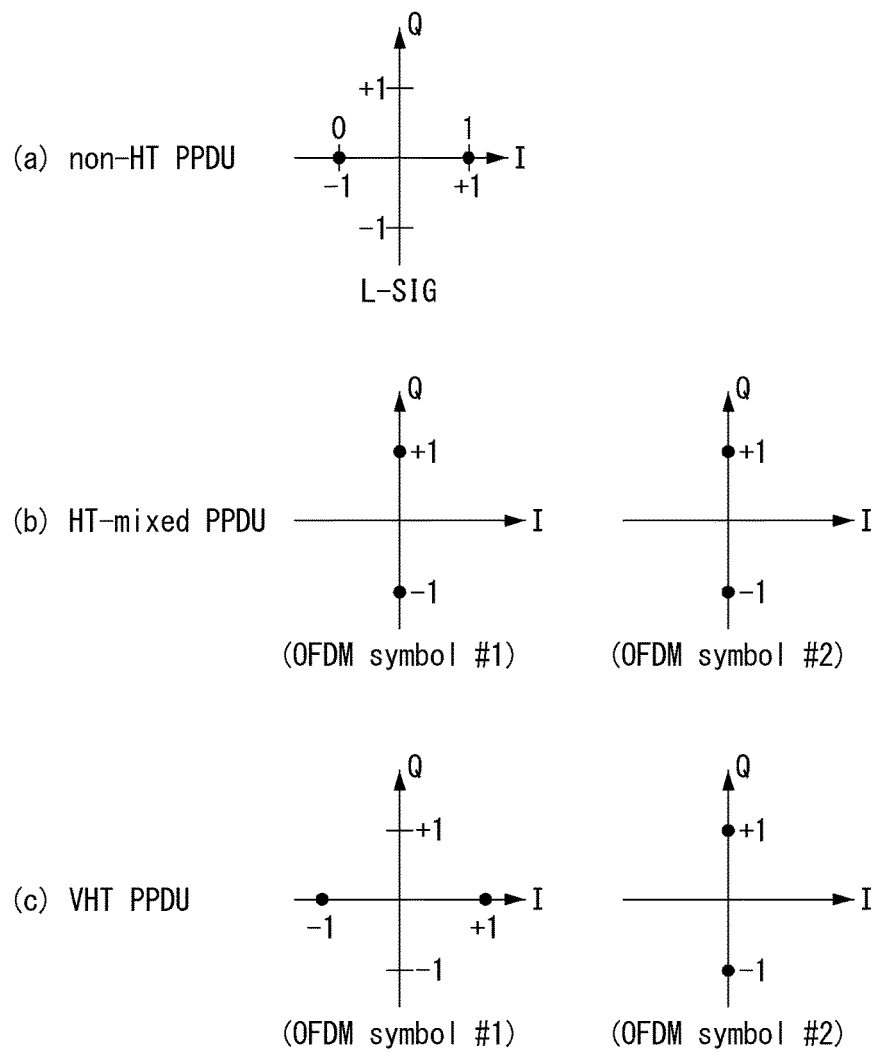

[FIG. 6]
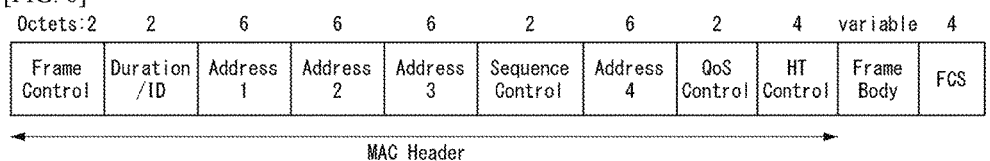
[FIG. 7]
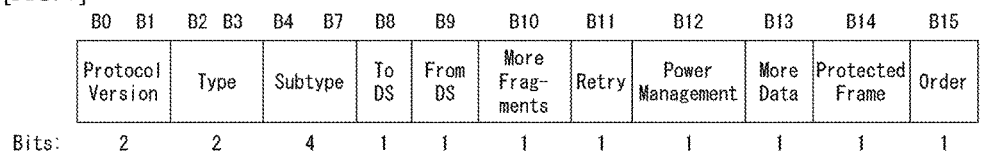
[FIG. 8]
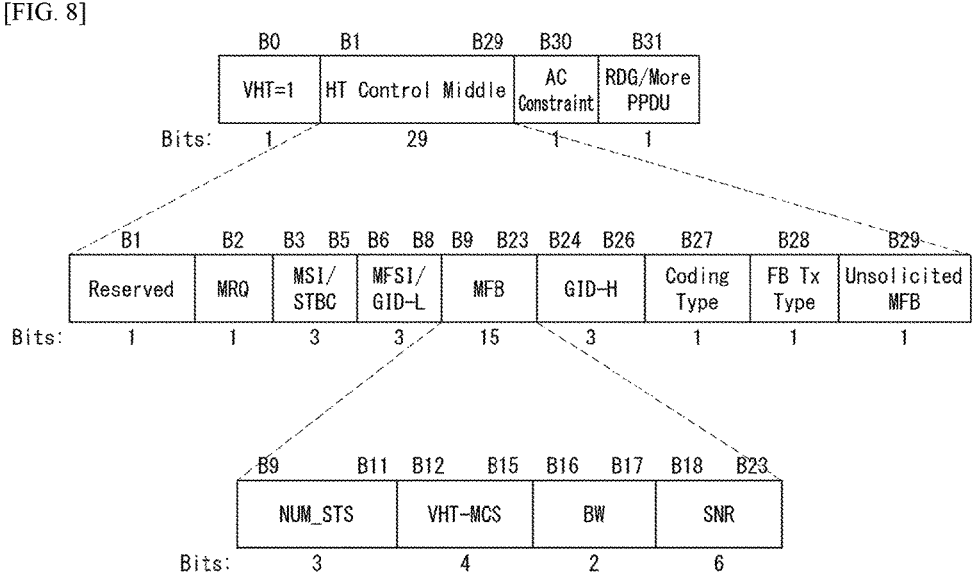

[FIG. 9]
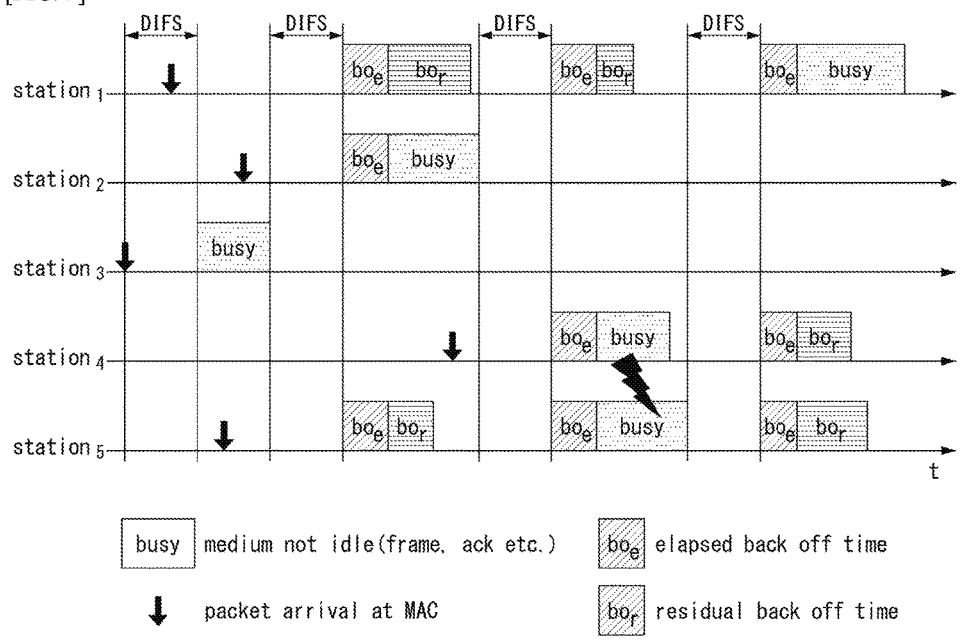

[FIG. 10]
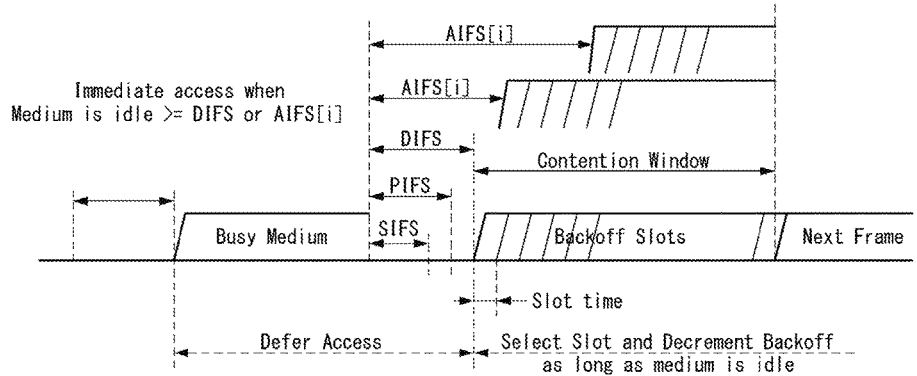
[FIG. 11]
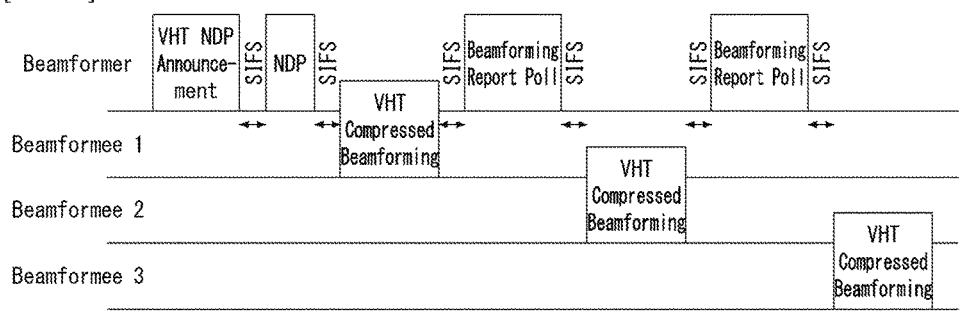
[FIG. 12]
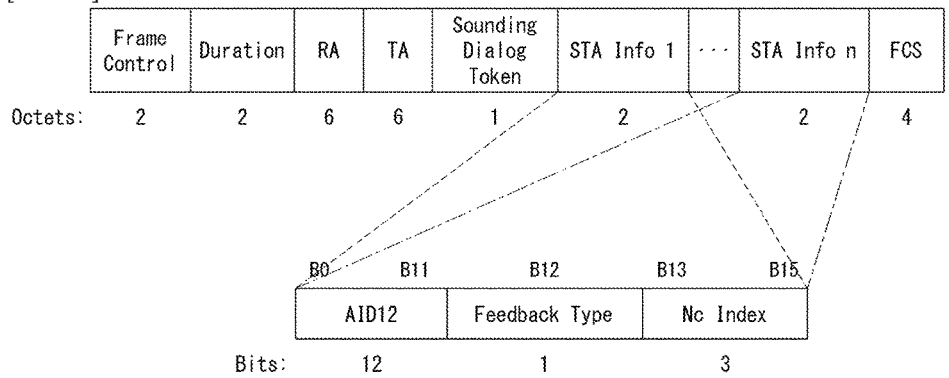

[FIG. 13]
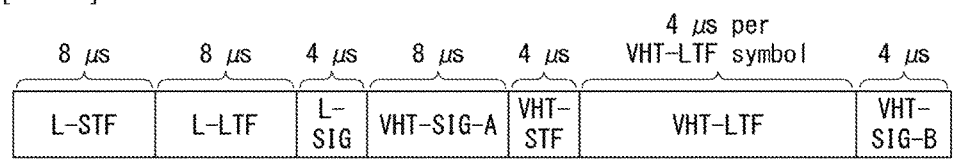
[FIG. 14]
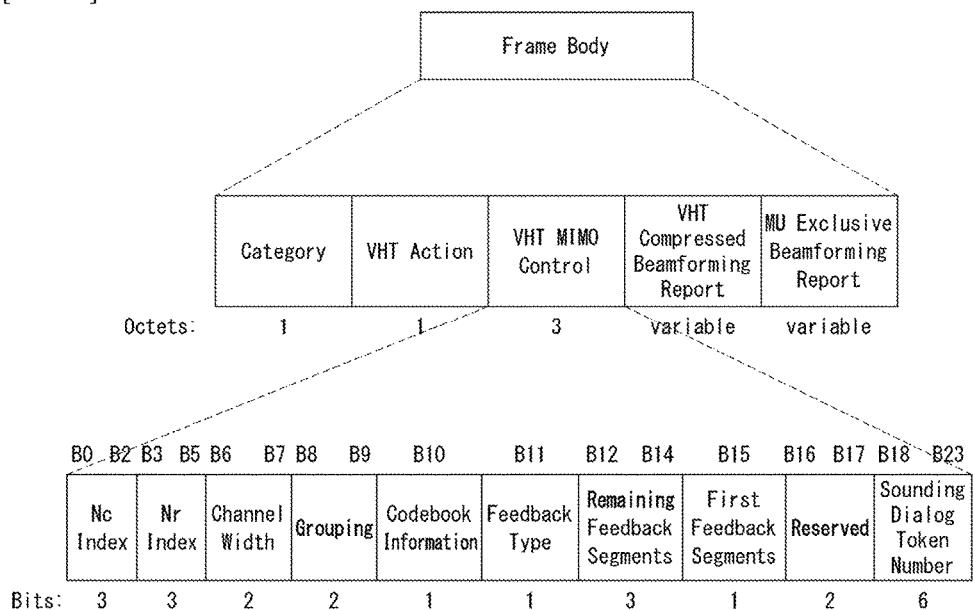

[FIG. 15]
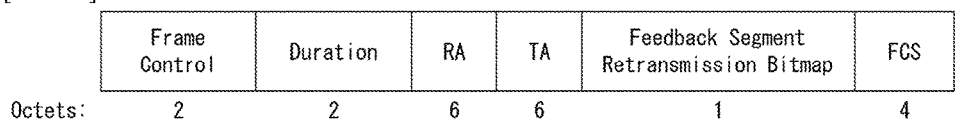
[FIG. 16]
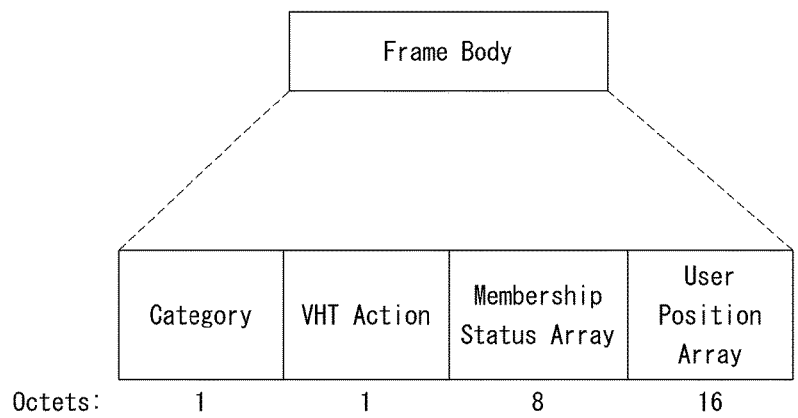

[FIG. 17]
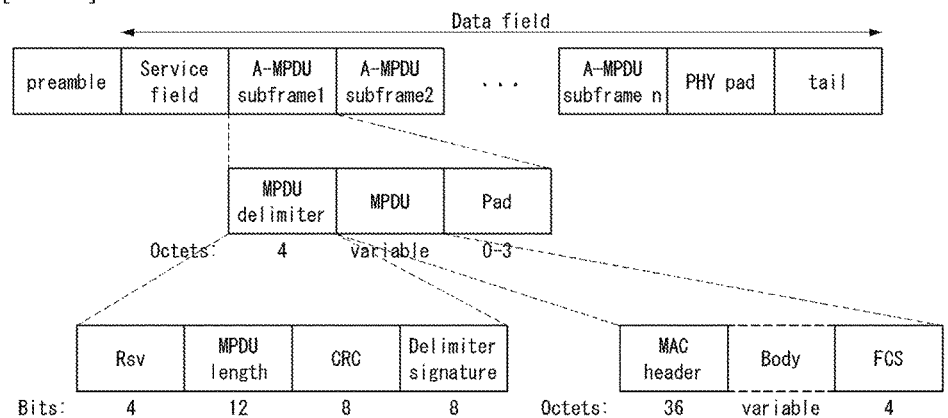
[FIG. 18]
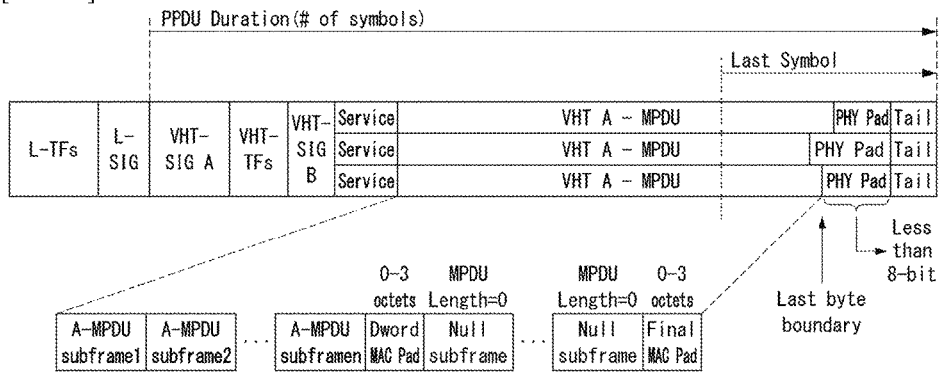

[FIG. 19]
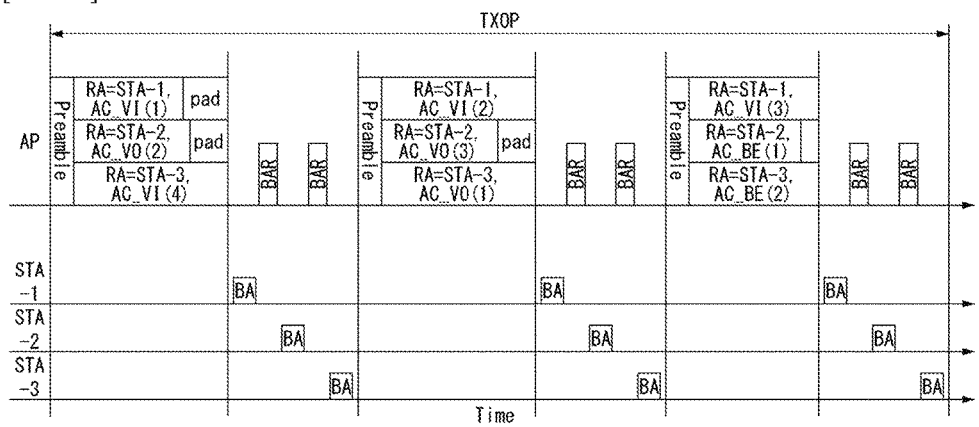
[FIG. 20]
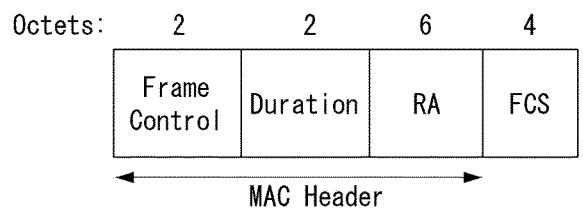

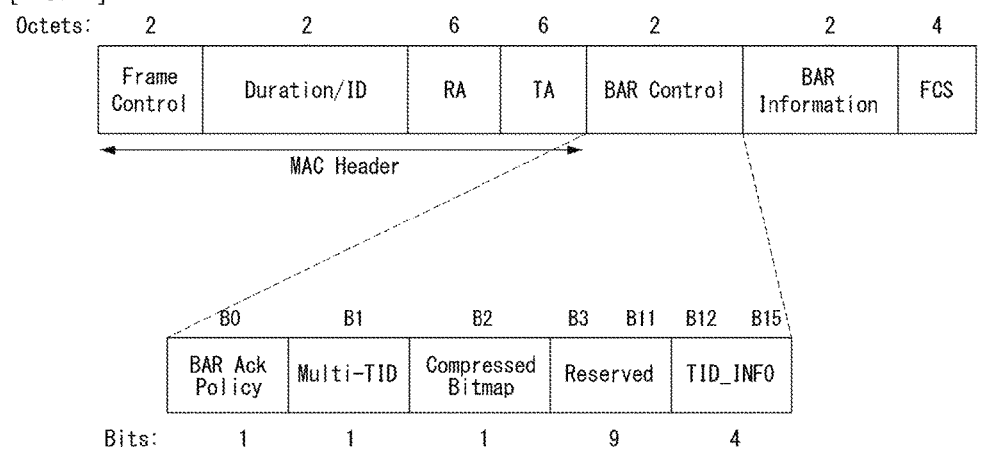
[FIG. 21]

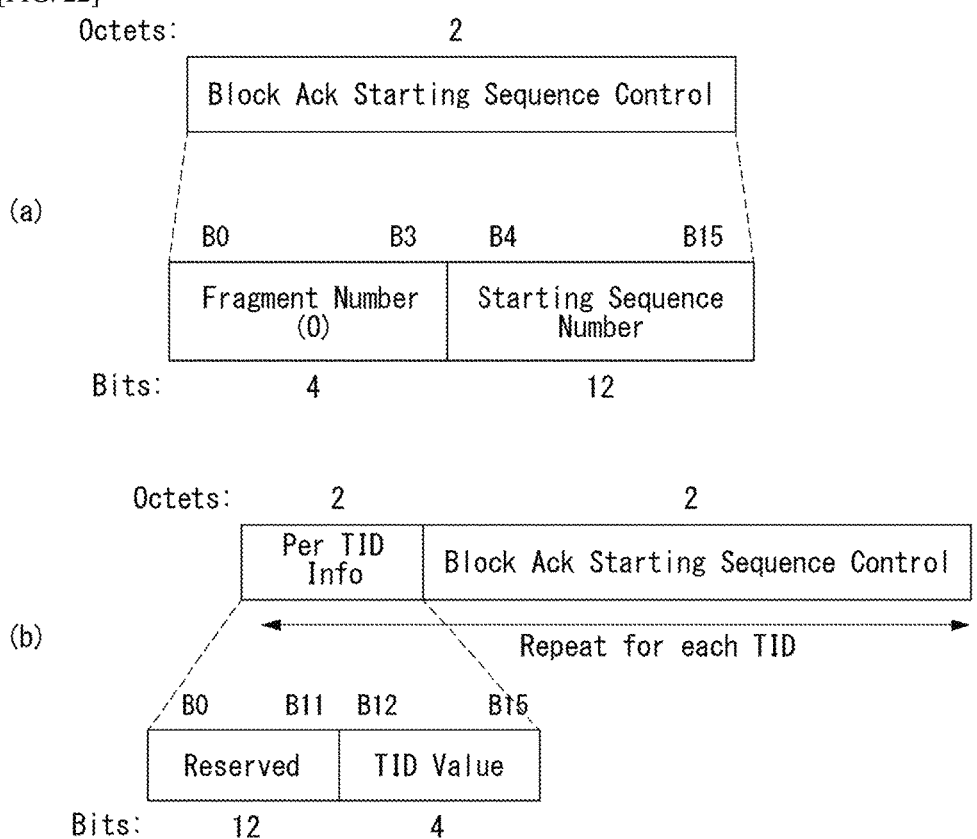
[FIG. 22]

[FIG. 23]
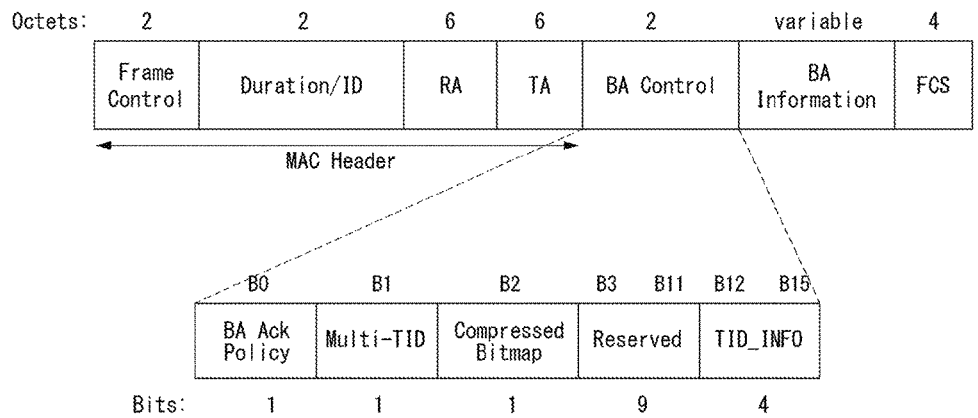
[FIG. 24]
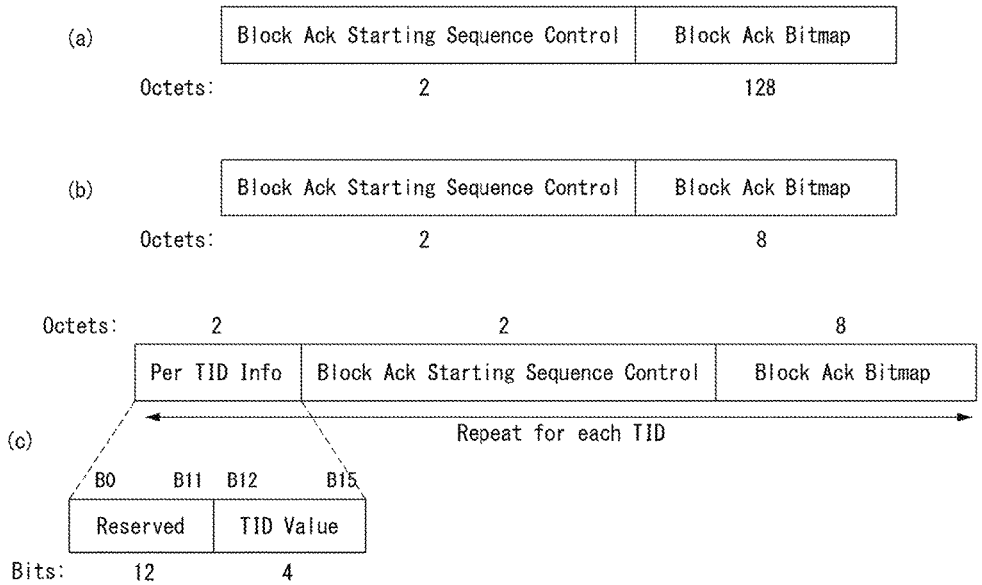

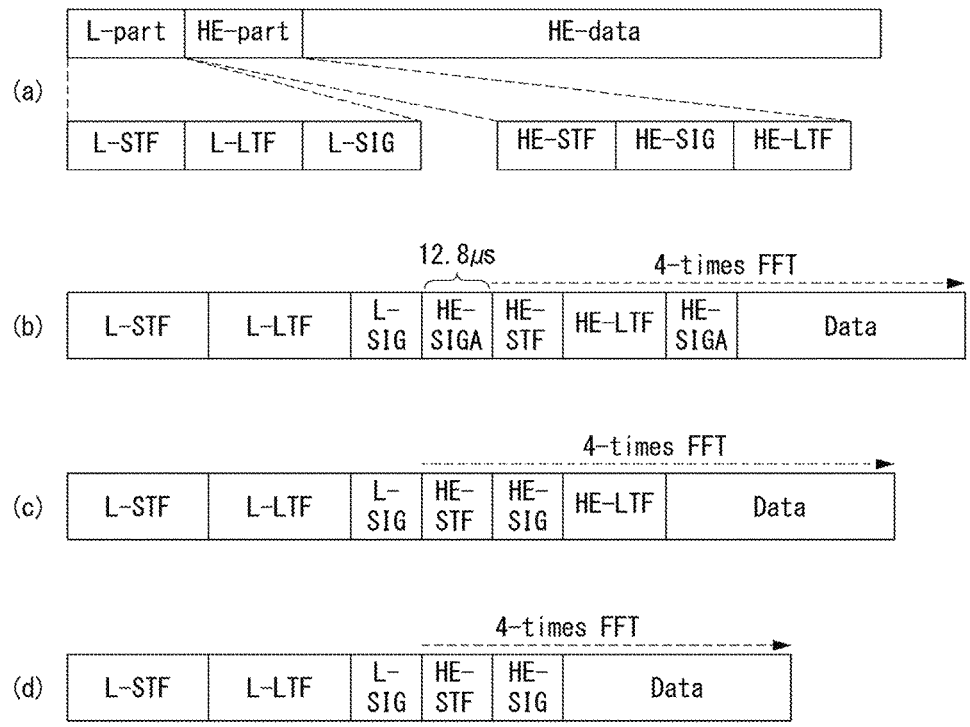

[FIG. 27]

| L-STF | L-LTF | L-SIG | HE-SIG A |          | HE-STF | HE-LTF | Data for STA1 |
|-------|-------|-------|----------|----------|--------|--------|---------------|
| L-STF | L-LTF | L-SIG | HE-SIG A |          | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A |          | HE-STF | HE-LTF | Data for STA4 |

[FIG. 28]

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[FIG. 29]
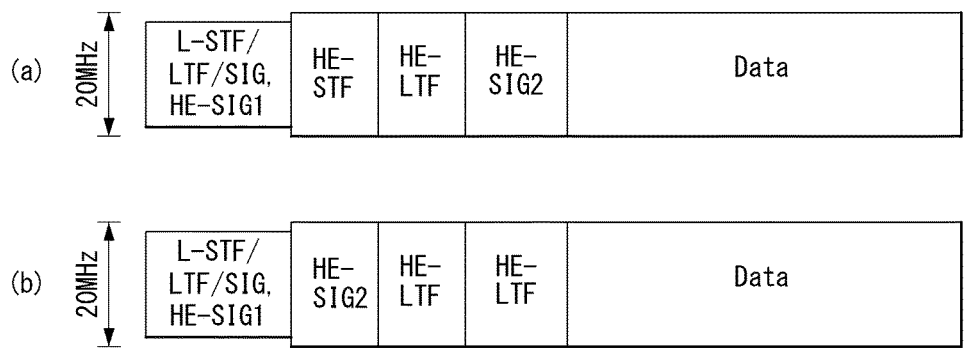
[FIG. 30]
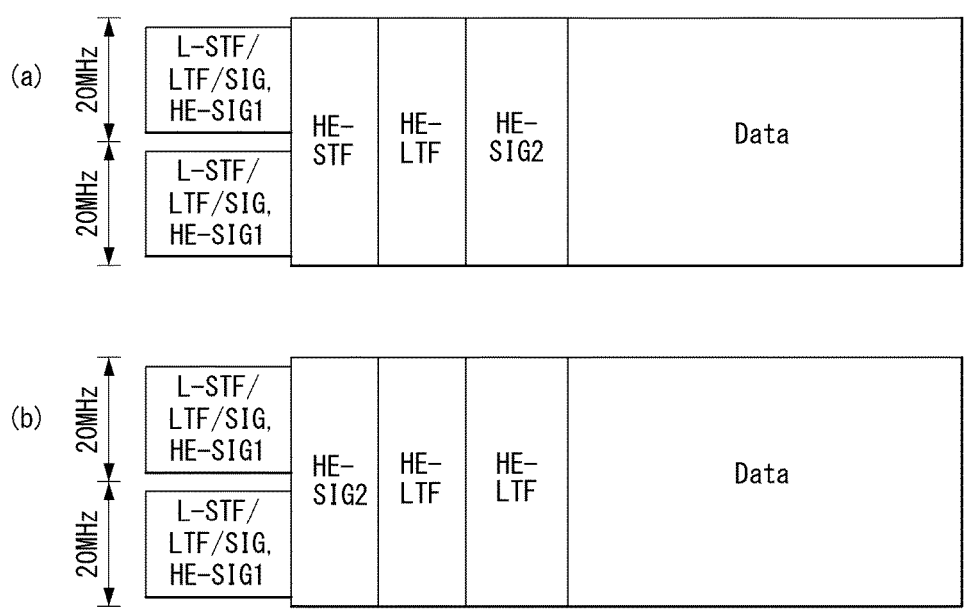

[FIG. 31]
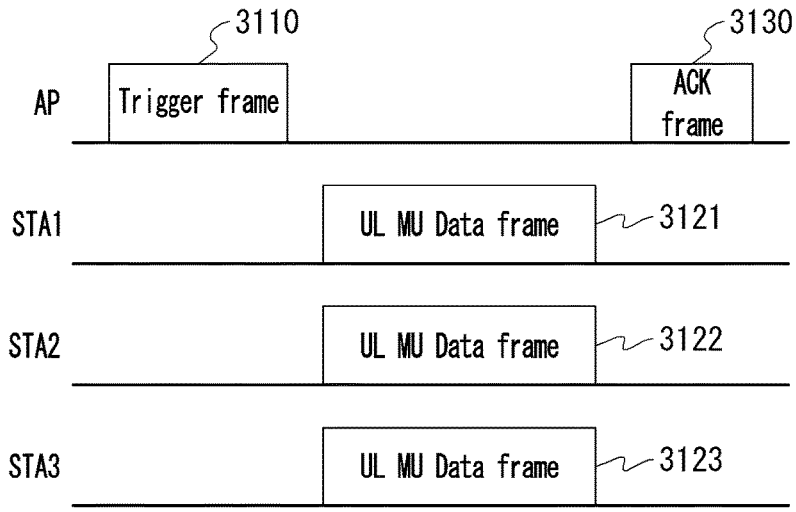
[FIG. 32]
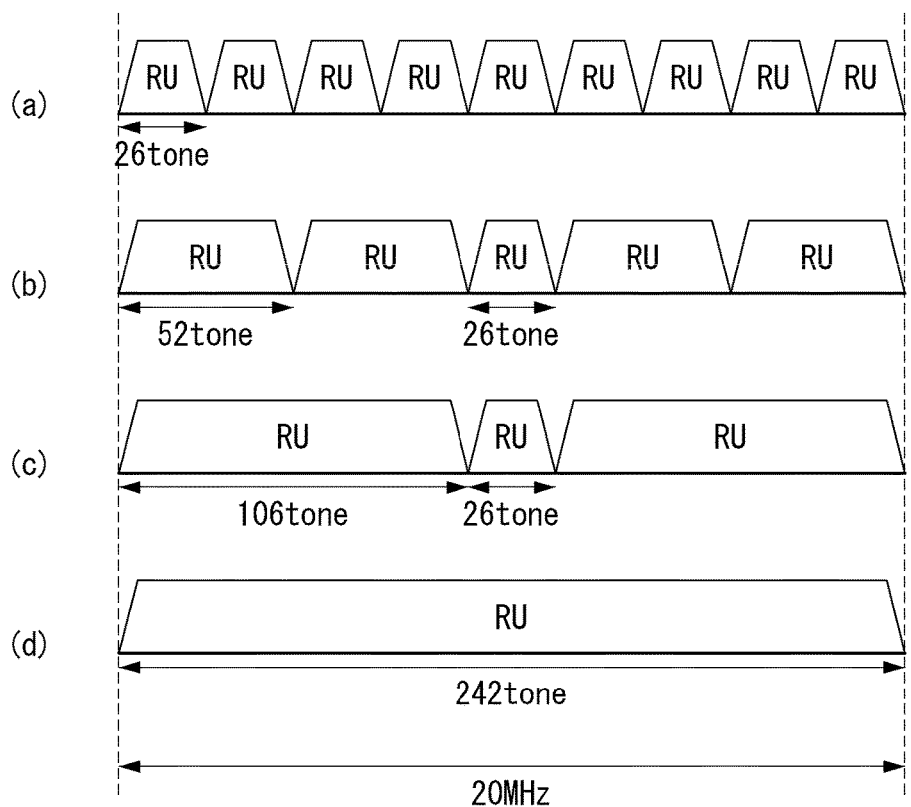

[FIG. 33]
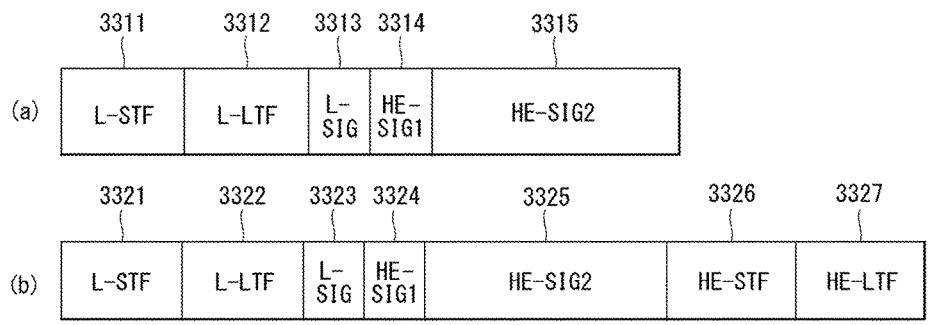
[FIG. 34]
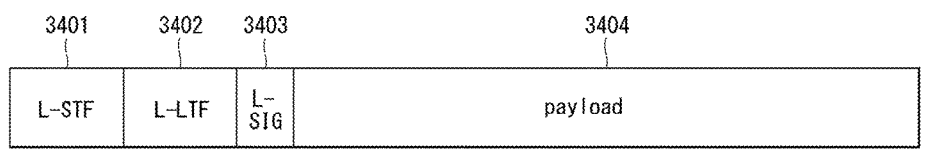
[FIG. 35]
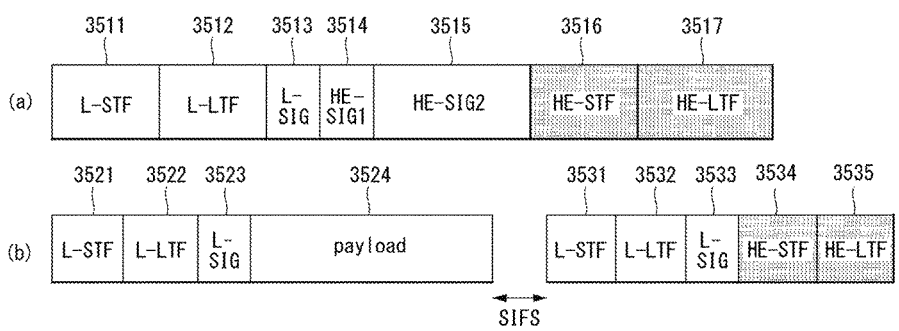

[FIG. 36]
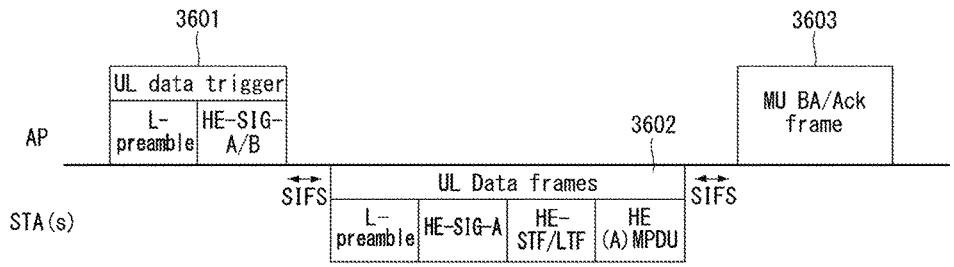
[FIG. 37]
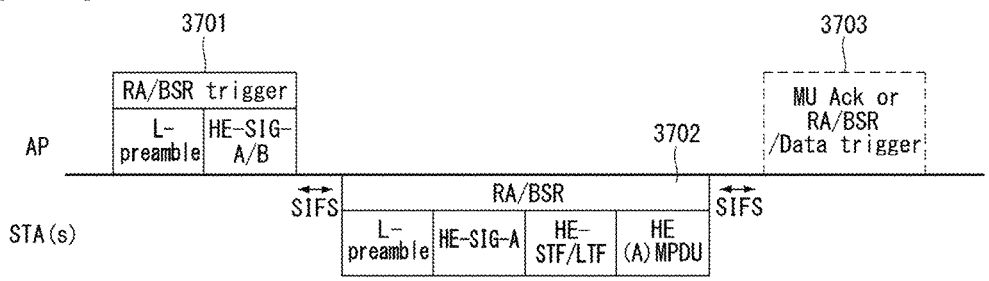
[FIG. 38]
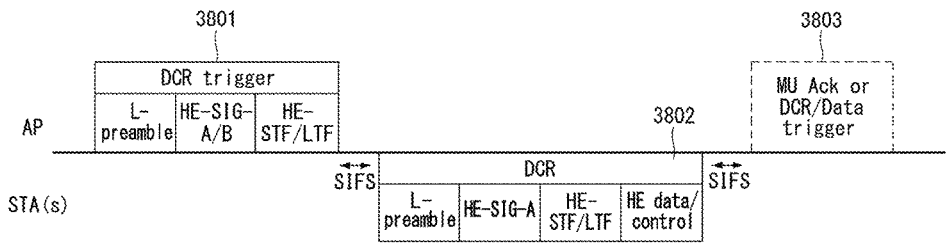

[FIG. 39]
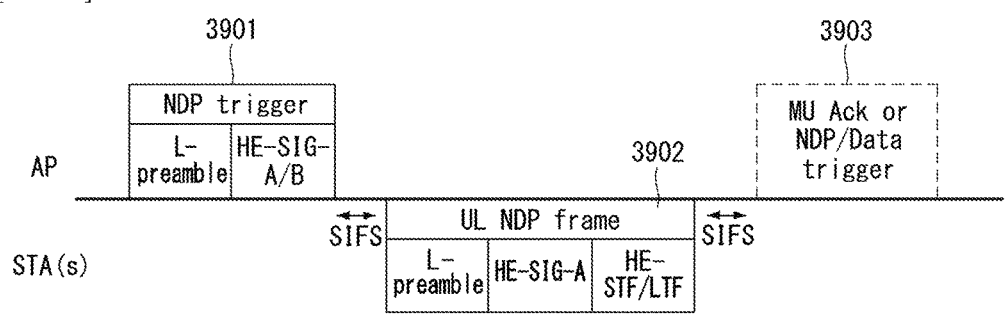
[FIG. 40]
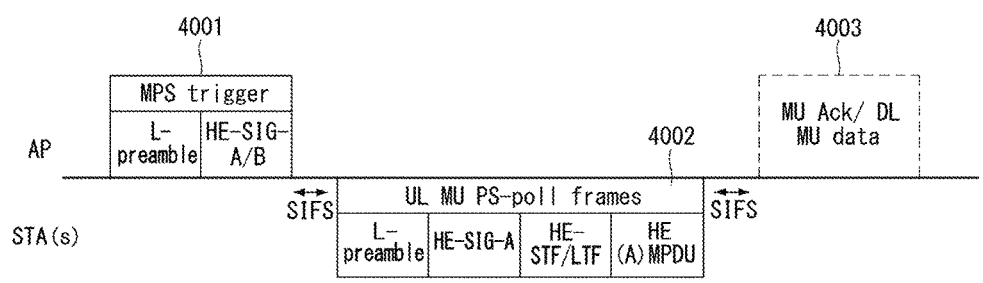

[FIG. 41]
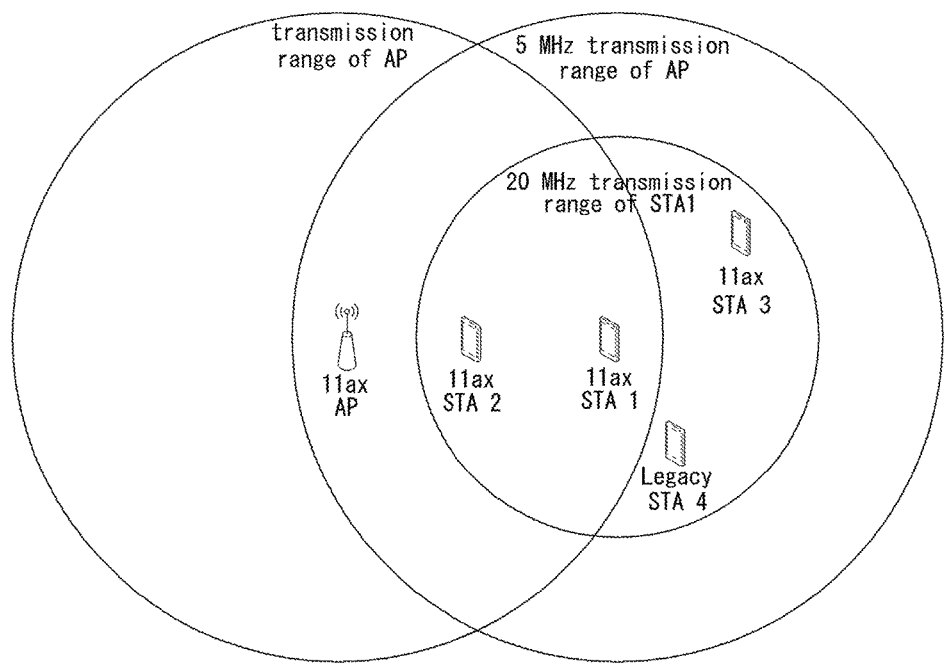

[FIG. 42]
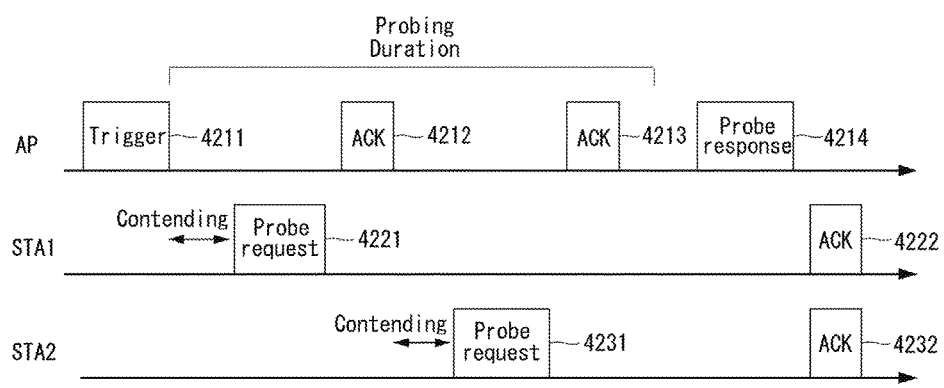
[FIG. 43]
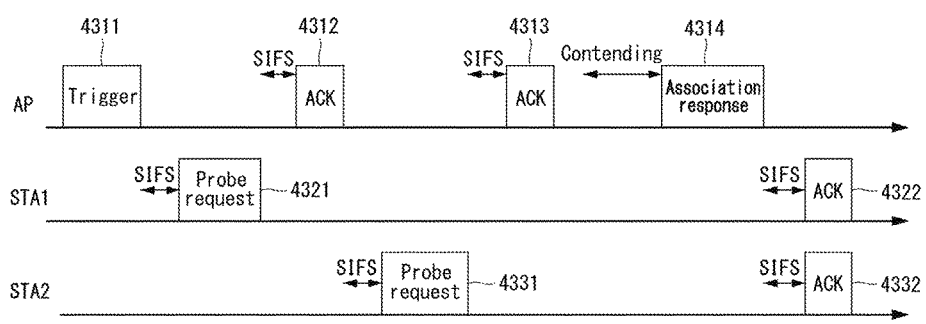

[FIG. 44]
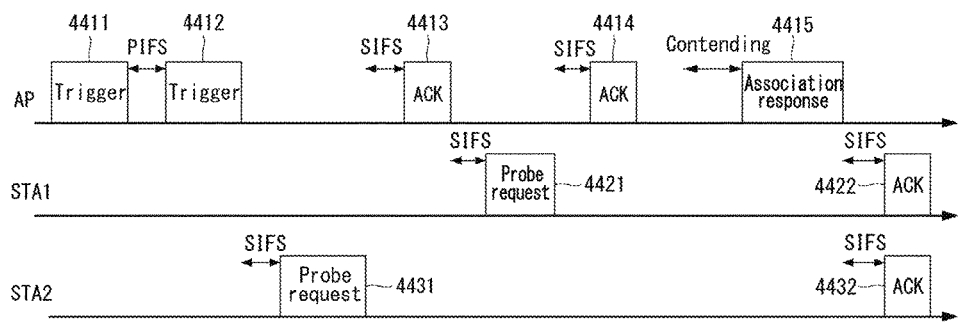
[FIG. 45]
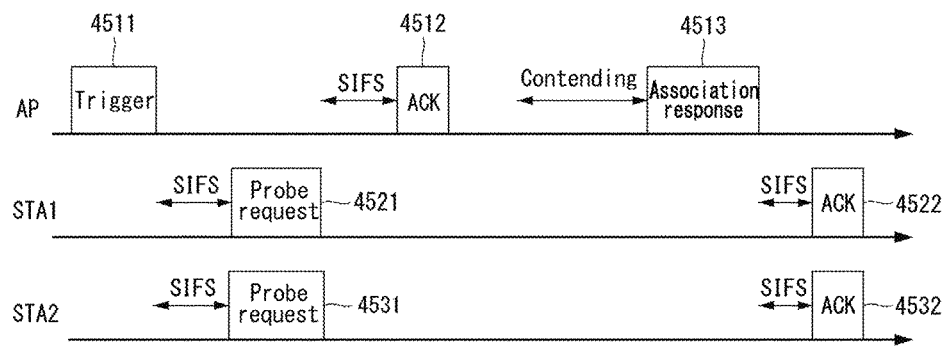

[FIG. 46]
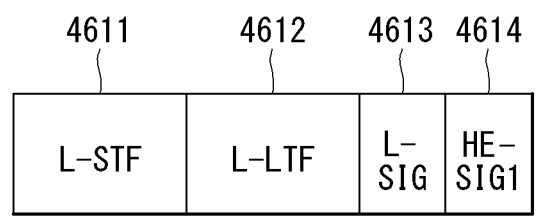
[FIG. 47]
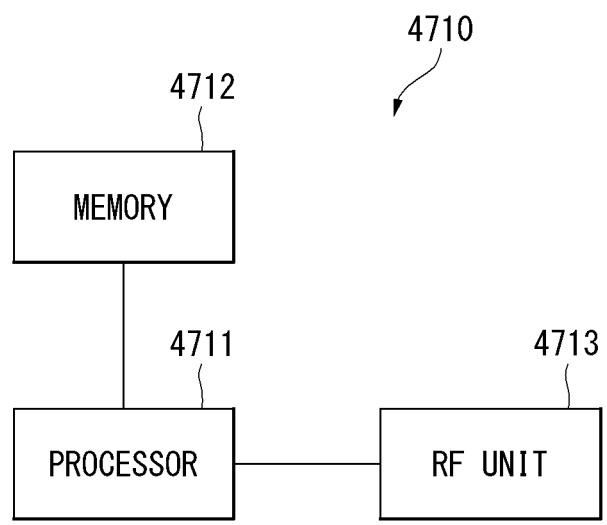

METHOD FOR UPLINK MULTI-USER TRANSMISSION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/008845, filed on Aug. 24, 2015, which claims the benefit of U.S. Provisional Application No. 62/040,431, filed on Aug. 22, 2014, 62/049,368, filed on Sep. 12, 2014 and 62/120,883 filed on Feb. 26, 2015, the contents of which are all hereby incorporated by reference herein in their entirety.

TECHNICAL FIELD

The present invention relates to a wireless communication system, and more particularly, to a method for performing or supporting uplink multi-user transmission and an apparatus for supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DETAILED DESCRIPTION OF INVENTION

Technical Problem

An object of the present invention is to propose an uplink multi-user transmission procedure in a wireless communication system.

Further, an object of the present invention is to propose a type a trigger frame for supporting various uplink multi-user transmission in a wireless communication system and the resulting structure of the trigger frame.

The objects of the present invention are not limited to the technical objects described above, and other technical objects not mentioned herein may be understood to those skilled in the art from the description below.

Technical Solution

According to an aspect of the present invention, a method for performing uplink (UL) multi-user (MU) transmission by a station (STA) in a wireless communication system, includes: receiving a trigger frame including information for UL MU transmission from an access point (AP); and transmitting a UL MU PPDU based on the information for the UL MU transmission, wherein the trigger frame is a medium access control (MAC) frame, an MAC header of the trigger frame includes a type field and a subtype field, and the type of the trigger frame is indicated by the type field and the subtype field.

According to another aspect of the present invention, a station (STA) apparatus for performing uplink (UL) multi-user (MU) transmission in a wireless communication system, includes: a radio frequency (RF) unit for transmitting/receiving a wireless signal; and a processor, wherein the processor is configured to receive a trigger frame including information for UL MU transmission from an access point (AP), and transmit a UL MU PPDU based on the information for the UL MU transmission, the trigger frame is a medium access control (MAC) frame, an MAC header of the trigger frame includes a type field and a subtype field, and the type of the trigger frame is indicated by the type field and the subtype field.

According to yet another aspect of the present invention, a method for supporting uplink (UL) multi-user (MU) transmission by an access point (AP) in a wireless communication system, includes: transmitting a trigger frame including information for UL MU transmission to a station (STA); and receiving a UL MU PPDU based on the information for the UL MU transmission, wherein the trigger frame is a medium access control (MAC) frame, an MAC header of the trigger frame includes a type field and a subtype field, and the type of the trigger frame is indicated by the type field and the subtype field.

According to still yet another aspect of the present invention, an access point (AP) apparatus for supporting uplink (UL) multi-user (MU) transmission in a wireless communication system, includes: a radio frequency (RF) unit for transmitting/receiving a wireless signal; and a processor, wherein the processor is configured to transmit a trigger frame including information for UL MU transmission to a station (STA), and receive a UL MU PPDU based on the information for the UL MU transmission, the trigger frame is a medium access control (MAC) frame, an MAC header of the trigger frame includes a type field and a subtype field, and the type of the trigger frame is indicated by the type field and the subtype field.

Preferably, when the trigger frame is a type for triggering transmission of a UL MU data frame, the trigger frame may include an association identifier (AID), space resource indication information for the UL MU PPDU, frequency resource indication information for the UL MU PPDU, and length information of the UL MU PPDU for each of STA performing the UL MU transmission.

Preferably, the trigger frame may further include a modulation and coding scheme (MCS) level index and whether space time block coding (STBC) are applied to the UL MU PPDU.

Preferably, when the trigger frame is a type for triggering transmission of a downlink (DL) channel status report frame, the trigger frame may include the association identifier (AID), the space resource indication information for the UL MU PPDU, the frequency resource indication information for the UL MU PPDU, and information for measuring a DL channel for each STA performing the UL MU transmission.

Preferably, null data packet (NDP) for measuring the DL channel may be received from the AP.

Preferably, the information for measuring the DL channel may include the position of a channel to be measured and a channel measurement reporting method, the position of the channel to be measured may indicate a spatial stream and a frequency region which are a channel measurement object, and the channel measurement reporting method may indicate the unit of the frequency region for reporting a result of measuring the channel.

Preferably, the trigger frame may further include information indicating whether a modulation and coding scheme (MCS) level index and space time block coding (STBC) are applied to the UL MU PPDU and length information of the UL MU PPDU.

Preferably, when the trigger frame is a type for triggering transmission of a random access frame, a probe request frame, or a buffer status report (BSR) frame, the trigger frame may include a broadcast association identifier (AID).

Preferably, the trigger frame may further include transmission resource unit information of the UL MU PPDU.

Preferably, the UL MU PPDU may be transmitted through a transmission resource which the STA arbitrarily selects according to the transmission resource unit information.

Preferably, the trigger frame may further include the information indicating whether the modulation and coding scheme (MCS) level index and the space time block coding (STBC) are applied to the UL MU PPDU, transmittable frequency resource indication information of the UL MU PPDU, and the length information of the UL MU PPDU.

Preferably, when the trigger frame is a type for triggering transmission of a control frame, the trigger frame may include the association identifier (AID), space resource indication information for the UL MU PPDU, and frequency resource indication information for the UL MU PPDU for each STA performing the UL MU transmission.

Preferably, the trigger frame may further include the information indicating whether the modulation and coding scheme (MCS) level index and the space time block coding (STBC) are applied to the UL MU PPDU and control type information for distinguishing the control frame.

Advantageous Effects

According to embodiments of the present invention, a plurality of users can smoothly perform/support uplink multi-user transmission through different independent resources in a wireless communication system.

Further, according to the embodiments of the present invention, various types of uplink multi-user transmission can be performed/supported using various types of trigger frames in the wireless communication system.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is a diagram illustrating an example of IEEE 802.11 system to which the present invention may be applied.

FIG. 2 is a diagram exemplifying a structure of layer architecture in IEEE 802.11 system to which the present invention may be applied.

FIG. 3 exemplifies a non-HT format PPDU and an HT format PPDU of a wireless communication system to which the present invention may be applied.

FIG. 4 exemplifies a VHT format PPDU of a wireless communication system to which the present invention may be applied.

FIG. 5 is a diagram exemplifying a constellation for distinguishing a format of PPDU in a wireless communication system to which the present invention may be applied.

FIG. 6 exemplifies a MAC frame format in IEEE 802.11 system to which the present invention may be applied.

FIG. 7 is a diagram illustrating a frame control field in an MAC frame in the wireless communication system to which the present invention may be applied.

FIG. 8 is a view illustrating a VHT format of an HT control field in a wireless communication system to which the present invention is applicable.

FIG. 9 is a diagram illustrating a random backoff period and a frame transmission procedure in a wireless communication system to which an embodiment of the present invention may be applied.

FIG. 10 is a diagram illustrating an IFS relation in a wireless communication system to which an embodiment of the present invention may be applied.

FIG. 11 is a diagram for conceptually describing a channel sounding method in the wireless communication system to which the present invention can be applied.

FIG. 12 is a diagram illustrating a VHT NDPA frame in the wireless communication system to which the present invention may be applied.

FIG. 13 is a diagram illustrating an NDP PPDU in the wireless communication system to which the present invention may be applied.

FIG. 14 is a diagram illustrating a VHT compressed beamforming frame format in the wireless communication system to which the present invention may be applied.

FIG. 15 is a diagram illustrating a beamforming report poll frame format in the wireless communication system to which the present invention may be applied.

FIG. 16 is a diagram illustrating a Group ID management frame in the wireless communication system to which the present invention may be applied.

FIG. 17 is a view illustrating a downlink (DL) multi-user PPDU format in a wireless communication system to which the present invention is applicable.

FIG. 18 is a view illustrating a DL multi-user PPDU format in a wireless communication system to which the present invention is applicable.

FIG. 19 is a diagram illustrating a downlink MU-MIMO transmission process in the wireless communication system to which the present invention may be applied.

FIG. 20 is a view illustrating an ACK frame in a wireless communication system to which the present invention is applicable.

FIG. 21 is a view illustrating an ACK block request frame in a wireless communication system to which the present invention is applicable.

FIG. 22 is a view illustrating a BAR information field of a block ACK request frame in a wireless communication system to which the present invention is applicable.

FIG. 23 is a view illustrating a block ACK frame in a wireless communication system to which the present invention is applicable.

FIG. 24 is a view illustrating a BA information field of the block ACK frame in a wireless communication system to which the present invention is applicable.

FIG. 25 is diagrams illustrating a high efficiency (HE) format PPDU according to an embodiment of the present invention.

FIGS. 26 to 28 are a diagram illustrating an HE format PPDU according to an embodiment of the present invention.

FIG. 29 is a view illustrating an HE format PPDU of an 20 MHz band according to an embodiment of the present invention.

FIG. 30 is a view illustrating an HE format PPDU of 40 MHz band according to an embodiment of the present invention.

FIG. 31 is a diagram illustrating an uplink multi-user transmission procedure according to an embodiment of the present invention.

FIG. 32 is a view illustrating a resource allocation unit in an OFDMA MU transmission scheme according to an embodiment of the present invention.

FIGS. 33 to 35 are diagrams illustrating the structure of a trigger frame according to an embodiment of the present invention.

FIGS. 36 to 40 are diagrams illustrating a method for uplink multi-user transmission according to an embodiment of the present invention.

FIG. 41 illustrates an 802.11 network environment to which the present invention can be applied.

FIGS. 42 to 45 are diagrams illustrating an active scanning process according to an embodiment of the present invention.

FIG. 46 is a diagram illustrating the structure of a broadcast trigger frame according to an embodiment of the present invention.

FIG. 47 is a block diagram illustrating a wireless apparatus according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Specific terminologies used in the description below may be provided to help the understanding of the present invention. And, the specific terminology may be modified into other forms within the scope of the technical concept of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram exemplifying a structure of layer architecture in IEEE 802.11 system to which the present invention may be applied.

Referring to FIG. 2, the layer architecture in the IEEE 802.11 system may include Medium Access Control (MAC) sublayer/layer and PHY sublayer/layer.

The PHY sublayer may be divided into a Physical Layer Convergence Procedure (PLCP) entity and a Physical Medium Dependent (PMD) entity. In this case, the PLCP entity performs a role of connecting the MAC sublayer and a data frame, and the PMD entity performs a role of wirelessly transmitting and receiving data with two or more STAs.

Both of the MAC sublayer and the PHY sublayer may include management entities, and each of them may be referred to MAC Sublayer Management Entity (MLME) and Physical Sublayer Management Entity (PLME), respectively. These management entities provide a layer management service interface through an operation of layer management function. The MLME may be connected to the PLME, and perform a management operation of MAC sublayer, and similarly, the PLME may be connected to the MLME, and perform a management operation of PHY sublayer.

In order to provide an accurate MAC operation, a Station Management Entity (SME) may be existed in each STA. The SME is a management entity independent from each layer, and collects layer based state information from the MLME and the PLME or configures a specific parameter value of each layer. The SME may perform such a function by substituting general system management entities, and may implement a standard management protocol.

The MLME, the PLME and the SME may interact in various methods based on a primitive. Particularly, XX-GET.request primitive is used for requesting a Management Information Base (MIB) attribute value. XX-GET.confirm primitive returns the corresponding MIB attribute value when the state of it is in 'SUCCESS', otherwise, returns a state field with an error mark. XX-SET.request primitive is used for requesting to configure a designated MIB attribute to a given value. When the MIB attribute signifies a specific operation, the request requests an execution of the specific operation. And, when a state of XX-SET.request primitive is in 'SUCCESS', this means that the designated MIB attribute is configured as the requested value. When the MIB attribute signifies a specific operation, the primitive is able to verify that the corresponding operation is performed.

The operation in each sublayer will be briefly described as follows.

MAC sublayer generates one or more MAC Protocol Data Unit (MPDU) by attaching a MAC header and Frame Check Sequence (FCS) to a MAC Service Data Unit (MSDU) delivered from a higher layer (e.g., LLC layer) or a fragment of the MSDU. The generated MPDU is delivered to PHY sublayer.

When an aggregated MSDU (A-MSDU) scheme is used, a plurality of MSDUs may be merged into one A-MSDU. The MSDU merging operation may be performed in a MAC higher layer. The A-MSDU is delivered to PHY sublayer as a single MPDU (i.e., not being fragmented).

PHY sublayer generates a Physical Protocol Data Unit (PPDU) by attaching an additional field that includes required information to a Physical Service Data Unit (PSDU) received from MAC sublayer by a physical layer transceiver. The PPDU is transmitted through a wireless medium.

Since the PSDU is a unit that PHY sublayer receives from MAC sublayer and MPDU is a unit that MAC sublayer transmits to PHY sublayer, the PSDU is the same as the MPDU, substantially.

When an aggregated MPDU (A-MPDU) scheme is used, a plurality of MPDUs (in this case, each MPDU may carry the A-MPDU) may be merged into a single A-MPDU. The MPDU merging operation may be performed in a MAC lower layer. Various types of MPDU (e.g., QoS data, Acknowledge (ACK), block ACK, etc.) may be merged into the A-MPDU. PHY sublayer receives the A-MPDU from MAC sublayer as a single PSDU. That is, the PSDU includes a plurality of MPDUs. Accordingly, the A-MPDU is transmitted through a wireless medium within a single PPDU.

Physical Protocol Data Unit (PPDU) Format

A Physical Protocol Data Unit (PPDU) signifies a data block which is generated in physical layer. Hereinafter, the PPDU format will be described based on IEEE 802.11 WLAN system to which the present invention may be applied.

FIG. 3 exemplifies a non-HT format PPDU and an HT format PPDU of a wireless communication system to which the present invention may be applied.

FIG. 3(a) exemplifies the non-HT format for supporting IEEE 802.11a/g system. The non-HT PPDU may also be called a legacy PPDU.

Referring to FIG. 3(a), the non-HT format PPDU includes a legacy format preamble that includes a Legacy (or Non-HT) Short Training field (L-STF), a Legacy (or Non-HT) Long Training field (L-LTF) and a Legacy (or Non-HT) SIGNAL (L-SIG) field, and a data field.

The L-STF may include a short training orthogonal frequency division multiplexing (OFDM). The L-STF may be used for frame timing acquisition, Automatic Gain Control (AGC), diversity detection and coarse frequency/time synchronization.

The L-LTF may include a long training orthogonal frequency division multiplexing (OFDM) symbol. The L-LTF may be used for fine frequency/time synchronization and channel estimation.

The L-SIG field may be used for transmitting control information for demodulating and decoding a data field.

The L-SIG field includes a 4-bit Rate field, a 1-bit Reserved bit, a 12-bit Length field, a 1-bit parity bit, and a 6-bit Signal Tail field.

The rate field includes rate information, and the length field indicates the number of octets of the PSDU.

FIG. 3(b) exemplifies an HT-mixed format PPDU for supporting both IEEE 802.11n system and IEEE 802.11a/g system.

Referring to FIG. 3(b), the HT-mixed format PPDU includes an HT format preamble that includes a legacy format preamble including the L-STF, the L-LTF and the L-SIG field, an HT-Signal (HT-SIG) field, an HT Short Training field (HT-STF) and an HT Long Training field (HT-LTF), and a data field.

Since the L-STF, the L-LTF and the L-SIG field signify legacy fields for backward compatibility, the fields from the L-STF to the L-SIG field are identical to those of the non-HT format. The L-STA may interpret a data field through the L-STF, the L-LTF and the L-SIG field even though the L-STA receives a HT-mixed PPDU. However, the L-LTF may further include information for channel estimation such that an HT-STA receives the HT-mixed PPDU and demodulates the L-SIG field and the HT-SIG field.

The HT-STA may notice that the field behind the legacy field is the HT-mixed format PPDU using the HT-SIG field, and based on this, the HT-STA may decode the data field.

The HT-LTF field may be used for channel estimation for demodulating the data field. Since IEEE 802.11n standard supports Single-User Multi-Input and Multi-Output (SU-MIMO), a plurality of the HT-LTF fields may be included for the channel estimation with respect to each data field transmitted via a plurality of spatial streams.

The HT-LTF field may include a data HT-LTF used for channel estimation with respect to spatial stream and an extension HT-LTF additionally used for full channel sounding. Accordingly, the number of a plurality of HT-LTF may be equal to or more than the number of transmitted spatial stream.

In the HT-mixed format PPDU, the L-STF, the L-LTF and the L-SIG field are firstly transmitted such that an L-STA also receives and acquires data. Later, the HT-SIG field is transmitted for demodulating and decoding the data transmitted for the HT-STA.

Up to the HT-SIG field, fields are transmitted without performing beamforming such that the L-STA and the HT-STA receive the corresponding PPDU and acquire data, and wireless signal transmission is performed through precoding for the HT-STF, the HT-LTF and the data field, which are transmitted later. Herein, the plurality of HT-LTF and the data field are transmitted after transmitting the HT-STF such that the STA that receives data through precoding may consider the part in which power is varied by precoding.

Table 1 below illustrates an HT-SIG field.

TABLE 1

| Field | Bit | Description |
| --- | --- | --- |
| Modulation and Coding Scheme) | 7 | It indicates a modulation and coding scheme |
| CBW 20/40 | 1 | It is 0 when higher than 20 MHz or lower than 40 MHz, and 1 in the case of 40 MHz |
| HT (Length) | 16 | It indicates the number of octets of data of PDSU |
| Smoothing | 1 | It is 1 when channel estimation smoothing is recommended, and 0 when channel estimation is recommended by carriers independently (unsmoothing) |
| Not Sounding | 1 | It is 0 when PPDU is sounding PPDU and 1 when PPDU is not sounding PPDU |
| Reserved | 1 | It is set to 1 |
| Aggregation | 1 | It is 1 when PPDU includes A-MPDU and 0 in otherwise case |
| STBC | 2 | It indicates difference between the number of spact-time streams (NSTS) and the number of spatial streams (NSS) indicated by MCS. It is 00 when STBC is not in use |
| FEC coding | 1 | It is 1 when low-density parity check (LDPC) is in use and 0 when binary convolutional code (BCC) is in use |
| Short GI | 1 | It is 1 when short GI is in use after HT training and 0 in otherwise case |
| Number of extension spatial streams | 2 | It indicates the number of extension spatial stream (NESS). It is 0 when there is no NESS, 1 in the case of one NESS, 2 in the case of two NESSs, and 3 in the case of three NESSs |
| CRC | 8 | It includes CRC for detecting error of PPDU in recipient |
| Tail Bits | 6 | It is used for trellis termination of convolutional decoder. it is set to 0 |

FIG. 3(c) exemplifies an HT-greenfield (HT-GF) format PPDU for supporting IEEE 802.11n system only.

Referring to FIG. 3(c), the HT-GF format PPDU includes an HT-GF-STF, an HT-LTF1, an HT-SIG field, a plurality of HT-LTF2 and a data field.

The HT-GF-STF is used for frame time acquisition and AGC.

The HT-LTF1 is used for channel estimation.

The HT-SIG field is used for demodulating and decoding the data field.

The HT-LTF2 is used for channel estimation for demodulating the data field. Similarly, since the HT-STA requires channel estimation for each data field transmitted via a plurality of spatial streams due to the use of SU-MIMO, a plurality of HT-LTF2 may be included.

The plurality of HT-LTF2 may include a plurality of DATA HT-LTF and a plurality of extension HT-LTF, similar to the HT-LTF field of the HT-mixed PPDU.

In FIGS. 3(a) to 3(c), the data field is a payload, and the data field may include a SERVICE field, a scrambled PSDU field, Tail bits, and padding bits. All bits of the data field are scrambled.

FIG. 3(d) illustrates a service filed included in a data field. The service field has 16 bits. The bits are numbered by #0 to #15 and sequentially transmitted, starting from bit #0. #0 to #6 bits are set to 0 and used for synchronizing a descrambler of a receiver.

In order to effectively utilize radio channels, IEEE 802.11ac WLAN system supports a transmission of downlink Multi User Multiple Input Multiple Output (MU-MIMO) scheme in which a plurality of STAs access channel simultaneously. According to the MU-MIMO transmission scheme, an AP may transmit packets to one or more STAs that are paired by MIMO simultaneously.

A downlink multi-user (DL MU) transmission means a technique that an AP transmits a PPDU to a plurality of non-AP STAs through the same time resource through one or more antennas.

Hereinafter, the MU PPDU means a PPDU that transmits one or more PSDUs for one or more STAs using the MU-MIMO technique or the OFDMA technique. And the SU PPDU means a PPDU which is available to deliver only one PSDU or a PPDU that has a format in which the PSDU is not existed.

For the MU-MIMO transmission, the size of the control information transmitted to an STA may be relatively greater than that of the control information based on 802.11n. Examples of the control information additionally required for supporting the MU-MIMO may include information indicating the number of spatial stream received by each STA, the information related to modulating and coding the data transmitted to each STA, and the like.

Accordingly, when the MU-MIMO transmission is performed for providing data service to a plurality of STAs simultaneously, the size of transmitted control information may increase as the number of STAs that receive the control information.

As such, in order to effectively transmit the increasing size of the control information, a plurality of control information required for the MU-MIMO transmission may be transmitted by being classified into common control information commonly required for all STAs and dedicated control information individually required for a specific STA.

FIG. 4 exemplifies a VHT format PPDU of a wireless communication system to which the present invention may be applied.

FIG. 4(a) illustrates a VHT format PPDU (VHT format PPDU) for supporting the IEEE 802.11ac system.

Referring to FIG. 4(a), the VHT format PPDU includes a legacy format preamble that includes the L-STF, the L-LTF and the L-SIG field and a VHT format preamble that includes a VHT-Signal-A (VHT-SIG-A) field, a VHT Short Training field (VHT-STF), a VHT Long Training field (VHT-LTF) and a VHT-Signal-B (VHT-SIG-B) field and a data field.

Since the L-STF, the L-LTF and the L-SIG field signify legacy fields for backward compatibility, the fields from the L-STF to the L-SIG field are identical to those of the non-HT format. However, the L-LTF may further include information for channel estimation to be performed to demodulate the L-SIG field and the VHT-SIG-A field.

The L-STF, the L-LTF, the L-SIG field and the VHT-SIG-A field may be repeatedly transmitted in a unit of 20 MHz channel. For example, when a PPDU is transmitted through four 20 MHz channels (i.e., 80 MHz bandwidth), the L-STF, the L-LTF, the L-SIG field and the VHT-SIG-A field may be repeatedly transmitted in every 20 MHz channel.

The VHT-STA may be aware whether the PPDU is the VHT format PPDU using the VHT-SIG-A field which follows the legacy field, and based on this, the VHT-STA may decode the data field.

In the VHT format PPDU, the L-STF, the L-LTF and the L-SIG field are firstly transmitted such that an L-STA also receives and acquires data. Later, the VHT-SIG-A field is transmitted for demodulating and decoding the data transmitted for the VHT-STA.

The VHT-SIG-A field is a field for transmitting common control information between VHT STAs paired with an AP in MIMO scheme, and includes the control information for interpreting the received VHT format PPDU.

The VHT-SIG-A field may include a VHT-SIG-A1 field and a VHT-SIG-A2 field.

The VHT-SIG-A1 field may include channel bandwidth (BW) information to use, information on whether to apply Space Time Block Coding (STBC), Group Identifier (Group ID) information for indicating a group of STAs that are grouped in MU-MIMO scheme, information of the Number of space-time stream (NSTS) to use/Partial association Identifier (AID) and Transmit power save forbidden information. Herein, the Group ID may signify an identifier allocated to an STA group which is to be transmitted for supporting MU-MIMO transmission, and may represent whether the currently used MIMO transmission scheme is MU-MIMO or SU-MIMO.

Table 2 below exemplifies the VHT-SIG-A1 field.

TABLE 2

| Field | Bit | Description |
|---|---|---|
| BW | 2 | In the case of 20 MHz, set to '0', In the case of 40 MHz, set to '1', In the case of 80 MHz, set to '2', In the case of 160 MHz or 80 + 80 MHz, set to '3'. |
| Reserved | 1 | |
| STBC | 1 | In the case of VHT SU PPDU: In the case that STBC is used, set to '1', Otherwise, set to '0' In the case of VHT MU PPDU: Set to '0' |
| Group ID | 6 | Indicate Group ID '0' or '63' indicates VHT SU PPDU, otherwise indicates VHT MU PPDU |
| NSTS/Partial AID | 12 | In the case of VHT MU PPDU, divided by 4 user position 'p' each having 3 bits In the case that space time stream is 0, set to '0', In the case that space time stream is 1, set to '1', |

TABLE 2-continued

| Field | Bit | Description |
|---|---|---|
| | | In the case that space time stream is 2, set to '2', |
| | | In the case that space time stream is 3, set to '3', |
| | | In the case that space time stream is 4, set to '4'. |
| | | In the case of VHT SU PPDU, |
| | | Top 3 bits are set as follows. |
| | | In the case that space time stream is 1, set to '0', |
| | | In the case that space time stream is 2, set to '1', |
| | | In the case that space time stream is 3, set to '2', |
| | | In the case that space time stream is 4, set to '3', |
| | | In the case that space time stream is 5, set to '4', |
| | | In the case that space time stream is 6, set to '5', |
| | | In the case that space time stream is 7, set to '6', |
| | | In the case that space time stream is 8, set to '7', |
| | | Bottom 9 bits indicate Partial AID. |
| TXOP_PS_NOT_ALLOWED | 1 | When a VHT AP allows non-AP VHT STA shifted to a power save mode for transmission opportunity (TXOP), set to '0'. Otherwise, set to '1'. In the case of a VHT PPDU transmitted by non-AP VHT STA, set to '1'. |
| Reserved | 1 | |

The VHT-SIG-A2 field may include information on whether to use a short Guard Interval (GI), Forward Error Correction (FEC) information, information on Modulation and Coding Scheme (MCS) for a single user, information on types of channel coding for a plurality of users, beamforming related information, redundancy bits for Cyclic Redundancy Checking (CRC), a tail bit of convolutional decoder, and the like.

Table 3 below exemplifies the VHT-SIG-A2 field.

TABLE 3

| Field | Bit | Description |
|---|---|---|
| Short GI | 1 | In the case that short GI is not used in a data field, set to '0', In the case that short GI is used in a data field, set to '1'. |
| Short GI disambiguation | 1 | In the case that short GI is used and an additional symbol is required for a payload of PPDU, set to '1', In the case that an additional symbol is not required, set to '0'. |
| SU/MU Coding | 1 | In the case of VHT SU PPDU: In the case of BCC(binary convolutional code), set to '0', In the case of LDPC (low-density parity check), set to '1'. In the case of VHT MU PPDU: In the case that NSTS field of which user position is '0' is not '0', indicates coding to use. In the case of BCC, set to '0', In the case of LDPC, set to '1'. In the case that NSTS field of which user position is '0' is '0', set to '1' as a reserved field. |
| LDPC Extra OFDM Symbol | 1 | In the case that an additional extra OFDM symbol is required owing to LDPC PPDU encoding procedure (in the case of SU PPDU) or PPDU encoding procedure of at least one LDPC user (in the case of VHT MU PPDU), set to '1'. Otherwise, set to '0'. |
| SU VHT MCS/MU Coding | 4 | In the case of VHT SU PPDU: Represents VHT-MCS index. In the case of VHT MU PPDU: Indicates coding for user positions '1' to '3' in an order of ascending order from top bit. In the case that NSTS field of each user is not '1', indicates coding to use. In the case of BCC, set to '0', In the case of LDPC, set to '1'. In the case that NSTS field of each user is '0', set to '1' as a reserved field. |
| Beamformed | 1 | In the case of VHT SU PPDU: In the case that Beamforming steering matrix is applied to SU transmission, set to '1'. Otherwise, set to '0' In the case of VHT MU PPDU: Set to '1' as a reserved field. |
| Reserved | 1 | |
| CRC | 8 | Include CRC for detecting error of PPDU in receiver |
| Tail | 6 | Used for trellis end of convolutional decoder Set to '0'. |

The VHT-STF is used for improving the performance of AGC estimation in MIMO transmission.

The VHT-LTF is used for a VHT-STA to estimate a MIMO channel. Since a VHT WLAN system support the MU-MIMO, the VHT-LTF may be setup as much as the number of spatial streams through which a PPDU is transmitted. Additionally, in the case that full channel sounding is supported, the number of VHT-LTFs may increase.

The VHT-SIG-B field includes dedicated control information required to acquire data for a plurality of VHT-STAs paired in MU-MIMO scheme by receiving a PPDU. Accordingly, only in the case that the common control information included in the VHT-SIG-A field indicates a MU-MIMO transmission by a PPDU which is currently received, a VHT-STA may be designed to decode the VHT-SIG-B field. On the contrary, in the case that the common control information indicates that a PPDU currently received is for a single VHT-STA (including SU-MIMO), an STA may be designed not to decode the VHT-SIG-B field.

The VHT-SIG-B field includes a VHT-SIG-B Length field, a VHT-MCS field, a Reserved field, and a Tail field.

The VHT-SIG-B Length field indicates the length of the A-MPDU (before end-of-frame (EOF) padding). The VHT-MCS field includes information on modulation, encoding and rate-matching of each of the VHT-STAs.

A size of the VHT-SIG-B field may be different depending on types of MIMO transmission (MU-MIMO or SU-MIMO) and channel bandwidths which are used for PPDU transmissions.

FIG. 4(b) illustrates a VHT-SIG-B field in accordance with a PPDU transmission bandwidth.

Referring to FIG. 4(b), in 40 MHz transmission, the VHT-SIG-B bit is repeated twice. In 80 MHz transmission, the VHT-SIG-B bit is repeated four times and a pad bit set to 0 is added.

In 160 MHz transmission and 80+80 MHz transmission, first, the VHT-SIG-B bit is repeated four times and a pad bit set to 0 is added. Also, the entire 117 bits are repeated again.

In order to transmit PPDUs of the same size to STAs paired with an AP in a system that supports the MU-MIMO, information indicating a bit size of a data field that configures the PPDU and/or information indicating a bit stream size that configures a specific field may be included in the VHT-SIG-A field.

However, in order to efficiently use the PPDU format, the L-SIG field may be used. In order for the PPDUs of the same size to be transmitted to all STAs, a length field and a rate field transmitted with being included in the L-SIG field may be used for providing required information. In this case, since a MAC Protocol Data Unit (MPDU) and/or an Aggregate MAC Protocol Data Unit (A-MPDU) are configured based on bytes (or octet (oct)) of the MAC layer, an additional padding may be required in the physical layer.

The data field in FIG. 4 is a payload, and may include a SERVICE field, a scrambled PSDU, tail bits and padding bits.

As such, since several formats of PPDU are used in a mixed manner, an STA should be able to distinguish a format of received PPDU.

Herein, the meaning of distinguishing PPDU (or classifying the format of PPDU) may have various meanings. For example, the meaning of distinguishing PPDU may have a meaning of determining whether the received PPDU is a PPDU that is available to be decoded (or interpreted) by an STA. In addition, the meaning of distinguishing PPDU may have a meaning of determining whether the received PPDU is a PPDU that is available to be supported by an STA.

Further, the meaning of distinguishing PPDU may be interpreted as a meaning of classifying what the information is that is transmitted through the received PPDU.

This will be described in more detail by reference to the drawing below.

FIG. 5 is a diagram exemplifying a constellation for distinguishing a format of PPDU in a wireless communication system to which the present invention may be applied.

FIG. 5(a) exemplifies a constellation of an L-SIG field included in a non-HT format PPDU and FIG. 5(b) exemplifies a phase rotation for detecting an HT-mixed format PPDU. And FIG. 5(c) exemplifies a phase rotation for detecting a VHT format PPDU.

In order for an STA to distinguish the non-HT format PPDU, the HT-GF format PPDU, the HT-mixed format PPDU and the VHT format PPDU, a phase of constellation of the L-SIG field and the OFDM symbol transmitted after the L-SIG field are used. That is, the STA may classify a PPDU format based on the phase of constellation of the L-SIG field and the OFDM symbol transmitted after the L-SIG field.

Referring to FIG. 5(a), the OFDM symbol that configures the L-SIG field utilizes Binary Phase Shift Keying (BPSK).

First, in order to distinguish the HT-GF format PPDU, when an initial SIG field is detected in a received PPDU, an STA determines whether the SIG field is the L-SIG field. That is, the STA tries to decode based on the constellation example shown in FIG. 5(a). When the STA fail to decode, it may be determined that the corresponding PPDU is the HT-GF format PPDU.

Next, in order to classify the non-HT format PPDU, the HT-mixed format PPDU and the VHT format PPDU, the phase of constellation of the OFDM symbol transmitted after the L-SIG field may be used. That is, the modulation method of the OFDM symbol transmitted after the L-SIG field may be different, and the STA may classify the PPDU formats based on the modulation method for the field after the L-SIG field of the received PPDU.

Referring to FIG. 5(b), in order to distinguish the HT-mixed format PPDU, the phase of two OFDM symbols transmitted after the L-SIG field in the HT-mixed format PPDU may be used.

More particularly, the phases of both OFDM symbol #1 and OFDM symbol #2 that correspond to the HT-SIG field transmitted after the L-SIG field in the HT-mixed format PPDU rotate as much as 90 degrees in counter-clock wise direction. That is, the modulation method for OFDM symbol #1 and OFDM symbol #2 uses Quadrature Binary Phase Shift Keying (QBPSK). The QBPSK constellation may be a constellation of which phase rotates as much as 90 degrees in counter-clock wise direction with respect to the BPSK constellation.

An STA tries to decode OFDM symbol #1 and OFDM symbol #2 that correspond to the HT-SIG field transmitted after the L-SIG field of the received PPDU based on the constellation example shown in FIG. 5(b). When the STA is successful in decoding, the STA determines the corresponding PPDU to be the HT format PPDU.

Next, in order to distinguish the non-HT format PPDU and the VHT format PPDU, the phase of constellation of the OFDM symbol transmitted after the L-SIG field may be used.

Referring to FIG. 5(c), in order to distinguish the VHT format PPDU, the phases of two OFDM symbols transmitted after the L-SIG field in the VHT format PPDU may be used.

More particularly, the phase of OFDM symbol #1 that corresponds to the VHT-SIG-A field after the L-SIG field in the VHT format PPDU does not rotate, but the phase of OFDM symbol #2 rotates as much as 90 degrees in counter-clock wise direction. That is, the modulation method for OFDM symbol #1 uses the BPSK and the modulation method for OFDM symbol #2 uses the QBPSK.

An STA tries to decode OFDM symbol #1 and OFDM symbol #2 that correspond to the VHT-SIG field transmitted after the L-SIG field of the received PPDU based on the constellation example shown in FIG. 5(c). When the STA is successful in decoding, the STA may determine the corresponding PPDU to be the VHT format PPDU.

On the other hand, when the STA fails to decode, the STA may determine the corresponding PPDU to be the non-HT format PPDU.

MAC Frame Format

FIG. 6 exemplifies a MAC frame format in IEEE 802.11 system to which the present invention may be applied.

Referring to FIG. 6, a MAC frame (i.e., MPDU) includes a MAC Header, a Frame Body and a frame check sequence (FCS).

The MAC Header is defined by regions that include Frame Control field, Duration/ID field, Address 1 field, Address 2 field, Address 3 field, Sequence Control field, Address 4 field, QoS Control field and HT Control field.

The Frame Control field includes information on characteristics of the corresponding MAC frame. Detailed description for the Frame Control field will be described below.

The Duration/ID field may be implemented to have different values according to a type and a subtype of the corresponding MAC frame.

In the case that a type and a subtype of the corresponding MAC frame is a PS-Poll frame for the power save (PS) operation, the Duration/ID field may be configured to include an association identifier of the STA that transmits the frame. In other case, the Duration/ID field may be configured to have a specific duration value depending on the corresponding type and subtype of the MAC frame. In addition, in the case that the frame is an MPDU included in the aggregate-MPDU (A-MPDU) format, all of the Duration/ID fields included in the MAC header may be configured to have the same value.

Address 1 field to Address 4 field are used to indicate BSSID, source address (SA), destination address (DA), transmitting address (TA) representing an address of a transmission STA and a receiving address (RA) representing an address of a reception STA.

Meanwhile, the address field implemented as the TA field may be set to a bandwidth signaling TA value. In this case, the TA field may indicate that the corresponding MAC frame has additional information to the scrambling sequence. Although the bandwidth signaling TA may be represented as a MAC address of the STA that transmits the corresponding MAC frame, Individual/Group bit included in the MAC address may be set to a specific value (e.g., '1').

The Sequence Control field is configured to include a sequence number and a fragment number. The sequence number may indicate the number of sequence allocated to the corresponding MAC frame. The fragment number may indicate the number of each fragment of the corresponding MAC frame.

The QoS Control field includes information related to QoS. The QoS control field may be included in the case that a QoS data frame is indicated in a Subtype subfield.

The HT Control filed includes control information related to HT and/or VHT transmission and reception techniques.

The HT Control field is included in Control Wrapper frame. Further, the HT Control field is existed in the QoS data frame of which Order subfield value is 1, and existed in Management frame.

The Frame Body is defined as a MAC payload, and data to be transmitted in a higher layer is located therein. And the Frame body has a variable size. For example, a maximum size of MPDU may be 11454 octets, and a maximum size of PPDU may be 5.484 ms.

The FCS is defined as a MAC footer, and used for searching an error of the MAC frame.

First three fields (the Frame Control field, the Duration/ID field and the Address 1 field) and the last field (FCS field) configure a minimum frame format, and are existed in all frames. Other fields may be existed in a specific frame type.

FIG. 7 is a diagram illustrating a frame control field in an MAC frame in the wireless communication system to which the present invention may be applied.

Referring to FIG. 7, the frame control field is comprised of a Protocol Version subfield, a Type sub field, a Subtype subfield, a To Ds subfield, a From DS subfield, a More Fragments subfield, a Retry subfield, a Power Management subfield, a More Data subfield, a Protected Frame subfield, and an Order subfield.

The Protocol Version subfield may indicate a version of a WLAN protocol applied to the corresponding MAC frame.

The Type subfield and the Subtype subfield may be set to indicate information identify a function of the corresponding MAC frame.

A type of the MAC frame may include three frame types of a management frame, a control frame, and a data frame.

In addition, each of the frame types may be divided into subtypes again.

For example, the control frames may include a request to send (RTS) frame, a clear-to-send (CTS) frame, an acknowledgment (ACK) frame, a PS-Poll frame, a contention free (CF)-End frame, a CF-End+CF-ACK frame, a block ACK request (BAR) frame, a block acknowledgement (BA) frame, a control wrapper (Control+HTcontrol) frame, null data packet announcement (NDPA), and a beamforming report poll frame.

The management frames may include a beacon frame, an announcement traffic indication message (ATIM) frame, a dissociation frame, an association request/response frame, a reassociation request/response frame, a probe request/response frame, an authentication frame, a deauthentication frame, an action frame, an action No ACK frame, and a timing advertisement frame.

The To DS subfield and the From DS subfield may include information required for interpreting an Address 1 field to an Address 4 field included in the corresponding MAC frame header. In the case of the Control frame, both the To DS subfield and the From DS subfield are set to '0'. In the case of the Management frame, both the To DS subfield and the From DS subfield may be sequentially set to '1' and '0' when the corresponding frame is a QoS management frame (QMF) and both the To DS subfield and the From DS subfield may be sequentially set to '0' and '0' when corresponding frame is not the QMF.

The More Fragments subfield may indicate whether a fragment to be transmitted subsequently to the corresponding MAC frame exists. When another fragment of the MSDU or MMPDU exists, the More Fragments subfield may be set to '1' and if not, the More Fragments subfield may be set to '0'.

The Retry subfield may indicate whether the corresponding MAC frame depends on retransmission of the previous MAC frame. In the case of retransmission of the previous MAC frame, the Retry subfield may be set to '1' and if not, the Retry subfield may be set to '0'.

The Power Management subfield may indicate a power management mode of the STA. When a Power Management subfield value is '1', the corresponding Power Management subfield value may indicate that the STA may be switched to a power save mode.

The More Data subfield may indicate whether the MAC frame to be additionally transmitted exists. When the MAC frame to be additionally transmitted exists, the More Data subfield may be set to '1' and if not, the More Data subfield may be set to '0'.

The Protected Frame subfield may indicate whether a frame body field is encrypted. When the frame body field includes information processed by a cryptographic encapsulation algorithm, the Protected Frame subfield may be set to '1' and if not, the Protected Frame subfield may be set to '0'.

The information included in the aforementioned respective fields may follow a definition of the IEEE 802.11 system. Further, the respective fields correspond to examples of the fields which may be included in the MAC frame and are not limited thereto. That is, each field may be substituted with another field or further include an additional field and all fields may not be requisitely included.

FIG. 8 is a view illustrating a VHT format of an HT control field in a wireless communication system to which the present invention is applicable.

Referring to FIG. 8, the HT control field may include a VHT subfield, an HT control middle subfield, an AC constraint subfield, and a reverse direction grant (RDG)/more PPDU subfields.

The VHT subfield indicates whether an HT control field has a format of the HT control field for VHT (VHT=1) or has a format of an HT control field for HT (VHT=0). In FIG. 8, descriptions will be made on the assumption of an HT control field (i.e., VHT=1). The HT control field for VHT may also be designated as a VHT control field.

The HT control middle subfield may be implemented to have a different format according to an indication of the VHT subfield. Details of the HT control middle subfield will be described hereinafter.

The AC constraint subfield indicates whether a mapped access category (AC) of a reversed direction (RD) data frame is constrained to a single AC.

The RDG/more PPDU subfield may be differently interpreted depending on whether the corresponding field is transmitted by an RD initiator or an RD responder.

In a case in which the field is transmitted by the RD initiator, if an RDG is present, the RDG/more PPDU field is set to 1, and if the RDG is not present, the RDG/more PPDU field is set to 0. In a case in which the corresponding field is transmitted by the RD responder, if a PPDU including the corresponding subfield is a final frame transmitted by the RD responder, the RDG/more PPDU is set to 1, and if another PPDU is transmitted, the RDG/more PPDU subfield is set to 0.

As described above, the HT control middle subfield may be implemented to have a different format according to an indication of the VHT subfield.

The HT control middle subfield of the HT control field for VHT may include a reserved bit, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant bit of group ID (GID-H) subfield, a coding type subfield, a feedback transmission type (FB Tx Type) subfield, and an unsolicited MFB subfield. Table 4 illustrates descriptions of the subfields included in the HT control middle subfield of the VHT format.

TABLE 4

| Subfield | Meaning | Definition |
|---|---|---|
| MRQ | MCS request | It is set to 1 in the case of requesting MCS feedback (solicited MFB) and to 0 in otherwise case |
| MSI | MRQ sequence identifier | When unsolicited MFB subfield is set to 0 and MRQ subfield is set to 1, MSI subfield includes sequence number within range of 0 to 6 identifying specific request<br>When unsolicited MFB is set to 1, it includes compressed MSI subfield (2 bits) and STBC indication subfield (1 bit) |
| MFSI/GID-L | MFB sequence identifier/LSB of Group ID | When unsolicited MFB subfield is set to 0, MFSI/GID-L subfield includes a reception value of MSI included in frame related to MFB information<br>When unsolicited MFB subfield is set to 1 and MFB was estimated from MU PPDU, MFS/GID-L subfield includes three LSBs of group ID of PPDU from which MFB was estimated |
| MFB | VHT N_STS, MCS, BW, SNR feedback | MFB subfield includes recommended MFB. VHT-MCS = 15 and NUM_STS = 7 indicate that feedback is not present |
| GID-H | MSB of Group ID | When unsolicited MFB subfield is set to 1 and MFB was estimated from VHT MU PPDU, GID-H subfield includes three MSBs of group ID of PPDU from which unsolicited MFB was estimated<br>When MFB was estimated from SU PPDU, GID-H subfields are all set to 1. |
| Coding Type | Coding type of MFB response | When unsolicited MFB subfield is set to 1, coding type subfield includes coding type (binary convolutional code (BCC)) is 0 and low-density parity check (LDPC) is 1) of frame from which unsolicited MFB was estimated |

TABLE 4-continued

| Subfield | Meaning | Definition |
| --- | --- | --- |
| FB Tx Type | Transmission type of MFB response | When unsolicited MFB subfield is set to 1 and MFB was estimated from unbeamformed VHT PPDU, FB Tx Type subfield is set to 0. When unsolicited MFB subfield is set to 1 and MFB was estimated from beamformed VHT PPDU, FB Tx Type subfield is set to 1 |
| Unsolicited MFB | Unsolicited MCS feedback indicator | It is set to 1 when MFB is a response regarding MRQ, and set to 0 when MFB is not response regarding MRQ |

The MFB subfield may include a VHT space-time streams (NUM_STS) subfield, a VHT-MCS subfield, a bandwidth (BW) subfield, and a signal-to-noise ratio (SNR) subfield.

The NUM-STS subfield indicates the number of recommended space streams. The VHT-MCS subfield indicates a recommended MCS. The BW subfield indicates bandwidth information related to a recommended MCS. The SNR subfield indicates an average SNR value of a space stream and a data subcarrier.

Information included in each of the fields described above may follow definitions of the IEEE 802.11 system. Also, the fields described above correspond to the examples of the fields that may be included in a MAC frame and not limited thereto. That is, the fields described above may be replaced with other fields, an additional field may be further provided, and all the fields may not be essential.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 10 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. The STA receiving the NAV value is prohibited from accessing the medium during the corresponding period. For example, the NAV may be set according to the value of the duration field of the MAC header of the frame.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This can be implemented through setting the NAV during the time interval.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

a) A reduced interframe space (IFS) (RIFS)
    b) A short interframe space (IFS) (SIFS)
    c) A PCF interframe space (IFS) (PIFS)
    d) A DCF interframe space (IFS) (DIFS)
    e) An arbitration interframe space (IFS) (AIFS)
    f) An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a block ACK request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium. The PIFS may be used in the following cases.

An STA operating under a PCF
An STA sending a channel switch announcement frame
An STA sending a traffic indication map (TIM) frame
A hybrid coordinator (HC) starting a CFP or transmission opportunity (TXOP)
An HC or non-AP QoS STA, that is, a TXOP holder polled for recovering from the absence of expected reception within a controlled access phase (CAP)
An HT STA using dual CTS protection before sending CTS2
A TXOP holder for continuous transmission after a transmission failure
A reverse direction (RD) initiator for continuous transmission using error recovery
An HT AP during a PSMP sequence in which a power save multi-poll (PSMP) recovery frame is transmitted
An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

The "aSIFSTime" is defined as in Equations 1 and 2 below.

$$aSIFSTime(16\ \mu s) = aRxRFDelay(0.5) + aRxPLCPDelay(12.5) + aMACProcessingDelay(1\ or\ <2) + aRxTxTurnaroundTime(<2) \quad [Equation\ 1]$$

$$aRxTxTurnaroundTime = aTxPLCPDelay(1) + aRxTxSwitchTime(0.25) + aTxRampOnTime(0.25) + aTxRFDelay(0.5) \quad [Equation\ 2]$$

The "aSlotTime" is defined as in Equation 3 below.

$$aSlotTime = aCCATime(<4) + aRxTxTurnaroundTime(<2) + aAirPropagationTime(<1) + aMACProcessingDelay(<2) \quad [Equation\ 3]$$

In Equation 3, a default physical layer parameter is based on "aMACProcessingDelay" having a value which is equal to or smaller than 1 μs. A radio wave is spread 300 m/μs in the free space. For example, 3 μs may be the upper limit of a BSS maximum one-way distance ~450 m (a round trip is ~900 m).

The PIFS and the SIFS are defined as in Equations 4 and 5, respectively.

$$PIFS(16\ \mu s) = aSIFSTime + aSlotTime \quad [Equation\ 4]$$

$$DIFS(34\ \mu s) = aSIFSTime + 2 * aSlotTime \quad [Equation\ 5]$$

In Equations 1 to 5, the numerical value within the parenthesis illustrates a common value, but the value may be different for each STA or for the position of each STA.

The aforementioned SIFS, PIFS, and DIFS are measured based on an MAC slot boundary (e.g., a Tx SIFS, a Tx PIFS, and a TxDIFS) different from a medium.

The MAC slot boundaries of the SIFS, the PIFS, and the DIFS are defined as in Equations 6 to 8, respectively.

$$TxSIFS = SIFS - aRxTxTurnaroundTime \quad [Equation\ 6]$$

$$TxPIFS = TxSIFS + aSlotTime \quad [Equation\ 7]$$

$$TxDIFS = TxSIFS + 2 * aSlotTime \quad [Equation\ 8]$$

Channel State Information Feedback Method

An SU-MIMO technology in which a beamformer communicates by allocating all antennas to a beamformee increases a channel capacity through diversity gain and stream multiple transmission using a time and a space. The SU-MIMO technology may contribute to performance enhancement of a physical layer by extending a spatial degree of freedom by increases the number of antennas as compared with a case where an MIMO technology is not applied.

Further, an MU-MIMO technology in which the beamformer allocates the antennas to a plurality of beamformees may enhance the performance of an MIMO antenna by increasing transmission rate per beamformee or reliability of the channel through a link layer protocol for multiple access of the plurality of beamformees accessing the beamformer.

In an MIMO environment, since how accurately the beamformer knows the channel information may exert a large influence on the performance, a feedback procedure for acquiring the channel is required.

As the feedback procedure for acquiring the channel information, two modes may be largely supported. One is a mode using the control frame and the other one is mode using a channel sounding procedure not including the data field. Sounding means using a corresponding training field in order to measure the channel for a purpose other than data demodulation of the PPDU including the training field.

Hereinafter, a channel information feedback method using the control frame and a channel information feedback method using a null data packet (NDP) will be described in more detail.

1) Feedback Method Using Control Frame

In the MIMO environment, the beamformer may indicate feedback of the channel state information through the HT control field included in the MAC header or report the channel state information through the HT control field included in the MAC frame header (refer to FIG. 8). The HT control field may be included in a control wrapper frame, a QoS Data frame in which the Order subfield of the MAC header is set to 1, or a management frame.

2) Feedback Method Using Channel Sounding

FIG. 11 is a diagram for conceptually describing a channel sounding method in the wireless communication system to which the present invention can be applied.

In FIG. 11, a method that feeds back the channel state information between the beamformer (for example, AP) and the beamformee (for example, non-AP STA) based on a sounding protocol is illustrated. The sounding protocol may mean a procedure that feeds back information on the channel state information.

A channel state information sounding method between the beamformer and the beamformee based on the sounding protocol may be performed by steps given below.

The beamformer transmits a VHT Null Data Packet Announcement (VHT NDPA) frame announcing sounding transmission for feedback of the beamformee.

The VHT NDPA frame means the control frame used to announce that the channel sounding is initiated and the null data packet (NDP) is transmitted. In other words, the VHT NDPA frame is transmitted before transmitting the NDP, and as a result, the beamformee may prepare for feeding back the channel state information before receiving the NDP frame.

The VHT NDPA frame may include association identifier (AID) information, feedback type information, and the like of the beamformee that will transmit the NDP. More detailed description of the VHT NDPA frame will be made below.

In the case where data is transmitted by using the MU-MIMO and in the case where the data is transmitted by using the SU-MIMO, the VHT NDPA frame may be transmitted by different transmission methods. For example, when the channel sounding for the MU-MIMO is performed, the VHT NDPA frame is transmitted by a broadcast method, but when the channel sounding for the SU-MIMO is performed, the VHT NDPA frame may be transmitted to one target STA by a unicast method.

(2) The beamformer transmits the VHT NDPA frame and thereafter, transmits the NDP after an SIFS time. The NDP has a VHT PPDU structure except for the data field.

The beamformees that receive the VHT NDPA frame may verify an AID12 subfield value included in the STA information field and verify the beamformees as sounding target STAs.

Further, the beamformees may know a feedback order through the order of the STA Info field included in the NDPA. In FIG. 11, a case where the feedback order is the order of beamformee 1, beamformee 2, and beamformee 3 is illustrated.

(3) Beamformee 1 acquires the downlink channel state information based on the training field included in the NDP to generate feedback information to be transmitted to the beamformer.

Beamformee 1 receives the NDP frame and thereafter, transmits a VHT compressed beamforming frame including the feedback information to the beamformer after the SIFS.

The VHT compressed beamforming frame may include an SNR value for the space-time stream, information on a compressed beamforming feedback matrix for a subcarrier, and the like. More detailed description of the Compressed Beamforming frame will be made below.

(4) The beamformer receives the VHT Compressed Beamforming frame beamformee 1 and thereafter, transmits the beamforming report poll frame to beamformee 2 in order to the channel information from beamformee 2 after the SIFS.

The beamforming report poll frame is a frame that performs the same role as the NDP frame and beamformee 2 may measure the channel state based on the transmitted beamforming report poll frame.

More detailed description of the beamforming report poll frame will be made below.

(5) Beamformee 2 that receives the beamforming report poll frame transmits the VHT compressed beamforming frame including the feedback information to the beamformer after the SIFS.

(6) The beamformer receives the VHT Compressed Beamforming frame beamformee 2 and thereafter, transmits the beamforming report poll frame to beamformee 3 in order to the channel information from beamformee 3 after the SIFS.

(7) Beamformee 3 that receives the beamforming report poll frame transmits the VHT compressed beamforming frame including the feedback information to the beamformer after the SIFS.

Hereinafter, the frame used in the aforementioned channel sounding procedure will be described.

FIG. 12 is a diagram illustrating a VHT NDPA frame in the wireless communication system to which the present invention may be applied.

Referring to FIG. 12, the VHT NDPA frame may be comprised of a frame control field, a duration field, a receiving address (RA) field, a transmitting address (TA) field, a sounding dialog token field, an STA information 1 (STA Info 1) field to an STA information n (STA Info n) field, and an FCS.

The RA field value represents a receiver address or STA address that receives the VHT NDPA frame.

When the VHT NDPA frame includes one STA Info field, the RA field value has an address of the STA identified by the AID in the STA Info field. For example, when the VHT NDPA frame is transmitted to one target STA for SU-MIMO channel sounding, the AP transmits the VHT NDPA frame to the STA by unicast.

On the contrary, when the VHT NDPA frame includes one or more STA Info fields, the RA field value has a broadcast address. For example, when the VHT NDPA frame is transmitted to one or more target STAs for MU-MIMO channel sounding, the AP broadcasts the VHT NDPA frame.

The TA field value represents a bandwidth for signaling a transmitter address to transmit the NDPA frame or an address of the STA which transmits the VHT NDPA frame, or the TA.

The Sounding Dialog Token field may be referred to as a sounding sequence field. A Sounding Dialog Token Number subfield in the Sounding Dialog Token field includes a value selected by the beamformer in order to identify the VHT NDPA frame.

The VHT NDPA frame includes at least one STA Info field. That is, the VHT NDPA frame includes an STA Info field including information on a sounding target STA. One STA Info field may be included in each sounding target STA.

Each STA Info field may be constituted by an AID12 subfield, a Feedback Type subfield, and an Nc Index subfield.

Table 5 shows the subfield of the STA Info field included in the VHT NDPA frame.

TABLE 5

| Subfield | Description |
| --- | --- |
| AID12 | Includes the AID of the STA which becomes the sounding feedback target<br>When the target STA is the AP, a mesh STA, or the STA which is an IBSS member, the AID12 subfield value is set to '0' |
| Feedback Type | Indicates the feedback request type for the sounding target STA<br>In the case of the SU-MIMO, '0'<br>In the case of the MU-MIMO, '1' |
| Nc Index | When the Feedback Type subfield indicates the MU-MIMO, Nc Index indicates a value acquired by subtracting 1 from the number (Nc) of columns of the compressed beamforming feedback matrix<br>In the case of Nc = 1, '0',<br>In the case of Nc = 2, '1',<br>. . .<br>In the case of Nc = 8, '7'<br>In the case of the SU-MIMO, the Nc Index is set as a reserved subfield |

The information included in the aforementioned respective fields may follow the definition of the IEEE 802.11 system. Further, the respective fields correspond to examples of the fields which may be included in the MAC frame and substituted with another field or an additional field may be further included.

FIG. 13 is a diagram illustrating an NDP PPDU in the wireless communication system to which the present invention may be applied.

Referring to FIG. 13, the NDP may have a format in which the data field is omitted from the VHT PPDU format. The NDP is precoded based on a specific precoding matrix to be transmitted to the sounding target STA.

In the L-SIG field of the NDP, a length field indicating the length of the PSDU included in the data field is set to '0'.

A Group ID field indicating whether a transmission technique used for transmitting the NDP in the VHT-SIG-A field of the NDP is the MU-MIMO or the SU-MIMO is set to a value indicating the SU-MIMO transmission.

A data bit of the VHT-SIG-B field of the NDP is set to a bit pattern fixed for each bandwidth.

When the sounding target STA receives the NDP, the sounding target STA estimates the channel and acquires the channel state information based on the VHT-LTF field of the NDP.

FIG. 14 is a diagram illustrating a VHT compressed beamforming frame format in the wireless communication system to which the present invention may be applied.

Referring to FIG. 14, the VHT compressed beamforming frame as a VHT action frame for supporting the VHT function includes the Action field in the frame body. The Action field provides a mechanism for specifying management operations included in and extended to the frame body of the MAC frame.

The Action field is comprised of a Category field, a VHT Action field, a VHT MIMO Control field, a VHT Compressed Beamforming Report field, and an MU Exclusive Beamforming Report field.

The Category field is set to a value indicating a VHT category (that is, VHT Action frame) and the VHT Action field is set to a value indicating the VHT Compressed Beamforming frame.

The VHT MIMO Control field is used for feeding back control information associated with beamforming feedback. The VHT MIMO Control field may always exist in the VHT Compressed Beamforming frame.

The VHT Compressed Beamforming Report field is used for feeding back information on the beamforming matrix including the SNR information for the space-time stream used for transmitting the data.

The MU Exclusive Beamforming Report field is used for feeding back the SNR information for a spatial stream when the MU-MIMO transmission is performed.

Whether the VHT Compressed Beamforming Report field and the MU Exclusive Beamforming Report field exist and contents of the VHT Compressed Beamforming Report field and the MU Exclusive Beamforming Report field may be determined according to values of a Feedback Type subfield, a Remaining Feedback Segments subfield, and a First Feedback Segment subfield of the VHT MIMO Control field.

Hereinafter, the VHT MIMO Control field, the VHT Compressed Beamforming Report field, and the MU Exclusive Beamforming Report field will be described in more detail.

1) The VHT MIMO Control field is comprised of an Nc Index subfield, an Nr Index subfield, a Channel Width subfield, a Grouping subfield, a Codebook Information subfield, a Feedback Type subfield, a Remaining Feedback Segments subfield, a First Feedback Segment subfield, a reserved subfield, and a Sounding Dialog Token Number subfield.

Table 6 shows the subfield of the VHT MIMO Control field.

TABLE 6

| Subfield | The number of bits | Description |
|---|---|---|
| Nc Index | 3 | Nc Index indicates a value acquired by subtracting 1 from the number (Nc) of columns of the compressed beamforming feedback matrix<br>In the case of Nc = 1, '0',<br>In the case of Nc = 2, '1',<br>. . .<br>In the case of Nc = 8, '7' |
| Nr Index | 3 | Nr Index indicates a value acquired by subtracting 1 from the number (Nr) of rows of the compressed beamforming feedback matrix<br>In the case of Nr = 1, '0',<br>In the case of Nr = 2, '1',<br>. . .<br>In the case of Nr = 8, '7' |
| Channel Width | 2 | Indicates the bandwidth of the channel measured in order to generate the compressed beamforming feedback matrix<br>In the case of 20 MHz, '0',<br>In the case of 40 MHz, '1',<br>In the case of 80 MHz, '2',<br>In the case of 160 MHz or 80 + 80 MHz, '3' |
| Grouping | 2 | Indicates subcarrier grouping (Ng) used in the compressed beamforming feedback matrix<br>In the case of Ng = 1(no grouping), '0',<br>In the case of Ng = 2, '1',<br>In the case of Ng = 4, '2',<br>A value of '3' is set to a preliminary value |
| Codebook Information | 1 | Indicates the sizes of codebook entries<br>When the feedback type is the SU-MIMO,<br>In the case of b$\psi$ = 2 and b$\Phi$ = 4, '0',<br>In the case of b$\psi$ = 4 and b$\Phi$ = 6, '1'<br>When the feedback type is the MU-MIMO, |

TABLE 6-continued

| Subfield | The number of bits | Description |
|---|---|---|
| | | In the case of bψ = 5 and bΦ = 7, '0', |
| | | In the case of bψ = 7 and bΦ = 9, '1' |
| | | Herein, bψ and bΦ mean the number of quantized bits |
| Feedback Type | 1 | Indicates the feedback type |
| | | In the case of the SU-MIMO, '0', |
| | | In the case of the MU-MIMO, '1' |
| Remaining Feedback Segments | 3 | Indicates the number of remaining feedback segments for the associated VHT Compressed Beamforming frame |
| | | In the case of a last feedback segment of the segmented report or a segment of an unsegmented report, the Remaining Feedback Segments are set to '0' |
| | | When the Remaining Feedback Segments are not first and last feedback segments of the segmented report, the Remaining Feedback Segments are set to a value between '1' and '6' |
| | | When the Remaining Feedback Segments are feedback segments other than the last segment, the Remaining Feedback Segments are set to the value between '1' and '6' |
| | | In the case of a retransmitted feedback segment, the field is set to the same value as the segment associated with original transmission |
| First Feedback Segment | 1 | In the case of a first feedback segment of the segmented report or a segment of an unsegmented report, the First Feedback Segment is set to '1' |
| | | When the corresponding feedback segment is not the first feedback segment or the VHT Compressed Beamforming Report field or the MU Exclusive Beamforming Report field does not exist in the frame, the First Feedback Segment is set to '0' |
| | | In the case of a retransmitted feedback segment, the field is set to the same value as the segment associated with the original transmission |
| Sounding Dialog Token Number | 6 | The Sounding Dialog Token Number is set to a sounding dialog token value of the NDPA frame |

When the VHT Compressed Beamforming frame does not transfer the entirety or a part of the VHT Compressed Beamforming Report field, the Nc Index subfield, the Channel Width subfield, the Grouping subfield, the Codebook Information subfield, the Feedback Type subfield, and the Sounding Dialog Token Number subfield are set as a preliminary field, the First Feedback Segment subfield is set to '0', and the Remaining Feedback Segments subfield is set to '7'.

The Sounding Dialog Token field may be referred to as a Sounding Sequence Number subfield.

2) The VHT compressed beamforming report field is used for transferring explicit feedback information representing the compressed beamforming feedback matrix 'V' which a transmission beamformer uses a steering matrix 'Q' for determining in the form of an angle.

Table 7 shows the subfield of the VHT compressed beamforming report field.

TABLE 7

| Subfield | The number of bits | Description |
|---|---|---|
| Average SNR of Space-Time Stream 1 | 8 | Average SNR on all subcarriers for space-time stream 1 in beamformee |
| . . . | . . . | . . . |
| Average SNR of Space-Time Stream Nc | 8 | Average SNR on all subcarriers for the space-time stream Nc in beamformee |
| Compressed Beamforming Feedback Matrix V for subcarrier k = scidx(0) | Na*(bψ + bΦ)/2 | Order of the angle of Compressed Beamforming Feedback Matrix for the corresponding subcarrier |
| Compressed Beamforming Feedback Matrix V for subcarrier k = scidx(1) | Na*(bψ + bΦ)/2 | The order of the angle of Compressed Beamforming Feedback Matrix for the corresponding subcarrier |
| . . . | . . . | . . . |
| Compressed Beamforming Feedback Matrix V for subcarrier k = scidx(Ns − 1) | Na*(bψ + bΦ)/2 | The order of the angle of Compressed Beamforming Feedback Matrix for the corresponding subcarrier |

Referring to Table 7, the VHT compressed beamforming report field may include the average SNR for each time-space stream and the Compressed Beamforming Feedback Matrix 'V' for the respective subcarriers. The Compressed Beamforming Feedback Matrix as a matrix including information on a channel state is used to for calculating a channel matrix (that is, a steering matrix 'Q') in the transmission method using the MIMO.

scidx( ) means the subcarrier in which the Compressed Beamforming Feedback Matrix subfield is transmitted. Na is fixed by a value of Nr×Nc (for example, in the case of Nr×Nc=2×1, Φ11, ψ21, . . . ).

Ns means the number of subcarriers in which the compressed beamforming feedback matrix is transmitted to the beamformer. The beamformee may reduce the Ns in which the compressed beamforming feedback matrix is transmitted by using the grouping method. For example, a plurality of subcarriers is bundled as one group and the compressed beamforming feedback matrix is transmitted for each corresponding group to reduce the number of compressed beamforming feedback matrices which are fed back. The Ns may be calculated from the Channel Width subfield and the Grouping subfield included in the VHT MIMO Control field.

Table 8 exemplifies an average SNR of space-time stream subfield.

TABLE 8

| Average SNR of Space-Time i subfield | AvgSNRi |
|---|---|
| −128 | ≤−10 dB |
| −127 | −9.75 dB |
| −126 | −9.5 dB |
| . . . | . . . |
| +126 | 53.5 dB |
| +127 | ≥53.75 dB |

Referring to Table 8, the average SNR for each time-space stream is calculated by calculating the average SNR value for all subcarriers included in the channel and mapping the calculated average SNR value to the range of −128 to +128.

3) The MU Exclusive Beamforming Report field is used to transfer the explicit feedback information shown in the form of delta (Δ) SNR. Information in the VHT Compressed Beamforming Report field and the MU Exclusive Beamforming Report field may be used for the MU beamformer to determine the steering matrix 'Q'.

Table 9 shows the subfield of the MU Exclusive Beamforming Report field included in the VHT compressed beamforming report frame.

TABLE 9

| Subfield | The number of bits | Description |
|---|---|---|
| Delta SNR for space-time stream 1 for subcarrier k = sscidx(0) | 4 | Difference between the SNR for the corresponding subcarrier and the average SNR for all subcarriers of the corresponding time-space stream |
| . . . | . . . | . . . |
| Delta SNR for space-time stream Nc for subcarrier k = sscidx(0) | 4 | Difference between the SNR for the corresponding subcarrier and the average SNR for all subcarriers of the corresponding time-space stream |
| . . . | . . . | . . . |
| Delta SNR for space-time stream 1 for subcarrier k = sscidx(1) | 4 | Difference between the SNR for the corresponding subcarrier and the average SNR for all subcarriers of the corresponding time-space stream |
| . . . | . . . | . . . |
| Delta SNR for space-time stream Nc for subcarrier k = sscidx(1) | 4 | Difference between the SNR for the corresponding subcarrier and the average SNR for all subcarriers of the corresponding time-space stream |
| . . . | . . . | . . . |
| Delta SNR for space-time stream 1 for subcarrier k = sscidx(Ns' − 1) | 4 | Difference between the SNR for the corresponding subcarrier and the average SNR for all subcarriers of the corresponding time-space stream |
| . . . | . . . | . . . |
| Delta SNR for space-time stream Nc for subcarrier k = sscidx(Ns' − 1) | 4 | Difference between the SNR for the corresponding subcarrier and the average SNR for all subcarriers of the corresponding time-space stream |

Referring to Table 9, the SNR per time-space stream may be included for each subcarrier in the MU Exclusive Beamforming Report field.

Each Delta SNR subfield has a value which increases by 1 dB between −8 dB and 7 dB.

scidx( ) represents the subcarrier(s) in which the Delta SNR subfield is transmitted and Ns means the number of subcarriers in which the Delta SNR subfield is transmitted.

FIG. 15 is a diagram illustrating a beamforming report poll frame format in the wireless communication system to which the present invention may be applied.

Referring to FIG. 15, the Beamforming Report Poll frame is configured to include the Frame Control field, the Duration field, the Receiving Address (RA) field, the Transmitting Address (TA) field, the Feedback Segment Retransmission Bitmap field, and the FCS.

The RA field value represents the address of an intended recipient.

The TA field value represents a bandwidth for signaling the address of the STA which transmits the Beamforming Report Poll or the TA.

The Feedback Segment Retransmission Bitmap field indicates the feedback segment requested by the VHT Compressed Beamforming report.

In the Feedback Segment Retransmission Bitmap field value, when the bit of position n is '1' (in the case of the LSB, n=0 and in the case of the MSB, n=7), the feedback segment corresponding to n in the Remaining Feedback Segments subfield in the VHT MIMO Control field of the VHT compressed beamforming frame is requested. On the contrary, when the bit of position n is '0', the feedback segment corresponding to n in the Remaining Feedback Segments subfield in the VHT MIMO Control field is not requested.

Group ID

Since the VHT WLAN system supports the MU-MIMO transmission method for higher throughput, the AP may simultaneously transmit the data frame to one or more STAs which are MIMO-paired. The AP may simultaneously transmit data to the STA group including one or more STAs among the plurality of STAs which are associated therewith. For example, the maximum number of paired STA may be 4 and when the maximum of time-space streams is 8, a maximum of 4 time-space streams may be allocated to each STA.

Further, in the WLAN system that supports Tunneled Direct Link Setup (TDLS), Direct Link Setup (DLS), or a mesh network, the STA that intends to transmit data may transmit the PPDU to the plurality of STAs by using the MU-MIMO transmission technique.

Hereinafter, the case in which the AP transmits the PPDU to the plurality of STAs according to the MU-MIMO transmission technique will be described as an example.

The AP simultaneously transmits the PPDU to the STAs which belongs to the transmission target STA group, which are paired through different spatial streams. As described above, the VHT-SIG A field of the VHT PPDU format includes the group ID information and the time-space stream information, and as a result, each STA may verify whether the corresponding PPDU is a PPDU transmitted thereto. In this case, since the spatial stream is not allocated to a specific STA of the transmission target STA group, data may not be transmitted.

A Group ID Management frame is used in order to assign or change user positions corresponding to one or more Group IDs. That is, the AP may announce STAs connected with a specific group ID through the Group ID Management frame before performing MU-MIMO transmission.

FIG. 16 is a diagram illustrating a Group ID management frame in the wireless communication system to which the present invention may be applied.

Referring to FIG. 16, the Group ID Management as the VHT action frame for supporting the VHT function includes the Action field in the frame body. The Action field provides a mechanism for specifying management operations included in and extended to the frame body of the MAC frame.

The Action field is constituted by the Category field, the VHT Action field, a Membership Status Array field, and a User Position Array field.

The Category field is set to the value indicating a VHT category (that is, VHT Action frame) and the VHT Action field is set to a value indicating the Group ID Management frame.

The Membership Status Array field is comprised of a Membership Status subfield of 1 bit for each group. When the Membership Status subfield is set to '0', the Membership Status subfield indicates that the STA is not a member of the corresponding group and when the Membership Status subfield is set to '1', the Membership Status subfield indicates that the STA is the member of the corresponding group. One or more Membership Status subfields in the Membership Status Array field are set to '1' to allocate one or more groups to the STA.

The STA may have one user position in each group which belongs thereto.

The User Position Array field is comprised of a User Position subfield of 2 bit for each group. The user position of the STA in the group which belongs to the STA is indicated by the User Position subfield in the User Position Array field. The AP may allocate the same user position to different STAs in each group.

The AP may transmit the Group ID Management frame only when a dot11VHTOptionImplemented parameter is 'true'. The Group ID Management frame is transmitted only to a VHT STA in which an MU Beamformee Capable field in a VHT Capabilities element field is set to '1'. The Group ID Management frame is transmitted to a frame addressed to each STA.

The STA receives the Group ID Management frame having the RA field which matches the MAC address thereof. The STA updates GROUP_ID_MANAGEMENT which is a PHYCONFIG_VECTOR parameter based on contents of the Group ID Management frame which are received.

Transmission of the Group ID Management to the STA and transmission of the ACK from the STA therefor are completed before transmitting the MU PPDU to the STA.

The MU PPDU is transmitted to the STA based on the contents of the Group ID Management frame most recently transmitted to the STA and the ACK is received.

DL MU-MIMO Frame

FIG. 17 is a view illustrating a downlink (DL) multi-user PPDU format in a wireless communication system to which the present invention is applicable.

Referring to FIG. 17, the PPDU includes a preamble and a data field. The data field may include a service field, a scrambled PSDU field, tail bits, and padding bits.

An AP may aggregate MPDUs to transmit a data frame in an aggregated MPDU (A-MPDU). Here, the scrambled PSDU field may include the A-MPDU.

The A-MPDU may include a sequence of one or more A-MPDU subframes.

In the case of VHT PPDU, a length of each of the A-MPDU subframes is the multiple of 4 octets, and thus, in order to adjust the A-MPDU to a final octet of the PSDU, the A-MPDU may include a 0-3 end-of-frame (EOF) pad following a final A-MPDU subframe.

The A-MPDU subframe includes an MPDU delimiter, and an MPDU may be selectively included after the MPDU delimiter. Also, in order to make the length of each of the A-MPDU subframes excluding the final A-MPDU subframe the multiple of 4 octets, a pad octet is added to after the MPDU.

The MPDU delimiter includes a reserved field, an MPDU length field, a cyclic redundancy check (CRC) field, and a delimiter signature field.

In the case of the VHT PPDU, the MPDU delimiter may further include an EOF field. In a case in which the MPDU length field is 0 and an A-MPDU subframe used to pad or an A-MPDU includes only one MPDU, an EOF field of an A-MPDU subframe in which the corresponding MPDU is included is set to 1. In otherwise case, the EOF field is set to 0.

The MPDU length field includes information regarding a length of the MPDU.

In a case in which the MPDU is not present in a corresponding A-MPDU subframe, it is set to 0. An A-MPDU subframe in which a PDU length field has a value of 0 is used when a corresponding A-MPDU is padded to adjust the A-MPDU to an available octet of VHT PPDU.

The CRC field includes CRC information for checking an error, and the delimiter signature field includes pattern information used for searching for an MPDU delimiter.

The MPDU includes a MAC header, a frame body, and a frame check sequence (FCS).

FIG. 18 is a view illustrating a DL multi-user PPDU format in a wireless communication system to which the present invention is applicable.

In FIG. 18, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 18, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs.

Accordingly, an STA which is not a member STA of a corresponding group ID or which is a member of a corresponding group ID, but in which the number of streams allocated to the STA is '0' is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All MPDUs transmitted in the VHT MU PPDU based on 802.11ac are included in the A-MPDU. In the data field of FIG. 18, each VHT A-MPDU may be transmitted in different streams.

In FIG. 18, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 can be referred to as a null subframe.

As described above, in the null subframe, the EOF field of the MPDU Delimiter is set to '1'. Thus, when the EOF field set to '1' is detected in the MAC layer of an STA on the receiving side, the reception of the physical layer is stopped, thereby being capable of reducing power consumption.

Block Ack Procedure

FIG. 19 is a diagram illustrating a downlink MU-MIMO transmission process in the wireless communication system to which the present invention may be applied.

In 802.11ac, the MU-MIMO is defined in downlink toward the client (that is, non-AP STA) from the AP. In this case, a multi-user frame is simultaneously transmitted to multiple recipients, but reception acknowledgement needs to be individually transmitted in uplink.

Since all MPDUs transmitted in the VHT MU PPDU based on 802.11ac are included in the A-MPDU, not an immediate response to the VHT MU PPDU but a response to the A-MPDU in the VHT MU PPDU is transmitted in response to a block Ack request (BAR) frame by the AP.

First, the AP transmits the VHT MU PPDU (that is, a preamble and data) to all recipients (that is, STA 1, STA 2, and STA 3). The VHT MU PPDU includes the VHT A-MPDU transmitted to each STA.

STA 1 that receives the VHT MU PPDU from the AP transmits a block acknowledgement (ACK) frame to the AP after the SIFS. More detailed description of the BA frame will be made below.

The AP that receives the BA from STA 1 transmits block acknowledgement request (BAR) to next STA 2 after the SIFS and STA 2 transmits the BA frame to the AP after the SIFS. The AP that receives the BA frame from STA 2 transmits the BAR frame to STA 3 after the SIFS and STA 3 transmits the BA frame to the AP after the SIFS.

When such a process is performed with respect to all STAs, the AP transmits the next MU PPDU to all STAs.

The RA field may be set to an address of an STA which receives a BAR frame.

The TA field may be set to an address of an STA which transmits a BAR frame.

The BAR control field includes a BAR Ack policy subfield, a multi-TID subfield, a compressed bitmap subfield, a reserved subfield, and a TID information (TID_Info) subfield.

Table 10 illustrates the BAR control field.

TABLE 10

| Subfield | Bit | Description |
| --- | --- | --- |
| BAR Ack Policy | 1 | It is set to 0 when transmitter requests immediate ACK. It is set to 1 when transmitter does not request immediate ACK. |
| Multi-TID | 1 | It indicates type of BAR frame according to multi-TID subfield and compressed bitmap subfield value |
| Compressed Bitmap | 1 | 00: Basic BAR 01: Compressed BAR 10: Reserved value 11: Multi-TID BAR |
| Reserved | 9 | |
| TID_Info | 4 | Meaning of TID_Info field is determined according to type of BAR frame. In the case of basic BAR frame or compressed BAR frame, it includes TID in which BA frame is requested. In the case of multi-TID BAR frame, it includes number of TIDs. |

ACK(Acknowledgement)/Block ACK(Block ACK) Frame

In general, an ACK frame is used as a response to an MPDU, and a block ACK frame is used as a response of an A-MPDU.

FIG. 20 is a view illustrating an ACK frame in a wireless communication system to which the present invention is applicable.

Referring to FIG. 20, the ACK frame includes a frame control field, a duration field, an RA field, and an FCS.

The RA field is set to a value of a second address (Address 2) of an immediately previously received data frame, a management frame, a block ACK request frame, a block ACK frame, or a PS-Poll frame.

In a case in which the ACK frame is transmitted by a non-QoS station (STA), when a more fragment subfield of a frame control field of the immediately previously received data frame or the management frame is 0, the duration value is set to 0.

In the ACK frame not transmitted by the non-QoS STA, the duration value is set to a value (ms) obtained by subtracting a time required for transmission of the ACK frame and an SIFS section from a duration/ID field of the immediately previously received data frame, the management frame, the block ACK request frame, the block ACK frame, or the PS-Poll frame. When the calculated duration value is not an integer value, the duration value is rounded off.

Hereinafter, the block ACK (request) frame will be described.

FIG. 21 is a view illustrating an ACK block request frame in a wireless communication system to which the present invention is applicable.

Referring to FIG. 21, the block ACK request (BAR) includes a frame control field, a duration/ID field, a reception address (RA) field, a transmission address (TA) field, a BAR control field, a BAR information field, and a frame check sequence (FCS).

The BAR information field includes different information according to a type of the BAR frame. This will be described with reference to FIG. 22.

FIG. 22 is a view illustrating a BAR information field of a block ACK request frame in a wireless communication system to which the present invention is applicable.

FIG. 22(*a*) illustrates a BAR information field of the basic BAR frame and the compressed BAR frame, and FIG. 22(*b*) illustrates a BAR information field of the multi-TID BAR frame.

Referring to FIG. 22(*a*), in the case of the basic BAR frame and the compressed BAR frame, the BAR information field includes a block ACK starting sequence control subfield.

Also, the Block Ack Starting Sequence Control subfield includes a fragment number subfield and a starting sequence number subfield.

The fragment number subfield is set to 0.

In the case of the basic BAR frame, the starting sequence number subfield includes a sequence number of a first MSDU in which a corresponding BAR frame is transmitted. In the case of the compressed BAR frame, the starting sequence control subfield includes a sequence number of a first MSDU or an A-MSDU in which a corresponding BAR frame is to be transmitted or.

Referring to FIG. 22(*b*), in the case of the multi-TID BAR frame, the BAR information field is configured such that a Per TID Info subfield and a block ACK starting sequence control subfield are repeated in one or more TIDs.

The Per TID Info subfield includes a reserved subfield and a TID value subfield. The TID value subfield includes a TID value.

The Block Ack Starting Sequence Control subfield includes the Fragment Number subfield and Starting Sequence Number subfield as described above. The Fragment Number subfield is set to 0. The Starting Sequence Control subfield includes a sequence number of a first MSDU or the A-MSDU in which a corresponding BAR frame is to be transmitted.

FIG. 23 is a view illustrating a block ACK frame in a wireless communication system to which the present invention is applicable.

Referring to FIG. 23, the block ACK (BA) frame includes a frame control field, a duration/ID field, a reception address (RA) field, a transmission address (TA) field, a BA control field, a BA information field, and a frame check sequence (FCS).

The RA field may be set to an address of an STA which has requested a block ACK.

The TA field may be set to an address of an STA which transmits a BA frame.

The BA control field includes a BA Ack policy subfield, a multi-TID subfield, a compressed bitmap subfield, a reserved subfield, and TID information (TID Info) subfield.

Table 11 illustrates a BA control field.

TABLE 11

| Subfield | Bit | Description |
| --- | --- | --- |
| BA Ack Policy | 1 | It is set to 0 when transmitter requests immediate ACK. It is set to 1 when transmitter does not request immediate ACK. |
| Multi-TID Compressed Bitmap | 1 1 | It indicates type of BA frame according to multi-TID subfield and compressed bitmap subfield value 00: Basic BA 01: Compressed BA 10: Reserved value 11: Multi-TID BA |
| Reserved | 9 | |
| TID_Info | 4 | Meaning of TID_Info field is determined according to type of BA frame. In the case of basic BA frame or compressed BA frame, it includes TID requesting BA frame. In the case of multi-TID BA frame, it includes number of TIDs. |

The BA information field includes different information according to a type of the BA frame. This will be described with reference to FIG. 24.

FIG. 24 is a view illustrating a BA information field of the block ACK frame in a wireless communication system to which the present invention is applicable.

FIG. 24(a) illustrates a BA information field of a basic BA frame, FIG. 24(b) illustrates a BA information field of a compressed BA frame, and FIG. 24(c) illustrates a BA information field of a multi-TID BA frame.

Referring to FIG. 24(a), in the case of the basic BA frame, the BA information field includes a Block ACK Starting Sequence Control subfield and a Block ACK Bitmap subfield.

The Block Ack Starting Sequence Control subfield includes a Fragment Number subfield and a Starting Sequence Number subfield as described above.

The Fragment Number subfield is set to 0.

The Starting Sequence Number subfield includes a sequence number of a first MSDU for transmitting a corresponding BA frame and is set to the same value as that of an immediately previously received Basic BAR frame.

The Block Ack Bitmap subfield has a length of 128 octets, and is used to indicate a reception state of up to 64 MSDUs. In the Block Ack Bitmap subfield, value 1 indicates that an MPDU corresponding to a corresponding bit position has been successfully received, and a value 0 indicates that an MPDU corresponding to a corresponding bit position has not been successfully received.

Referring to FIG. 24(b), in the case of the Compressed BA frame, the BA Information field includes a Block Ack Starting Sequence Control subfield and a Block Ack Bitmap subfield.

The Block Ack Starting Sequence Control subfield includes a Fragment Number subfield and a Starting Sequence Number subfield.

The Fragment Number subfield is set to 0.

The Starting Sequence Number subfield includes a sequence number of a first MSDU or A-MSDU for transmitting a corresponding BA frame, and is set to the same value as that of the immediately previously received Basic BAR frame.

The Block Ack Bitmap subfield has a length of 8 octets, and is used to indicate a reception state of up to 64 MSDUs and A-MSDUs. Value 1 of the Block Ack Bitmap subfield indicates that a single MSDU or A-MSDU corresponding to a corresponding bit position has been successfully received, and value 0 indicates that a single MSDU or A-MSDU corresponding to a corresponding bit position has not been successfully received.

Referring to FIG. 24(c), in the case of the multi-TID BA frame, a BA Information field includes a per TID Info subfield, a Block Ack Starting Sequence Control subfield, and a Block Ack Bitmap subfield repeated by one or more TIDs and is configured in order that TIDs are increased.

The Per TID Info subfield includes a reserved subfield and a TID Value subfield. The TID Value subfield includes a TID value.

The Block Ack Starting Sequence Control subfield includes the Fragment Number and Starting Sequence Number subfields as described above. The Fragment Number subfield is set to 0. The Starting Sequence Control subfield includes a sequence number of a first MSDU or A-MSDU in which a corresponding BA frame is to be transmitted.

The Block Ack Bitmap subfield has a length of 8 octets. In the Block Ack Bitmap subfield, value 1 indicates that a single MSDU or A-MSDU corresponding to a corresponding bit position has been successfully received, and value 0 indicates that a single MSDU or A-MSDU corresponding to a corresponding bit position has not been successfully received.

Uplink SU/MU Transmission Method

With a lot of attention of vendors of various fields paid regarding next-generation Wi-Fi and demand for high throughput and enhancement of quality of experience (QoE) performance increased following 802.11ac, a new frame format and numerology for a 802.11ax system as a next-generation WLAN system have been actively discussed.

IEEE 802.11ax as a next-generation WLAN system for supporting higher data rate and processing a higher user load is one of WLAN systems that have been newly proposed in recent years is called high efficiency WLAN (HEW).

The IEEE 802.11ax WLAN system may operate in a 2.4 GHz frequency band and a 5 GHz frequency band similarly to the existing WLA system. Further, the IEEE 802.11ax WLAN system may operate even in a 60 GHz frequency band higher therethan.

In the IEEE 802.11ax system, in order to ensure an average throughput enhancement and outdoor robust transmission over inter-symbol interference, an FFT size four times greater in each bandwidth than that of the existing IEEE 802.11 OFDM system (IEEE 802.11a, 802.11n, 802.11ac, etc.) may be used. This will be described with reference to FIG. 25

Hereinafter, in describing an HE format PPDU of the present invention, above descriptions of a non-HT format PPDU, an HT-mixed format PPDU, an HT-green field format PPDU and/or a VHT format PPDU may be incorporated in the descriptions of an HE format PPDU, unless otherwise mentioned.

FIG. 25 is diagrams illustrating a high efficiency (HE) format PPDU according to an embodiment of the present invention.

FIG. 25(a) illustrates a schematic structure of the HE format PPDU and FIGS. 25(b) to 25(d) illustrates a more detailed structure of the HE format PPDU.

Referring to FIG. 25(a), the HE format PPDU for the HEW may be generally comprised of a legacy part (L-part), an HE part (HE-part), and a data field (HE-data).

The L-part includes an L-STF field, an L-LTF field, and an L-SIG field which are the same as a form maintained in an existing WLAN system. The L-STF field, the L-LTF field, and the L-SIG field may also be termed a legacy preamble.

The HE-part is a part newly defined for 802.11ax standard and may include an HE-STF field, an HE-SIG field, and an HE-LTF field. In FIG. 25(a), the HE-STF field, the HE-SIG field, and the HE-LTF field are sequentially illustrated, but these fields may also be configured in different order. Also, the HE-LTF may be omitted. The HE-SIG field, as well as the HE-SFT field and the HE-LTF field, may be generally called an HE-preamble.

Also, the L-part, HE-SIG field, and the HE-preamble may be generally called a physical (PHY) preamble.

The HE-SIG may include information (e.g., OFDMA, UL MU MIMO, enhanced MCS, etc.) for decoding an HE-data field.

The L-part and the HE-part may have different Fast Fourier Transform (FFT_size (i.e., subcarrier spacing), and may use different cyclic prefix (CP).

The 802.11ax system may use (4×) FFT four times greater than that of a legacy WLAN system. That is, the L-part has a 1× symbol structure and the HE-part (in particular, HE-preamble and HE-data) may be configured to have a 4× symbol structure. Here, the 1×, 2×, and 4×-sized FFT refers to a relative size with respect to a legacy WLAN system (e.g., IEEE 802.11a, 802.11n, 802.11ac, etc.)

For example, when the FFT sizes used in the L-part are 64, 128, 256, and 512 respectively in 20 MHz, 40 MHz, 80 MHz, and 160 MHz, FFT sizes used in the HE-part may be 256, 512, 1024, and 2048, respectively, in 20 MHz, 40 MHz, 80 MHz, and 160 MHz.

In this manner, when the FFT size is increased to be greater than that of the legacy WLAN system, subcarrier frequency spacing is reduced, increasing the number of subcarriers per unit frequency but increasing a length of an OFDM symbol.

That is, the use of greater FFT size refers to narrowed subcarrier spacing and also increased IDFT (Inverse Discrete Fourier Transform)/DFT (Discrete Fourier Transform) period. Here, the IDTF/DTF period may refer to a symbol length excluding a guard interval (GI) in an OFDM symbol.

Thus, when an FFT size four times greater than that of the L-part is used in the HE-part (in particular, HE-preamble and HE-data), subcarrier spacing of the HE-part is ¼ times subcarrier spacing of the L-part and an IDFT/DFT period of the HE-part is four times an IDFT/DFT period of L-part. For example, when subcarrier spacing of the L-part is 312.5 kHz (=20 MHz/64, 40 MHZ/128, 80 MHz/256 and/or 160 MHz/512), subcarrier spacing of the HE-part may be 78.125 kHz (=20 MHz/256, 40 MHZ/512, 80 MHz/1024 and/or 160 MHz/2048). Also, when an IDFT/DFT of the L-part is 3.2 μs (=1/312.5 kHz), an IDFT/DFT period of the HE-part may be 12.8 μs (=1/78.125 kHz).

Here, for the GI, one of 0.8 μs, 1.6 μs, 3.2 μs may be used, and thus, an OFDM symbol length (or symbol interval) of the HE-part including GI may be 13.6 μs, 14.4 μs, 16 μs according to the GI.

Referring to FIG. 25(b), the HE-SIG field may be divided into an HE-SIG A field and an HE-SIG B field.

For example, the HE-part of the HE format PPDU may include an HE-SIG A field having a length of 12.8 μs, an HE-STF field of 1 OFDM symbol, one or more HE-LTF fields, and an HE-SIG B field of 1 OFDM symbol.

Further, in the HE-part, FFT having a size which is four times larger than the existing PPDU may be applied from the HE-STF field except for the HE-SIG A field. That is, FFT having sizes of 256, 512, 1024, and 2048 may be applied from the HE-STF fields of the HE format PPDUs of 20 MHz, 40 MHz, 80 MHz, and 160 MH, respectively.

However, as illustrated in FIG. 25(b), when the HE-SIG is transmitted while being divided into the HE-SIG A field and the HE-SIG B field, the positions of the HE-SIG A field and the HE-SIG B field may be different from those of FIG. 25(b). For example, the HE-SIG B field may be transmitted after the HE-SIG A field, and the HE-STF field and the HE-LTF field may be transmitted after the HE-SIG B field. Similarly even in this case, FFT having a size which is four times larger than the existing PPDU may be applied from the HE-STF field.

Referring to FIG. 25(c), the HE-SIG field may not be divided into the HE-SIG A field and the HE-SIG B field.

For example, the HE-part of the HE format PPDU may include the HE-STF field of 1 OFDM symbol, the HE-SIG field of 1 OFDM symbol and one or more HE-LTF fields.

Similarly thereto, the FFT having a size which is four times larger than the existing PPDU may be applied from the HE-part. That is, the FFT having sizes of 256, 512, 1024, and 2048 may be applied from the HE-STF fields of the HE format PPDUs of 20 MHz, 40 MHz, 80 MHz, and 160 MH, respectively.

Referring to FIG. 25(d), the HE-SIG field may not be divided into the HE-SIG A field and the HE-SIG B field and the HE-LTF field may be omitted.

For example, the HE-part of the HE format PPDU may include the HE-STF field of 1 OFDM symbol and the HE-SIG field of 1 OFDM symbol.

Similarly thereto, the FFT having a size which is four times larger than the existing PPDU may be applied to the HE-part. That is, the FFT having sizes of 256, 512, 1024, and 2048 may be applied from the HE-STF fields of the HE format PPDUs of 20 MHz, 40 MHz, 80 MHz, and 160 MH, respectively.

The HE format PPDU for the WLAN system according to the present invention may be transmitted through at least one 20-MHz channel. For example, the HE format PPDU may be transmitted in the 40 MHz, 80 MHz, or 160 MHz frequency band through a total of four 20-MHz channel. This will be described in more detail with reference to a drawing given below.

FIG. 26 is a diagram illustrating an HE format PPDU according to an embodiment of the present invention.

In FIG. 26, the PPDU format when 80 MHz is allocated to one STA (or when an OFDMA resource unit is allocated to a plurality of STAs within 80 MHz) or when different streams of 80 MHz are allocated to the plurality of STAs, respectively is illustrated.

Referring to FIG. 26, the L-STF, the L-LTF, and the L-SIG may be transmitted to the OFDM symbol generated based on 64 FFT points (alternatively, 64 subcarriers) in each 20-MHz channel.

The HE-SIG A field may include common control information commonly transmitted to the STAs receiving the PPDU. The HE-SIG A field may be transmitted in one to three OFDM symbols. The HE-SIG A field is duplicated by the unit of 20 MHz and includes the same information. Further, the HE-SIG-A field announces total bandwidth information of the system.

Table 12 is a diagram illustrating information included in the HE-SIG A field.

20-MHz channels (that is, 80-MHz band), the L-STF, L-LTF, L-SIG and HE-SIG A fields may be repeatedly transmitted by the unit of the 20-MHz channel.

When the size of the FFT increases, the legacy STA supporting the existing IEEE 802.11a/g/n/ac may not decode the corresponding HE PPDU. The L-STF, L-LTF and L-SIG fields are transmitted through 64 FFT in the 20-MHz channel so as to be received by the legacy STA so that the legacy STA and the HE STA coexist. For example, the L-SIG field may occupy one OFDM symbol, one OFDM symbol time may be 4 μs, and the GI may be 0.8 μs.

The FFT size for each frequency unit may further increase from the HE-STF (alternatively, HE-SIG A). For example, 256 FFT may be used in the 20-MHz channel, 512 FFT may be used in the 40-MHz channel, and 1024 FFT may be used in the 80-MHz channel. When the FFT size increases, an interval between OFDM subcarriers decreases, and as a result, the number of OFDM subcarriers per frequency increases, but the OFDM symbol time is lengthened. For improvement the efficiency of the system, the length of the GI after the HE-STF may be set to be the same as the length of the GI of the HE-SIG A.

The HE-SIG A field may include information required for the HE STA to decode the HE PPDU. However, the HE-SIG A field may be transmitted in the 20-MHz channel through 64 FFT so as to be received by both the legacy STA and the HE STA. The reason is that the HE STA may receive the

TABLE 12

| Field | The number of bits | Description |
| --- | --- | --- |
| Bandwidth | 2 | Indicates the bandwidth in which the PDDU is transmitted For example, 20 MHz, 40 MHz, 80 MHz, or 160 MHz |
| Group ID | 6 | Indicates the STA or the group of the STAs which will receive the PPDU |
| Stream information | 12 | Indicates the position or the number of the spatial stream for each STA, or indicates the position or the number of the spatial stream for the group of the STAs |
| UL indication | 1 | Indicates whether the PPDU is transmitted toward the AP (uplink) or the STA (downlink) |
| MU indication | 1 | Indicates whether the PPDU is the SU-MIMO PPDU or the MU-MIMO PPDU |
| GI indication | 1 | Indicates whether a short GI or a long GI is used |
| Allocation information | 12 | Indicates a band or channel (subchannel index or subband index) allocated to each STA in a band in which the PPDU is transmitted |
| Transmission power | 12 | Indicates transmission power for each channel or each STA |

The information included in the respective fields may follow the definition of the IEEE 802.11 system. Further, the respective fields correspond to examples of the fields which may be included in the PPDU and are not limited thereto. That is, each field may be substituted with another field or further include an additional field and all fields may not be requisitely included.

The HE-STF is used to enhance performance of AGC estimation in MIMO transmission.

The HE-SIG B field may include user-specific information required for each STA to receive data (for example, PSDU) thereof. The HE-SIG B field may be transmitted in one or two OFDM symbols. For example, the HE-SIG B field may include a modulation and coding scheme (MCS) of the corresponding PSDU and information on the length of the PSDU.

The L-STF, L-LTF, L-SIG and HE-SIG A fields may be repeatedly transmitted by the unit of the 20-MHz channel. For example, when the PPDU is transmitted through four existing HT/VHT format PPDU as well as the HE format PPDU, and the legacy STA and the HE STA need to distinguish the HT/VHT format PPDU and the HE format PPDU.

FIG. 27 is a diagram illustrating an HE format PPDU according to an embodiment of the present invention.

In FIG. 27, a case in which 20-MHz channels are allocated to different STAs (for example, STA 1, STA 2, STA 3, and STA 4), respectively is assumed.

Referring to FIG. 27, the FFT size per frequency may further increase from the HE-STF (alternatively, HE-SIG B). For example, 256 FFT may be used in the 20-MHz channel from the HE-STF (alternatively, HE-SIG B), 512 FFT may be used in the 40-MHz channel, and 1024 FFT may be used in the 80-MHz channel.

Since the information transmitted in each field included in the PPDU is the same as the example of FIG. 26, description of the information will be hereinafter omitted.

The HE-SIG B field may include information specific to each STA, but be encoded throughout all bands (that is, indicated in the HE-SIG A field). That is, the HE-SIG B field includes information on all STAs and all STAs receive the HE-SIG B field.

The HE-SIG B field may announce frequency bandwidth information allocated for each STA and/or stream information in the corresponding frequency band. For example, in FIG. 27, in the HE-SIG B, 20 MHz may be allocated to STA 1, the next 20 MHz may be allocated to STA 2, the next 20 MHz may be allocated to STA 3, and the next 20 MHz may be allocated to STA 4. Further, 40 MHz may be allocated to STA 1 and STA 2 and the next 40 MHz may be allocated to STA 3 and STA 4. In this case, different streams may be allocated to STA 1 and STA 2 and different streams may be allocated to STA 3 and STA 4.

Further, the HE-SIG C field is defined to add the HE-SIG C field to the example of FIG. 27. In this case, in the HE-SIG B field, information on all STAs may be transmitted throughout all bands and control information specific to each STA may be transmitted by the unit of 20 MHz through the HE-SIG C field.

Further, unlike the examples of FIGS. 26 and 27, the HE-SIG B field may not be transmitted through all bands but transmitted by the unit of 20 MHz similarly to the HE-SIG A field. This will be described in detail with reference to the following drawings.

FIG. 28 is a diagram illustrating an HE format PPDU according to an embodiment of the present invention.

In FIG. 28, the case in which 20-MHz channels are allocated to different STAs (for example, STA 1, STA 2, STA 3, and STA 4), respectively is assumed.

Referring to FIG. 28, the HE-SIG-B field is transmitted in units of 20 MHz, the same as that of the HE-SIG-A field, rather than being transmitted in the entire band. Here, however, the HE-SIG-B is encoded and transmitted in units of 20 MHz different from that of the HE-SIG-A field, but may not be duplicated and transmitted in units of 20 MHz.

In this case, the FFT size per frequency may further increase from the HE-STF (alternatively, HE-SIG B). For example, 256 FFT may be used in the 20-MHz channel from the HE-STF (alternatively, HE-SIG B), 512 FFT may be used in the 40-MHz channel, and 1024 FFT may be used in the 80-MHz channel.

Since the information transmitted in each field included in the PPDU is the same as the example of FIG. 26, description of the information will be hereinafter omitted.

The HE-SIG A field is transmitted while being duplicated by the unit of 20 MHz.

The HE-SIG B field may announce the frequency bandwidth information allocated for each STA and/or the stream information in the corresponding frequency band. Since the HE-SIG B field includes the information on each STA, the information on each STA may be included for each HE-SIG B field of the unit of 20 MHz. In this case, in the example of FIG. 28, the case in which 20 MHz is allocated for each STA is exemplified, but for example, when 40 MHz is allocated to the STA, the HE-SIG B field may be duplicated and transmitted by the unit of 20 MHz.

When a partial bandwidth having a low interference level from an neighboring BSS is allocated to the STA in an environment in which different bandwidths are supported for each BSS, it may be more preferable not to transmit the HE-SIG B field throughout all bands as described above.

In FIGS. 26 to 28, the data field as a payload may include a Service field, a scrambled PSDU, tail bits, and padding bits.

Meanwhile, the HE format PPDU as illustrated in FIGS. 26 to 28 may be distinguished through an RL-SIG (Repeated L-SIG) field as a repetitive symbol of the L-SIG field. The RL-SIG field may be inserted before the HE-SIG-A field, and each STA may identify a format of a received PPDU as an HE format by using the RL-SIG field.

FIG. 29 is a view illustrating an HE format PPDU of an 20 MHz band according to an embodiment of the present invention.

Referring to FIG. 29, in the 20 MHz HE format PPDU structure, the L-part (L-STF, L-LTF, and L-SIG fields), and the HE-SIG1 (e.g., the HE-SIG-A) are transmitted in the same manner as those of the legacy structure.

As illustrated in FIG. 29(a), FFT (e.g., 256 FFT) may be used, starting from HE-STF.

The HE-LTF may be transmitted before the HE-SIG2 (for example, HE-SIG-B), but only the HE-LTF for the first stream may be transmitted before the HE-SIG2 and the remaining HE-LTF may be transmitted after the HE-.

Also, as illustrated in FIG. 29(b), when the HE-SIG2 (e.g., HE-SIG-B) comes before the HE-STF and the HE-LTF, the HE-SIG2 may use 64 FFT and different FFT (e.g., 256 FFT) may be used, starting from the HE-STF. Here, the HE-SIG2 may be transmitted in the same manner (64 FFT) as that of the legacy structure, and the FFT size may be the same as that of the legacy structure and the number of used tones may be different from each other. Also, as illustrated in FIG. 29(a), different FFT (e.g., 256 FFT) may be used, starting from HE-SIG2.

FIG. 30 is a view illustrating an HE format PPDU of 40 MHz band according to an embodiment of the present invention.

Referring to FIG. 30, the HE format PPDU structure higher than 20 MHz (e.g., 40, 80, 160 MHz, etc.) is based on the structure of 20 MHz described above and the L-part (-STF, L-LTF, and L-SIG fields) and the HE-SIG1 field (e.g., HE-SIG-A field) are duplicated in units of 20 MHz.

As illustrated in FIG. 30(a), starting from HE-STF, information is included across the entire band. Also, starting from the HE-STF, different FFT (e.g., 512 FFT) may be used.

As illustrated in FIG. 30(b), starting from the HE-SIG2 (e.g., the HE-SIG-B field), information is included across the entire band. However, the HE-SIG2 may be transmitted by the number of bands (in case of FIG. 30, 128 FFT) of 64 FFT×20 MHz unit like the existing structure and a different FFT (e.g., 512 FFT) may be used, starting from the HE-STF. Also, the HE-SIG2 may also be duplicated and transmitted in units of 20 MHz using the existing FFT or using an extended FFT (e.g., 512 FFT), starting from the HE-STF.

A scheme in which an AP operated in a WLAN system transmits data to a plurality of STAs in the same time resource may be referred to as a downlink multi-user (DL MU) transmission. Conversely, a scheme in which a plurality of STAs operated in the WLAN system transmit data to an AP in the same time resource may be referred to as UL MU transmission.

Such DL MU transmission or UL MU transmission may be multiplexed in a frequency domain or a spatial domain.

When the DL MU transmission or UL MU transmission is multiplexed in the frequency domain, different frequency resources (e.g., subcarrier or tone) may be allocated as DL or UL resource to each of the plurality of STAs based on orthogonal frequency division multiplexing (OFDMA). Such a transmission scheme through different frequency resources in the same time resource may be termed a "DL/UL OFDMA transmission".

When the DL MU transmission or UL MU transmission is multiplexed in the spatial domain, different spatial streams may be allocated as DL or UL resource to each of the plurality of STAs. Such a transmission scheme through the different spatial streams in the same time resource may be termed a "DL/UL MU MIMO".

Hereinafter, a MU UL transmission method in a WLAN system will be described.

At present, UL MU transmission may not be supported due to the following constraints in the WLAN system.

At present, in the WLAN system, synchronization with a transmission timing of the uplink data transmitted from the plurality of STAs is not supported. For example, when the case where the plurality of STAs transmits the uplink data through the same time resource in the existing WLAN system is assumed, the plurality of respective STAs may not know the transmission timing of the uplink data of another STA in the WLAN system at present. Accordingly, it is difficult for the AP to receive the uplink data on the same time resource from the plurality of respective STAs.

Further, frequency resources used for transmitting the uplink data may overlap with each other by the plurality of STAs in the WLAN system at present. For example, when oscillators of the plurality of respective STAs are different from each other, frequency offsets may be expressed to be different from each other. When the plurality of respective STAs in which the frequency offsets are different simultaneously performs the uplink transmission through different frequency resources, some of frequency areas used by the plurality of respective STAs may overlap with each other.

Further, in the existing WLAN system, power control for the plurality of respective STAs is not performed in the existing WLAN system. The AP may receive signals having different powers from the plurality of respective STAs dependently to distance and channel environments between each of the plurality of STAs and the AP. In this case, it may relatively more difficult for the AP to detect a signal which reaches with weak power than a signal which reaches with strong power.

Accordingly, the present invention proposes a UL MU transmission method in a WLAN system.

FIG. 31 is a diagram illustrating an uplink multi-user transmission procedure according to an embodiment of the present invention.

Referring to FIG. 31, the AP indicates preparing for the UL MU transmission to the STAs which participate in the UL MU transmission, receives a UL MU data frame from the corresponding STAs, and transmits the ACK frame (Block-Ack (BA) frame) in response to the UL MU data frame.

First, the AP transmits a UL MU trigger frame 3110 to indicate preparing for the UL MU transmission to the STAs that will transmit the UL MU data. Herein, the UL MU scheduling frame may also be called a term such as 'UL MU scheduling frame'.

Herein, the UL MU trigger frame 3110 may include control information including STA identifier (ID)/address information, resource allocation information to be used by each STA, duration information, and the like.

The STA ID/address information means information on an identifier or address for specifying each STA that transmits the uplink data.

The resource allocation information means information on an uplink transmission resource (for example, frequency/subcarrier information allocated to each STA in the case of the UL OFDMA transmission and a stream index allocated to each STA in the case of the UL MU MIMO transmission) allocated for each STA.

The duration information means information for determining a time resource for transmitting the uplink data frame transmitted by the plurality of respective STAs.

For example, the duration information may include interval information of a transmit opportunity (TXOP) allocated for uplink transmission of each STA, or information (for example, a bit or symbol) on the length of the uplink frame.

Further, the UL MU trigger frame 3110 may further include control information, including MCS information, coding information, and the like to be used at the time of transmitting the UL MU data frame for each STA.

The control information may be transmitted in the HE-part (for example, the HE-SIG A field or HE-SIG B field) of the PPDU transferring the trigger frame 3110 or a control field (for example, the frame control field of the MAC frame, and the like) of the UL MU scheduling frame 2510.

The PPDU transferring the UL MU trigger frame 3110 has a structure which starts with the L-part (for example, the L-STF field, the L-LTF field, the L-SIG field, and the like). As a result, the legacy STAs may perform network allocation vector (NAV) setting through L-SIG protection from the L-SIG field. For example, the legacy STAs may calculate a duration (hereinafter, 'L-SIG protection duration') for the NAV setting based on data length and data rate information in the L-SIG In addition, the legacy STAs may determine that there is no data transmitted thereto during the calculated L-SIG protection duration.

For example, the L-SIG protection duration may be determined as the sum of an MAC duration field value of the UL MU trigger frame 3110 and a residual duration after the L-SIG field in the PPDU transferring the UL MU trigger frame 3110. As a result, the L-SIG protection duration may be set to a value up to a duration in which an ACK frame 3130 (or BA frame) transmitted to each STA is transmitted according to the MAC duration value of the UL MU trigger frame 3110.

Hereinafter, the resource allocation method for UL MU transmission to each STA will be described in more detail. For easy description, the field including the control information is distinguished and described, but the present invention is not limited thereto.

A first field may distinguish and indicate the UL OFDMA transmission and the UL MU MIMO transmission. For example, in the case of '0', the first field may indicate the UL MU OFDMA transmission and in the case of '1', the first field may indicate the UL MU MIMO transmission. The size of the first field may be configured by 1 bit.

A second field (for example, STA ID/address field) announces STA IDs or STA addresses that will participate in the UL MU transmission. The size of the second field may be configured by the number of bits for announcing the STA ID×the number of STAs which will participate in UL MU. For example, when the second field is configured by 12 bits, the second field may indicate the ID/address of each STA for each 4 bit.

A third field (for example, resource allocation field) indicates a resource area allocated to each STA for the UL MU transmission. In this case, the resource area allocated to each STA may be sequentially indicated to each STA according to the order of the second field.

When the first field value is '0', the third field value represents frequency information (for example, a frequency index, a subcarrier index, and the like) for the UL MU transmission in the order of the STA ID/address included in the second field and when the first field value is '1', the third field value represents MIMO information (for example, a stream index, and the like) for the UL MU transmission in the order of the STA ID/address included in the second field.

In this case, since multiple indexes (that is, the frequency/subcarrier index or stream index) may be known to one STA, the size of the third field may be configured by a plurality of bits (alternatively, may be configured in a bitmap format)× the number of STAs which will participate in the UL MU transmission.

For example, it is assumed that the second field is set in the order of 'STA 1' and 'STA 2' and the third field is set in the order of '2' and '2'.

In this case, when the first field is '1', the frequency resource may be allocated to STA 1 from a higher (alternatively, lower) frequency domain the next frequency resource may be sequentially allocated to STA 2. As one example, when 20 MHz-unit OFDMA is supported in the 80 MHz band, STA may use a higher (alternatively, lower) 40 MHz band and STA 2 may use the next 40 MHz band.

On the contrary, when the first field is '1', a higher (alternatively, lower) may be allocated to STA 1 and the next stream may be sequentially allocated to STA 2. In this case, a beamforming scheme depending on each stream may be predesignated or more detailed information on the beamforming scheme depending on the stream may be included in the third field or a fourth field.

Each STA transmits UL MU data frames 3121, 3122, and 3123 to the AP based on the UL MU trigger frame 3110 transmitted by the AP. Herein, each STA may receive the UL MU trigger frame 3110 and thereafter, transmit the UL MU data frames 3121, 3122, and 3123 to the AP after the SIFS.

Each STA may determine a specific frequency resource for the UL OFDMA transmission and the spatial stream for the UL MU MIMO transmission based on the resource allocation information of the UL MU trigger frame 3110.

In detail, in the case of the UL OFDMA transmission, the respective STAs may transmit the uplink data frame on the same time resource through different frequency resources.

Herein, respective STA 1 to STA 3 may be allocated with different frequency resources for transmitting the uplink data frame based on the STA ID/address information and the resource allocation information included in the UL MU trigger frame 3110. For example, the STA ID/address information may sequentially indicate STA 1 to STA 3 and the resource allocation information may sequentially indicate frequency resource 1, frequency resource 2, and frequency resource 3. In this case, STA 1 to STA 3 sequentially indicated based on the STA ID/address information may be allocated with frequency resource 1, frequency resource 2, and frequency resource 3 sequentially indicated based on the resource allocation information, respectively. That is, STA 1, STA 2, and STA 3 may transmit the uplink data frames 3121, 3122, and 3123 to the AP through frequency 1, frequency 2, and frequency 3, respectively.

Further, in the case of the UL MU MIMO transmission, the respective STAs may transmit the uplink data frame on the same time resource through one or more different streams among the plurality of spatial streams.

Herein, respective STA 1 to STA 3 may be allocated with the spatial streams for transmitting the uplink data frame based on the STA ID/address information and the resource allocation information included in the UL MU trigger frame 3110. For example, the STA ID/address information may sequentially indicate STA 1 to STA 3 and the resource allocation information may sequentially indicate spatial stream 1, spatial stream 2, and spatial stream 3. In this case, STA 1 to STA 3 sequentially indicated based on the STA ID/address information may be allocated with spatial stream 1, spatial stream 2, and spatial stream 3 sequentially indicated based on the resource allocation information, respectively. That is, STA 1, STA 2, and STA 3 may transmit the uplink data frames 3121, 3122, and 3123 to the AP through spatial stream 1, spatial stream 2, and spatial stream 3, respectively.

A transmission duration (alternatively, a transmission end time) of the uplink data frames 3121, 3122, and 3123 transmitted by each STA may be determined by the MAC duration information included in the UL MU trigger frame 3110, alternatively, the UL MU trigger frame 3110 may separately indicate the length of the UL MU PPDU.

Each STA may synchronize the transmission end time of the uplink data frames 3121, 3122, and 3123 (alternatively, the uplink PPDU transferring the uplink data frames) through bit padding or fragmentation based on the length of the UL MU PPDU or the MAC duration value indicated in the UL MU trigger frame 3110.

The PPDU transferring the uplink data frames 3121, 3122, and 3123 may be configured even in a new structure without the L-part.

Further, in the case of the UL MU MIMO transmission or UL OFDMA transmission of a subband type less than 20 MHz, the L-part of the PPDU transferring the uplink data frames 3121, 3122, and 3123 may be transmitted in an single frequency network (SFN) scheme (that is, all STAs simultaneously transmit the same L-part configuration and content). On the contrary, in the case of the UL MU OFDMA transmission of a subband type equal to or more than 20 MHz, the L-part of the PPDU transferring the uplink data frames 3121, 3122, and 3123 may be transmitted by the unit of 20 MHz in the band to which each STA is allocated.

The MAC duration value in the UL MU trigger frame 3110 may be set to a value up to a duration in which the ACK frame 3130 is transmitted. Accordingly, the legacy STA may perform the NAV setting up to the ACK frame 3130 through the MAC duration value of the UL MU trigger frame 3110.

When the uplink data frame may be sufficiently configured with the information of the UL MU trigger frame 3110, the HE-SIG field (that is, an area in which control information for a configuration scheme of the data frame) in the PPDU transferring the UL MU trigger frame 3110 may not also be required. For example, the HE-SIG A field and/or the HE-SIG B field may not be transmitted. Further, the HE-SIG A field and the HE-SIG C field may be transmitted and the HE-SIG B field may not be transmitted.

The AP may transmit the ACK frame 3130 (or BA frame) in response to the uplink data frames 3121, 3122, and 3123 received from each STA. Herein, the AP may receive the uplink data frames 3121, 3122, and 3123 from each STA and transmit the ACK frame 3130 to each STA after the SIFS.

When the existing structure of the ACK frame is similarly used, AIDs (alternatively, partial AID) of the STAs which participate in the UL MU transmission may be configured to be included in the RA field having a size of 6 octets.

Alternatively, when the ACK frame having a new structure is configured, the ACK frame may be configured in a form for the DL SU transmission or DL MU transmission. That is, in the case of the DL SU transmission, ACK information for STAs participating in the UL MU transmission can be transmitted in one frame by encoding at a time, and in the case of the DL MU transmission, the ACK frame 3130 may be transmitted to each STA in the scheme of an OFDMA or the like.

The AP may transmit only the ACK frame 3130 for the UL MU data frame which is successfully received to the corresponding STA. Further, the AP may announce whether the UL MU data frame is successfully received as ACK or NACK through the ACK frame 3130. When the ACK frame 3130 includes NACK information, the ACK frame 3130 may include even a reason for the NACK or information (for example, the UL MU scheduling information, and the like) for a subsequent procedure.

Alternatively, the PPDU transferring the ACK frame 3130 may be configured in a new structure without the L-part.

The ACK frame 3130 may include the STA ID or address information, but when the order of the STAs indicated by the UL MU trigger frame 3110 is similarly applied, the STA ID or address information may be omitted.

Further, a frame for next UL MU scheduling or a control frame including correction information for the next UL MU transmission, and the like may be included in the TXOP by extending the TXOP (that is, the L-SIG protection duration) of the ACK frame 3130.

Meanwhile, an adjustment process such as synchronizing the STAs, or the like may be added for the UL MU transmission in the procedure according to FIG. 31 or earlier.

FIG. 32 is a view illustrating a resource allocation unit in an OFDMA MU transmission scheme according to an embodiment of the present invention.

When the DL/UL OFDMA transmission scheme is used, a plurality of resource units (or subbands) may be defined in units of n number of tones (or subcarriers) in a PPDU bandwidth.

A resource unit (or subband) refers to an allocation unit of frequency resource for DL/UL OFDMA transmission.

Different resource units may be allocated to a plurality of STAs by allocating one or more resource units as DL/UL frequency resources to one STA.

FIG. 32 illustrates a case in which a PPDU bandwidth is 20 MHz.

As illustrated in FIG. 32, various numbers of tones may form resource units.

For example, according to the resource unit configuration scheme as illustrated in FIG. 32(a), a single resource unit may include 26 tones. Also, according to a resource unit configuration scheme as illustrated in FIG. 32(b), one resource unit may include 52 tones or 26 tones. Also, according to a resource unit configuration scheme as illustrated in FIG. 32(c), one resource unit may include 106 tones or 26 tones. Also, according to a resource unit configuration scheme as illustrated in FIG. 32(d), one resource unit may include 242 tones.

When the resource unit is configured as illustrated in FIG. 32(a), up to 9 STAs may be supported for DL/UL OFDMA transmission in a 20 MHz band. Also, when the resource unit is configured as illustrated in FIG. 32(b), up to 5 STAs may be supported for DL/UL OFDMA transmission in the 20 MHz band. Also, when the resource unit is configured as illustrated in FIG. 32(c), up to 3 STAs may be supported for DL/UL OFDMA transmission in the 20 MHz band. Also, when the resource unit is configured as illustrated in FIG. 32(d), the 20 MHz band may be allocated to a single STA.

Any one of the resource unit configuration schemes illustrated in FIGS. 32(a) to 32(d) may be determined based on the number of STAs participating in the DL/UL OFDMA transmission and/or an amount of data transmitted or received by a corresponding STA.

Among the entire resource units determined according to the resource unit configuration schemes as illustrated in FIGS. 32(a) to 32(c), only partial resource units may be used for DL/UL OFDMA transmission. For example, when resource units are configured as illustrated in FIG. 32(a) within 20 MHz, one resource unit is allocated to each STA less than nine STAs, and the other resource units may not be allocated to any STA.

In the case of the DL OFDMA transmission, a data field of the PPDU may be multiplexed and transmitted in a frequency domain in units of resource units allocated to each STA.

Meanwhile, in the case of the UL OFDMA transmission, each STA may construct a data field of a PPDU in units of resource units allocated thereto and simultaneously transmit the PPDU to an AP. Since each STA simultaneously transmit eh PPDU, the AP, a receiver, may recognize that a data field of the PPDU transmitted from each STA is multiplexed and transmitted in the frequency domain.

Also, in a case in which both DL/UL OFDMA and DL/UL MU-MIMO are supported, one resource unit may include a plurality of streams in a spatial domain. Also, one or more streams may be allocated as a DL/UL spatial resource to one STA, so that different streams may be allocated to a plurality of STAs. For example, a resource unit including 106 tones as illustrated in FIG. 32(c) or a resource unit including 242 tones as illustrated in FIG. 32(d) may be configured as a plurality of streams in the spatial domain to support both DL/UL OFDMA and DL/UL MU-MIMO.

In a bandwidth of 40 MHz or higher, a resource unit configuration scheme of the aforementioned 20 MHz band may be applied in the same manner as a 20 MHz band unit. Also, additionally, a smallest resource unit (i.e., a resource unit including 26 tones) may be further set at the center of the bandwidth.

For uplink multi-user transmission in the WiFi system, the uplink multi-user transmission may be performed only when the AP previously secures (alternatively, occupies) and notifies the resource.

A signal (that is, frame) for the AP to previously secures (alternatively, occupies) the resource and notify 'information for uplink multi-user transmission' is a trigger frame.

The STA receives the trigger frame from the AP and thereafter, performs uplink transmission according to information (alternatively, a command) for the uplink multi-user transmission and the AP receives the uplink signal and thereafter, transmits an ACK frame.

This is a general procedure of the uplink multi-user transmission, but a trigger frame or UL MU frame configuration, information for UL MU transmission, a UL MU transmission procedure, and the like may slightly vary depending on a type of a signal transmitted by uplink.

The present invention proposes a UL MU transmission method according to each scheme.

Hereinafter, in describing the present invention, a 'frame' may mean a DL/UL MAC frame (that is, an MAC control frame, a MAC management frame, or a data frame) itself and further, mean a DL/UL (SU/MU) PPDU carrying the DL/UL MAC frame.

Further, hereinafter, in describing the present invention, an HE-SIG1 field may be referred to as an HE-SIG-A field and further, an HE-SIG2 field may be referred to as an HE-SIG-B field.

First, the type of the uplink signal (alternatively, frame) performing the UL MU transmission by the trigger frame may be described below.

1. UL MU Data Frame Transmission

The trigger frame depending on this type triggers the STA to UL MU transmit UL data.

A structure of the trigger frame for supporting the UL MU transmission of this type will be described with reference to drawings given below.

The trigger frame may be configured in a structure of a PHY PPDU and configured in a structure of an MAC frame.

When the trigger frame is configured in a structure of the PHY PPDU, the trigger frame may include the data field including the MAC frame, the trigger frame is referred to as a 'null data packet (NDP) type trigger frame'.

When the trigger frame is configured in a structure of the MAC frame, the trigger frame is referred to as a 'MAC frame type trigger frame'.

First, the 'NDP type trigger frame' structure will be described with reference to the drawings given below.

FIG. 33 is a diagram illustrating a structure of a trigger frame according to an embodiment of the present invention.

The trigger frame carries information (that is, trigger information) (for example, configuration information for UL MU frames) for the UL MU transmission of each STA which participates in the UL MU transmission.

In the case of the NDP type trigger frame, the information for the UL MU transmission may be included in the SIG field.

Referring to FIG. 33(a), L-LTF 3312 may follow L-STF 3311, L-SIG 3313 may follow the L-LTF 3312, HE-SIG1 3314 may follow the L-SIG 3313, and HE-SIG2 3315 may follow the HE-SIG1 3314.

The L-STF 3311, the L-LTF 3312, the L-SIG 3313, and the HE-SIG1 3314 may be duplicated and transmitted by the unit of a 20 MHz channel over an entire PPDU bandwidth.

The HE-SIG2 3315 may be encoded by the unit of the 20 MHz channel within the entire PPDU bandwidth.

The HE-SIG 3314 or the HE-SIG2 3315 includes the information (that is, trigger information) for the UL MU transmission. The information for the UL MU transmission will be described below in detail.

Further, as illustrated in FIG. 33(b), the trigger frame illustrated in the example of FIG. 33(a) may further include HE-STF 3326 and HE-LTF 3327 for time, frequency, and/or power adjustment.

Next, the 'MAC type trigger frame' will be described with reference to the drawings given below.

FIG. 34 is a diagram illustrating a structure of a trigger frame according to an embodiment of the present invention.

Referring to FIG. 34, L-LTF 3402 may follow L-STF 3401, L-SIG 3403 may follow the L-LTF 3402, and a data field (that is, payload) 3404 may follow the L-SIG 3403.

In this case, since the trigger frame is an SU frame format, the trigger frame may be configured in the HT-format PPDU illustrated in the example of FIG. 3. In this case, although not illustrated in FIG. 34, the trigger frame may be configured to further include HT-SIG, HT-STF, and/or HT-LTF. Further, the trigger frame may be configured in the VHT-format PPDU illustrated in the example of FIG. 4. In this case, although not illustrated in FIG. 34, the trigger frame may be configured to further include VHT-SIG-A, VHT-SIG-B, VHT-STF, and/or VHT-LTF. Further, the trigger frame may be configured in the HE-format PPDU illustrated in the examples of FIGS. 25 to 30. In this case, although not illustrated in FIG. 34, the trigger frame may be configured to further include HE-SIG-A, HE-SIG-B, HE-STF, and/or HE-LTF.

The L-STF 3401, the L-LTF 3402, and the L-SIG 3403 may be duplicated and transmitted by the unit of the 20 MHz channel over the entire PPDU bandwidth.

The data field 3404 (that is, the MAC frame in the data field 3404) includes the information (that is, trigger information) for the UL MU transmission. The information for the UL MU transmission will be described below in detail.

When the trigger frame is configured in the structure of the MAC frame, the trigger frame may have the following structure.

The trigger frame may be configured by one MPDU. In this case, the trigger frame may correspond to a type of the MAC control frame or MAC management frame and the trigger frame type may be defined differently therefrom.

Alternatively, the trigger frame may be configured as a frame (that is, HE-control wrapper frame) including an HE-control field in an MAC header including the information (that is, trigger information) for the UL MU transmission. That is, when the HE-control wrapper frame is indicated as a sub type regardless of the type of the MAC frame, the corresponding frame may include the trigger information in the HE-control field of the MAC header. In this case, the HE-control field may be included in the MAC header in a scheme similar to the scheme in which the HT-control field illustrated in FIG. 6 given above is included in the MAC header.

a) The PPDU carrying the trigger frame may include only the trigger frame in the data field.

As described above, when the trigger frame is configured as one MPDU, the PPDU may include only the MPDU corresponding to the trigger frame in the data field. In this case, the information (that is, trigger information) for the UL MU transmission may be included in the MAC header or a MAC frame body in the corresponding MPDU.

Further, even when the trigger frame is configured as the HE-control wrapper frame, the PPDU may include only the HE-control wrapper frame corresponding to the trigger frame in the data field. In this case, the information (that is, trigger information) for the UL MU transmission may be included in the HE-control field of the MAC header of the corresponding HE-control wrapper frame.

b) The PPDU carrying the trigger frame may further include other MAC frame other than the trigger frame in the data field.

1) When some of STAs receiving a DL MAC frame performs the UL MU transmission (that is, when the UL MU transmission STA is a subset of a DL MAC frame receiving STA)

In this case, a transmission resource of the data field of the DL MU PPDU carrying the DL MAC frame may be multiplexed according to a DL OFDMA and/or DL MU-MIMO scheme. As described above, since some of the STAs receiving the DL MAC frame perform the UL MU transmission, the data field of the PPDU for some STAs (that is, STAs performing the UL MU transmission) may further include other DL MAC frame other than the trigger frame.

For example, when some STAs are STA 1 to STA 4 receiving the DL MU frame and the UL MU frame transmission of STA 1 to STA 3 is triggered by the trigger frame, the data fields for STA 1 to STA 3 include the trigger frame together with the DL MAC data frame and the data field for STA 4 includes only the DL MAC data frame.

In more detail, the data field for each STA may include the A-MPDU like the example of FIG. 17. In this case, since the A-MPDU includes a plurality of MPDUs, the MAC frame type may be determined for each MPDU.

When the trigger frame is configured as one MPDU, one or more MPDU among the plurality of MPDUs constituting the A-MPDU is configured as the trigger frame and the remaining MPDUs may be configured as the DL MAC frame. In this case, the information (that is, trigger information) for the UL MU transmission may be included in the MAC header or the MAC frame body in the corresponding MPDU.

Further, when the trigger frame is configured as the HE-control wrapper frame, one or more MPDU (alternatively, all MPDUs) among the plurality of MPDUs constituting the A-MPDU may be configured as the HE-control wrapper frame. In this case, the information (that is, trigger information) for the UL MU transmission may be included in the HE-control field of the MAC header of the corresponding HE-control wrapper frame.

When only some MPDUs among the plurality of MPDUs constituting the A-MPDU include the trigger information, the position of the MPDU including the trigger information may be predesignated. For example, the AP may announce the predesignated MPDU position to the STAs through a beacon frame, and the like.

2) When an STA not receiving the DL MAC frame among the STAs performing the UL MU transmission exists (that is, when the UL MU transmission STA is not the subset of the DL MAC frame receiving STA)

In this case, the trigger frame may be separately transmitted to the STA not receiving the DL MU frame (for example, after the SIFS of the DL MU frame). In this case, the data field of the PPDU carrying the trigger frame may include only the trigger frame (that is, the MAC frame including the information for the UL MU transmission) for the corresponding STA.

Alternatively, a specific data field among the data fields of the DL MU PPDU carrying the DL MAC frame may include the trigger frame. For example, a data field (for example, a predetermined subband) in which a broadcast AID is set to transfer the trigger frame may include the trigger frame. In this case, the AID of the STA to which the UL MU transmission is triggered may be included in the MAC trigger frame. The transmission resource of the data field of the DL MU PPDU carrying the DL MAC frame as described above may be multiplexed according to the DL OFDMA and/or DL MU-MIMO scheme and the trigger frame may be carried by using a specific data field among multiplexed data fields.

When the specific data field among the data fields of the DL MU PPDU carrying the DL MAC frame includes the trigger frame, the position (for example, the position of the subband, a DL MU STA index, and the like) of the data field including the trigger frame may be predesignated. For example, the AP may announce the predesignated data field position to the STAs through the beacon frame, and the like.

Herein, when the data field (for example, subband) for transferring the trigger is predetermined, the corresponding data field may include only the trigger frame (that is, the MAC frame including the information for the UL MU transmission) for the corresponding STA.

As described above, when the trigger frame is configured as one MPDU, the PPDU may include only the MPDU corresponding to the trigger frame in the data field. In this case, the information (that is, trigger information) for the UL MU transmission may be included in the MAC header or the MAC frame body in the corresponding MPDU.

Further, even when the trigger frame is configured as the HE-control wrapper frame, the PPDU may include only the HE-control wrapper frame corresponding to the trigger frame in the data field. In this case, the information (that is, trigger information) for the UL MU transmission may be included in the HE-control field of the MAC header of the corresponding HE-control wrapper frame.

On the contrary, when the trigger frame is transferred in the data field (for example, subband) in which the broadcast AID is set, the corresponding data field may include the A-MPDU like the example of FIG. 17. In this case, since the A-MPDU includes a plurality of MPDUs, the MAC frame type may be determined for each MPDU.

When the trigger frame is configured as one MPDU, one or more MPDU among the plurality of MPDUs constituting the A-MPDU is configured as the trigger frame and the remaining MPDUs may be configured as the DL MAC frame. In this case, the information (that is, trigger information) for the UL MU transmission may be included in the MAC header or the MAC frame body in the corresponding MPDU.

Further, when the trigger frame is configured as the HE-control wrapper frame, one or more MPDU (alternatively, all MPDUs) among the plurality of MPDUs constituting the A-MPDU may be configured as the HE-control wrapper frame. In this case, the information (that is, trigger information) for the UL MU transmission may be included in the HE-control field of the MAC header of the corresponding HE-control wrapper frame.

When only some MPDUs among the plurality of MPDUs constituting the A-MPDU include the trigger information, the position of the MPDU including the trigger information may be predesignated. For example, the AP may announce the predesignated MPDU position to the STAs through the beacon frame, and the like.

Further, when the trigger frame is configured as illustrated in FIG. 33(c), the trigger frame may further include the HE-SIG1 and the HE-SIG2. In this case, the HE-SIG1 may include information shown in Table 12 given above, and the like.

In addition, the HE-SIG2 may include configuration information (for example, MCS, a resource unit (subband) to which the data field is allocated, whether STBC is applied, an FFC coding scheme, and the like) for the data field 3404.

Further, when the HE-SIG2 may include positional information of the data field (for example, subband) including the trigger frame or positional information of the trigger frame when the data field is includes the A-MPDU.

2. DL Channel Status Transmission

The trigger frame according to the type triggers the STA to transmit a DL channel status report (DCR) frame according to a command by the AP.

The structure of the trigger frame for supporting the UL MU transmission of the type will be described with reference to drawings given below.

FIG. 35 is a diagram illustrating a structure of a trigger frame according to an embodiment of the present invention.

Hereinafter, in describing the example of FIG. 35, the same description as the FIGS. 33 and 34 will be omitted.

FIG. 35(*a*) illustrates the structure of the NDP type trigger frame.

The trigger frame for triggering the DCR frame may further include HE-STF and HE-LTF for downlink channel measurement after HE-SIG in comparison with FIG. 33(*a*) given above. That is, HE-STF 3516 may follow HE-SIG2 3515 and HE-LTF 3517 may follow the HE-STF 3516.

Herein, since the HE-LTF 3517 is the HE-LTF 3517 for channel measurement in the case of an 11ax frame structure, the HE-LTF 3517 may be configured as the HE-LTF 3517 for multi-streams. The number of symbols of the HE-LTF 3517 may be determined according to the number of streams which become a DL channel measurement object in the STA.

FIG. 35(*b*) illustrates the structure of the MAC frame type trigger frame.

Herein, since the structure of the trigger frame may be configured similarly to FIG. 34 given above, description of the structure of the trigger frame will be hereinafter omitted.

The null data packet (NDP) including the HE-STF and the HE-LTF for downlink channel measurement may be transmitted after the SIFS after the trigger frame apart from the trigger frame.

Referring to the NDP, L-LTF 3532 may follow L-STF 3531, L-SIG 3533 may follow the L-LTF 3532, HE-STF 3534 may follow the L-SIG 3533, and HE-LTF 3535 may follow the HE-STF 3534.

Herein, since the HE-LTF 3535 is the HE-LTF 3535 for channel measurement in the case of the 11ax frame structure, the HE-LTF 3535 may be configured as the HE-LTF 3535 for the multi-streams. The number of symbols of the HE-LTF 3535 may be determined according to the number of streams which become the DL channel measurement target in the STA.

Meanwhile, in FIG. 35, an example is illustrated, in which the NDP is configured while omitting the HE-SIG1 and/or the HE-SIG2, but the NDP may be configured while further including the HE-SIG1 and/or the HE-SIG2.

3. UL Probe Request Transmission/Random Access Transmission

The trigger frame according the type triggers the STA to transmit the probe request frame so that a user in which a channel status is not good first performs an association. Further, the trigger frame according to the type triggers the STA to randomly access the AP in contention.

In the present specification, the random access as a scheme that allows the STAs to transmit the UL MU frame by randomly selecting the resource may be used by the STAs which will transmit the UL MU frame as necessary among unspecific multiple STAs, such as transmission of the probe request frame and/or transmission of the buffer status report (BSR) frame.

Herein, when the AP intends to receive the BSR frame from specific STAs, the AP transmits the trigger frame including the AIDs of the corresponding STAs to receive the BSR frame from the specific STAs. In this case, the trigger frame that triggers the BSR frame transmission may be distinguished as the trigger frame for a UL control frame to be described below.

On the contrary, when the AP intends to receive the BSR frame from unspecific multiple STAs, the AP transmits the trigger frame (that is, including the broadcast AID) by a predetermined access scheme to receive the BSR frame from the unspecific STAs. In this case, the trigger frame for random access may correspond to the trigger frame that triggers the BSR frame transmission.

When the STAs receives this type of trigger frame, the STAs transmit the probe request frame to the AP by the UL MU transmission in contention and are allocated association ID (AID) by receiving a probe response. Further, the STAs may transmit the random access frame to the AP by the UL MU transmission and receive a response (for example, the trigger frame for UL data frame transmission, and the like) to the random access from the AP.

Since the structure of this type of trigger frame for supporting the UL MU transmission may be configured similarly to the examples of FIGS. 33 and 34, description of the structure will be hereinafter omitted.

However, when the UL probe request frame transmissions or random access frame transmission is triggered, since the AP may not know which STA transmits the UL probe request frame or the random access frame, a broadcast STA ID may be used without designating the receiving STA of the trigger frame as the specific STA.

4. UL Control Frame Transmission

This type of trigger frame triggers control frame transmission in order to receive a report regarding information on the STA required by the AP. For example, this type of trigger frame may trigger the STA to transmit a PS-poll frame or clear-to-send (CTS) frame, a buffer status request/report frame, an ACK frame, and the like.

The STA in a power saving (PS) mode receives the beacon frame (for example, a traffic information map (TIM) of the beacon frame, and the like) to recognize that there is the DL frame which the AP will transmit to the STA. In addition, when the corresponding STA receives this type of trigger frame, the corresponding STA may UL MU-transmit the PS-poll frame to the AP.

As another example, in order to perform the DL MU transmission to a plurality of STAs, the AP may transmit the request to send (RTS) frame to the corresponding STAs in the trigger frame structure. When the STA receives this type of trigger frame from the AP, the corresponding STA may UL MU-transmit the CTS frame to the AP as a response thereto.

In addition, when the STA in which UL data to be transmitted exists receives this pattern of trigger frame, the corresponding STA may UL MU-transmit the BSR frame to the AP in contention.

The buffer status request/report frame is a frame for the STA to announce to the AP the size (that is, the size of the UL data buffered to a buffer of the STA) of data to be transmitted by the UL, an access category (that is, information used for contending a channel for transmitting the UL data with a specific priority) of the UL data, and the like.

Further, the AP may perform the DL MU transmission to the plurality of STAs and each of the STAs receiving the DL MU-transmitted data may UL MU-transmit the ACK frame to the AP as the response thereto.

Since the structure of this type of trigger frame for supporting the UL MU transmission may be configured similarly to the examples of FIGS. 33 and 34, description of the structure will be hereinafter omitted.

Meanwhile, the types of the trigger frame described above are just one example and the present invention is not limited thereto.

For example, the trigger frame that triggers the UL MU transmission of the NDP to the plurality of STAs may also be defined in order to measure the UL channel status in the AP. As another example, the type of the trigger frame may be separately defined for each type (for example, the PS-poll frame, the CTS frame, the BSR frame, and the like) of the aforementioned control frame. Further, one or more types among the aforementioned trigger frame types may be combined and defined. For example, the type of the trigger frame for triggering both the UL MU data frame and the control frame may be de defined.

As described above, since information which needs to be announced in each trigger frame may vary depending on the type of the trigger frame, an indication for the type of each trigger frame needs to be transferred.

The MAC frame type trigger frame may indicate the type in the frame type and/or in a subtype field in the frame control field of the MAC header.

As one example, the header of the MAC frame including the information for the UL MU transmission may include the frame control field like the example of FIG. 6 and the frame control field may be configured to include a Type subfield and a Subtype subfield like the example of FIG. 7 given above.

Table 13 shows a method that indicates the pattern of the trigger frame in the Type subfield and the Subtype subfield when the trigger frame is configured as the MAC frame type.

TABLE 13

| Type value b3 b2 | Type description | Subtype value B7 b6 b5 b4 | Subtype description |
|---|---|---|---|
| 11 | Trigger frame | 0000 | Trigger frame for UL MU data transmission |
| 11 | Trigger frame | 0001 | Trigger frame for UL channel status transmission |
| 11 | Trigger frame | 0010 | Trigger frame for UL probe request/ random access |
| 11 | Trigger frame | 0011 | Trigger frame for UL control frame (This pattern may be more specifically divided according to the control frame type.) |

Referring to Table 13, the Type subfield may indicate whether the frame is the trigger frame. For example, like the description depending on the example of FIG. 7 given above, the existing Type subfield values of '00', '01', and '10' may indicate the management frame, the control frame, and the data frame, respectively and a type value of '11' may indicate the trigger frame.

In addition, the Subtype subfield indicates which type of trigger frame the frame is. For example, when the Subtype subfield value is '0000', '0000' may indicate the trigger frame for UL data transmission, when the Subtype subfield value is '0001', '0001' may indicate the trigger frame for UL channel status transmission, when the Subtype subfield value is '0010', '0010' may indicate the trigger frame for the UL probe request/random access, and when the Subtype subfield value is '0011', '0011' may indicate the trigger frame for the UL control frame.

The types of the trigger frame shown in Table 13 are just one example and the present invention is not limited thereto.

As an example, the pattern of the trigger frame may be further subdivided for each type (for example, the PS-poll frame, the CTS frame, the BSR frame, and the like) of the aforementioned control frame and the Type subfield and/or the Subtype subfield may indicate the types of the respective trigger frames.

Further, one or more trigger frame patterns among the aforementioned trigger frame patterns may be combined and defined. For example, the types of the trigger frames for the trigger frames for UL data transmission and UL channel status transmission, the trigger frames for UL data transmission and UL control frame transmission, and the like, and the like may be defined and the Type subfield and/or the Subtype subfield may indicate the types of the respective trigger frames. As such, the Type subfield and/or the Subtype subfield may be configured in a bitmap form in order to indicate the types of the combined multiple trigger frames.

Further, as described above, when the trigger frame is configured as the HE-control wrapper frame, the Subtype subfield may indicate the type of the trigger frame of the control wrapper frame type.

Alternatively, in the case of the NDP type trigger frame, the HE-SIG needs to include an indication for the trigger frame type.

Table 14 shows a method that indicates the type of the trigger frame in the HE-SIG1 or HE-SIG2 when the trigger frame is configured as the NDP type.

TABLE 14

| Field | Contents |
|---|---|
| NDP indication | 0b0: this frame is no NDP type 0b1: this frame is NDP type |
| Trigger frame type indication | If NDP indication = '0b1', 0b00: indicates the trigger frame for UL MU data transmission 0b01: indicates the trigger frame for UL channel status transmission 0b10: indicates the trigger frame for UL probe request/random access 0b11: indicates the trigger frame for UL control frame If not, reserved |

Referring to Table 14, the NDP indication field may indicate whether the frame is the trigger frame. For example, when the NDP indication field value is '0b0', '0b0' may indicate that the frame is not the NDP type and if the NDP indication field value is '0b1', '0b1' may indicate that the frame is the NDP type.

In addition, when the frame is the NDP type, the trigger frame type indication field indicates which type of trigger frame the frame is. For example, when the trigger frame type indication field value is '0b00', '0b00' may indicate the trigger frame for UL data transmission, when the trigger frame type indication field value is '0b01', '0b01' may indicate the trigger frame for UL channel status transmission, when the trigger frame type indication field value is '0b10', '0b10' may indicate the trigger frame for the UL probe request/random access, and when the trigger frame type indication field value is '0b11', '0b11' may indicate the trigger frame for the UL control frame.

As described above, the types of the trigger frame shown in Table 14 are just one example and the present invention is not limited thereto.

Information (that is, trigger information) for UL MU transmission, which is included in the trigger frame according to each type may be described below.

The trigger information (that is, the information for UL MU transmission) transferred in the trigger frame may be diversified according which UL MU frame type is triggered by the trigger frame.

Herein, the trigged UL MU frame type includes the general UL MU data frame, probe request/random access/ buffer status report (BSR) frame, DL channel status report frame, UL NDP frame, MU PS poll frame, and the like as described above.

As described above, in the case of the MAC frame type trigger frame, the trigger information may be included in the MAC header (for example, the MAC control field or HE-control filed) or payload (MAC frame body) and in the case of the NDP type trigger frame, the trigger information may be included in the HE-SIG.

Hereinafter, for easy description, description of information which needs to be included in the configuration of each frame except for the information for UL MU transmission will be omitted.

For example, in the case of the MAC frame type trigger frame, the data field may include the service field, tail bits, the MAC header, a frame check sequence (FCS), and the like in addition to a PHY preamble of the PPDU.

Further, even in the case of the NDP type trigger frame, the HE-SIG may include a CRC or tail bits for a convolutional code, and the like in addition to the physical preamble.

Table 15 shows information for UL MU transmission included for each trigger frame type.

TABLE 15

| Trigger frame type | Contents (that is, information for UL MU transmission, for example, a UL MU frame configuration scheme, and the like) | Remarks |
|---|---|---|
| Trigger frame for UL MU data transmission | n × AID, (n × MCS, n × STBC), n × N_sts, n × N_subband, UL MU frame Length | Information on the length of a UL data frame is required. The STA configures and transmits data according to the value, (padding when data is insufficient) |
| Trigger frame for DL channel status transmission | n × AID, (n × MCS, n × STBC), n × N_sts, n × N_subband, (UL frame Length) [Information of measured channel: N_sts, N_subband, etc., Reporting scheme of the measured channel: at how many subcarriers reporting is performed, and the like] | Positional information (may include contents regarding which frequency domain of some streams will be measured and transmitted in the HE-LTF) of a channel to be measured and a reporting method in addition to the configuration information of the UL frame When the MCS, the measured channel, the reporting method, and the like are determined, the length of the UL frame may be estimated, and as a result, the length of the UL frame may be omitted. |
| Trigger frame for UL probe request/random access | (AID), (MCS, STBC, N_subband) | The AID may be determined as the broadcast type (that is, broadcast ID) or omitted and the MCS, STBC, N_subband, and the like may be omitted. The MCS and the STBC may be fixed to MCS0, STBC on, and the like. When the type of the trigger frame is included in the HE-SIG1, the HE-SIG2 may be omitted. |
| Trigger frame for UL control frame | n × AID, (n × MCS, n × STBC,) n × N_sts, n × N_subband, (control type and the resulting required contents) | This type of trigger frame may be transmitted by broadcast, multicast, or unicast. When the subtype of the trigger frame is not distinguished for each UL control frame, the control type may be included in the contents field for distinguishing the UL control frame. For example, when the control type is 'BSR', the STA may transmit the UL frame performing the buffer status report in a determined area. |

( ): A part expressed by parentheses may be determined by the AP and transmitted in the trigger frame and the STA may determine the part and the UL frame may transmit the part.

In Table 15, n represents the number of multi-users which will transmit the UL frame.

When the AID indicates one example of STA ID, Group ID (GID), Partial AID (PAID), and the like may also be used.

The MCS represents an MCS level index and the STBC indicates whether the UL frame is transmitted to the STBC (that is, indicates whether the STBC is applied).

N_sts means spatial resource allocation (indication) information for UL MU transmission. That is, N_sts represents information on the positions and the number of streams to be used at the time of UL MU-MIMO transmission.

Herein, N_sts may sequentially indicate the streams allocated for each STA with bit value(s) indicating one stream index. For example, when the order of the STA 1, the STA 2, and the STA 3 is designated, the number of streams of the STA 1 is indicated as 2, the number of streams of the STA 2 is indicated as 4, the number of streams of the STA 3 is indicated as 2, and the stream indexes are sequentially indicated like '000', '001', '010', '011', '100', '101', '110', and '111', stream indexes 0 and 1 (that is, '000' and '001') are allocated to the STA 1, stream indexes 2 to 5 (that is, '010', '011', '100', and '101') are allocated to the STA 2, and stream indexes 6 and 7 (that is, '110' and '111') are allocated to the STA 3.

Further, N_sts may divide the streams by the unit of bits (that is, unit in which '1' or '0' is consecutive) sequentially consecutive from the most significant bit in the bit string and indicate the streams for each STA according to the position of the unit of the consecutive bits. For example, when the order of the STA 1 the STA 2, and the STA 3 is designated and '11000011' is indicated, stream indexes 0 and 1 (positions of bits having a value of '1' consecutive from the most significant bit in '11000011') are allocated to the STA 1, stream indexes 2 to 5 (positions of bits having a value of '1' consecutive after the consecutive '1' value) are allocated to the STA 2, and stream indexes 6 and 7 (positions of bits having the value of '1' consecutive after the consecutive '0' values) are allocated to the STA 3.

Further, N_sts may sequentially indicate the streams allocated for each STA by the bitmap. For example, when the order of the STA 1 the STA 2, and the STA 3 is designated and '11000000', '00111100', and '00000011' are indicated, stream indexes 0 and 1 (that is, '11000000') are allocated to the STA 1, stream indexes 2 to 5 (that is, '00111100') are allocated to the STA 2, and stream indexes 6 and 7 (that is, '00000011') are allocated to the STA 3.

N_subband means frequency resource allocation (indication) information for UL MU transmission. That is, N_subband represents position and area information of a frequency resource (that is, subband (alternatively, resource unit)) to be used for UL OFDMA transmission.

Herein, N_subband may indicate an index granted for each resource unit (alternatively, subband). For example, referring back to FIG. 32 given above, unique indexes are sequentially allocated for each resource unit from a 26-tone resource unit of FIG. 32(*a*) up to a 242-tone resource unit of FIG. 32(*d*) and N_subband may indicate the frequency resource allocated to the STA by indicating the index of the resource unit.

Further, N-subband may indicate a start index and the number of resource units as a minimum resource unit. For example, referring back to FIG. 32 given above, the unique indexes may be sequentially allocated for each 26-tone resource unit of FIG. 32(*a*), which is the minimum resource unit. That is, indexes 1 to 9 may be allocated to the resource units of FIG. 32(*a*) from the left side. In addition, N-subband may indicate the frequency resource by methods including (start index: 1 and the number of resource units: 1) as one example in the case of the 26-tone resource unit, (start index: 1 and the number of resource units: 2) as one example in the case of the 52-tone resource unit, (start index: 1 and the number of resource units: 4) as one example in the case of a 106-tone resource unit, (start index: 1 and the number of resource units: 9) as one example in the case of a 242-tone resource unit, and the like.

1) The trigger frame for transmitting the UL MU data frame may include the AID and information on the MCS, the STBC, the N_sts, the N_subband, and the UL MU frame length (for example, a UL MU PPDU length or a MAC data frame length) for the UL MU frame for each STA which will perform the UL MU transmission.

Herein, the UL MU frame length is determined as a maximum UL MU frame length with respect to all STAs which participate in the UL MU transmission. As a result, each STA configures and transmits data according to the UL MU frame length value. When the entire UL MU frame length may not be filled with the data, the padding (for example, PHY padding or MAC padding) may be performed.

Further, the trigger frame for UL MU data transmission may not include the MCS and the STBC for the UL MU frame among the information. For example, each STA may determine an MCS level based on the received UL MU frame length and the amount of UL data transmitted thereby. Each STA may transmit the determined MCS and STBC to the AP in the HE-SIG of the UL MU data frame.

2) The trigger frame for transmitting the DL channel status (that is, transmitting the DL channel status report frame) may include the AID and information on the MCS, the STBC, the N_sts, the N_subband, and the UL MU frame length (for example, a UL MU PPDU length or a MAC data frame length) for the UL MU frame for each STA which will transmit the DL channel status.

Further, the trigger frame for transmitting the DL channel status may further include information for measuring a DL channel. The information for the channel measurement may correspond to positional information of a channel to be measured, information on a channel measurement reporting method, and the like.

Herein, the positional information of the channel to be measured indicates a spatial stream and/or frequency region which become the channel measurement objects for each STA. That is, the positional information of the channel to be measured may indicate how many streams need to be measured in the HE-LTF of the trigger frame or of the NDP after the trigger frame for each STA (N_sts for the channel measurement) and which frequency domain (N_subband for the channel measurement (for example, a specific subband (alternatively, resource unit)) needs to be measured in the corresponding stream.

The channel measurement reporting method indicates the unit of the frequency domain for reporting a result of measuring the channel. That is, as one example of the reporting method of the measured channel, it may be indicated the unit of the subcarriers to report the channel status. For example, when the channel status is reported for each 26-tone unit subband (alternatively, resource unit), the STA may measure the channel status in each of 26 tones, average the measured channel status by the unit of 26 tones or report a specific channel measurement value (for example, a worst channel measurement value).

The trigger frame for transmitting the DL channel status may not include the MCS and the STBC for the UL MU frame. For example, each STA may determine an MCS level based on the received UL MU frame length and the amount of UL data transmitted thereby. Each STA may transmit the determined MCS and STBC to the AP in the HE-SIG of the UL MU data frame.

Further, the trigger frame for transmitting the DL channel status may not include may not include the UL MU frame length (for example, the PPDU length or MAC data frame length). When the MCS, the position of the channel to be measured, the reporting method of the channel, and the like are determined, the length of UL frame may be estimated, and as a result, the UL MU frame length may be omitted.

Meanwhile, the trigger frame for transmitting the DL channel status may additionally further include information (for example, sounding sequence information, Nc index information, and the like) included in a VHT NDPA frame (see FIG. 12).

3) The trigger frame for triggering random access frame/ UL probe request frame transmission may include the AID and the MCS, the STBC, and the N_subband for the UL MU frame for each STA which will transmit the UL probe request or the random access.

Further, the trigger frame for the UL probe request/ random access may determine the AID as the broadcast type (that is, the broadcast ID) or omit the AID (for example, the broadcast ID or the broadcast address). That is, when the trigger frame is used for the UL probe request, the UL probe request is triggered with respect to STAs which may not be allocated with the AID because the association procedure has not already been completed. Further, when the trigger frame is used for the random access, the random access is triggered with respect to STAs which do not know which STA will perform the random access.

Herein, when the STA ID is set as the broadcast ID, the STA that receives the STA may identify that the corresponding trigger frame is the trigger frame that triggers the random access transmission or triggers the UL probe request frame transmission.

The trigger frame for the UL probe request/random access may include transmission unit information (for example, a frequency/space resource unit) of the UL probe request frame/random access frame. For example, the transmission unit of the UL probe request frame/random access frame may be indicated as the 26-tone unit. Further, the frequency unit information may be previously fixed or transfer the beacon frame, and the like to the STA in advance.

Further, N_subband may indicate and announce a specific frequency resource (that is, specific subband) which may transmit the UL probe request frame/random access frame. For example, when it is assumed that the subband is configured in the unit of 26 tones in the 20 MHz band, N_subband may indicate subband indexes 1 to 9 or subband indexes 1 to 5 (that is, a partial frequency domain). In this case, the respective STAs may transmit the UL probe request frame/random access frame only in the frequency domain indicated by the trigger frame in contention.

Further, the trigger frame for the UL probe request/random access may further include the UL MU frame length (for example, the PPDU length or MAC data frame length) because each STA may transmit the BSR, and the like during the random access.

Further, the MCS, the STBC, the N_subband, and the like may be omitted in the trigger frame for the UL probe request/random access. For example, the MCS level of the UL probe request frame and/or random access frame may be previously determined as MCS 0, the STBC may be previously determined as 'ON' (that is, the STBC is applied), the N_subband may be previously determined as the 26-tone subband (alternatively, resource unit) or may be set in the terminal through the beacon frame, and the like.

Meanwhile, when the STA transmits the BSR frame to the AP during the random access as described above, the trigger frame that triggers the BSR frame transmission may also include the same information as above.

4) The trigger frame for the UL control frame may include the AID and the MCS, STBC, the N_sts, and the N_subband for the UL MU frame for each STA that will transmit the UL control frame.

Further, the trigger frame for the UL control frame may further include the control type and the resulting required contents.

That is, when the subtype of the trigger frame is not distinguished for each UL control frame, the trigger frame for the UL control frame may include the control type information. In this case, the content field may include the control type information.

For example, when the control type is 'BSR', the STA may transmit the UL frame for the buffer status report in a determined area (that is, a determined stream and a determined subband).

Meanwhile, in addition to the example of Table 15 given above, a BSSID or a partial BSSID (PBSSID) for the STA to distinguish whether the corresponding trigger frame is the trigger frame transmitted from the BSS which belongs thereto or not may be further included in the trigger information. Herein, when a color bit which is used for distinguishing the BSS, but is configured with a shorter length than the BSSID is included in the HE-SIG-A field, the BSS may be sufficiently distinguished only by the PBSSID.

Hereinafter, the UL MU transmission method for each UL MU transmission type (that is, each trigger type) will be described.

In particular, a DL response frame (that is, DL MU Ack/BA frame) to the UL MUL transmission triggered by the trigger frame within the UL MU transmission procedure may also vary depending on the UL MU frame type.

For example, the DL MU Ack/BA frame may be subsequent to the UL MU data frame. Another trigger frame may be followed in order to trigger another BSR frame or UL data frame after the BSR frame.

Accordingly, the UL MU procedure needs to be defined for each trigger type.

In FIGS. 36 to 40, it is described that the trigger frame is the NDP type trigger frame according to the example of FIG. 33 given above, but the MAC frame type trigger frame according to the example of FIG. 34 given above may be used, of course.

Further, in FIGS. 36 to 40, it is assumed that the HE-SIG-B is not transmitted to the UL MU frame, but the HE-SIG-B may be included and transmitted in the UL MU frame, of course.

Further, in FIGS. 36 to 40, an interval between the respective frames is exemplified as the SIFS, but is not limited thereto and the interval may correspond to other fixed specific time other than the SIFS.

In addition, hereinafter, detailed description of the structure of each frame will be omitted.

First, the AP may trigger the UL MU data frame transmission. This will be described with reference to the following drawings.

FIG. 36 is a diagram illustrating a UL MU transmission method according to an embodiment of the present invention.

Referring to FIG. 36, the AP transmits a trigger frame (that is, a UL data trigger frame) 3601 for triggering transmission of the UL data frame.

Each of STAs designated by the UL data trigger frame 3601 transmit a UL data frame 3602 to the AP by a UL OFDMA or UL MU-MIMO scheme after the SIFS.

The UL data frame 3602 may be comprised of the legacy preamble (L-preamble), the HE-SIG-A, the HE-STF/LTF, and the data field including the MAC data frame (constituted by the MPDU or AMPDU).

The AP transmits a MU BA/Ack frame 3603 to the STAs transmitting the UL data frame 3602 as a response to the UL data frame 3602 after the SIFS.

Further, the AP may trigger the BSR or random access (RA) frame transmission. This will be described with reference to the following drawings.

FIG. 37 is a diagram illustrating a UL MU transmission method according to an embodiment of the present invention.

Referring to FIG. 37, the AP transmits a trigger frame (that is, a RA/BSR trigger frame) 3701 for triggering transmission of the RA frame/BSR frame.

The RA/BSR trigger frame 3701 may include a broadcast STA ID. Herein, the broadcast STA ID may be defined as forms including the AID, the GID, the PAID, and the like.

STAs which want to randomly access the AP or want to transmit the BSR among STAs that receive the RA/BSR trigger frame 3701 transmit the RA/BSR frame 3702 to the AP by the UL OFDMA or UL MU-MIMO scheme after the SIFS. That is, the STA transmits the RA/BSR frame to the AP in a random frequency and/or space resource selected thereby.

The RA/BSR frame 3702 may be comprised of the legacy preamble (L-preamble), the HE-SIG-A, the HE-STF/LTF, and the data field including the MAC data frame (constituted by the MPDU or AMPDU).

In this case, since each STA transmits the RA/BSR frame 3702 in the random frequency and/or space resource selected thereby, each STA may collide with other STAs. In this case, the AP may not transmit responses to all of the STAs that transmit the RA/BSR frame 3702 in the collided resource, but when a signal strength for any one STA among the STAs is large, and as a result, a specific RA/BSR frame 3702 is successfully decoded, the response signal may be transmitted to the corresponding STA. Accordingly, the respective STAs transmits the RA/BSR frame 3702 by selecting a random resource and when the respective STAs may not receive the response signal from the AP after the SIFS, the respective STAs may recognize that the STA collide with each other and retransmit the RA/BSR frame 3702.

The AP may transmit the UL data trigger frame 3703 in order to trigger the UL data frame transmission to the STAs that transmit the RA/BSR frame 3702 which is successfully received thereby after the SIFS. In this case, the procedure of FIG. 36 given above may be similarly performed.

Further, the AP may transmit the RA/BSR trigger frame 3703 in order to trigger the RA/BSR frame transmission of other STAs after the SIFS. In this case, the procedure of FIG. 37 may be similarly performed.

In addition, the AP may transmit the MU BA/Ack frame 3703 to the STAs that transmit the RA/BSR frame 3702 which is successfully received thereby as the response to the RA/BSR frame 3702 after the SIFS. In this case, the AP may transmit the MU BA/Ack frame 3703 and transmit the UL data trigger frame 3703 or the RA/BSR trigger frame 3703 after a predetermined time (for example, SIFS).

Further, the AP may trigger the DL channel status report frame transmission. This will be described with reference to the following drawings.

FIG. 38 is a diagram illustrating a UL MU transmission method according to an embodiment of the present invention.

Referring to FIG. 38, the AP transmits a trigger frame (that is, a DL channel status report (DCR)) 3801 for triggering transmission of the DL channel status report frame.

Herein, since the NDP type trigger frame structure according to the example of FIG. 33 given above is assumed with respect to the DCR trigger frame 3801, the DCR trigger frame 3801 may include the HE-STF and the HE-LTF for estimating the DL channel status in the STA.

On the contrary, when the DCR trigger frame 3801 is configured as the MAC frame type trigger frame according to the example of FIG. 34 given above, a DL NDP frame including the HE-STF and the HE-LTF for estimating the DL channel status in the STA may be transmitted after the SIFS after the DCR trigger frame.

Respective STAs designated by the DCR trigger frame 3801 transmit a DCR frame 3802 to the AP by the UL OFDMA or UL MU-MIMO scheme after the SIFS.

The DCR frame 3802 may be comprised of the legacy preamble (L-preamble), the HE-SIG-A, the HE-STF/LTF, and the data field including the MAC data frame (constituted by the MPDU or AMPDU) or the MAC control frame.

The AP may transmit a UL data trigger frame 3803 in order to trigger the UL data frame transmission to the STAs that transmit the DCR frame 3802 after the SIFS. In this case, the procedure of FIG. 36 given above may be similarly performed.

Further, the AP may transmit the DCR trigger frame 3803 in order to trigger the DCR frame transmission of other STAs after the SIFS. In this case, the procedure of FIG. 38 may be similarly performed.

Further, the AP transmits a MU BA/Ack frame 3803 to the STAs transmitting the DCR frame 3802 as the response to the DCR frame 3803 after the SIFS. In this case, the AP may transmit the MU BA/Ack frame 3803 and transmit the UL data trigger frame 3803 or the DCR trigger frame 3803 after a predetermined time (for example, SIFS).

Further, the AP may allow the STA to trigger transmission of the UL NDP in order to measure the UL channel status. This will be described with reference to the following drawings.

FIG. 39 is a diagram illustrating a UL MU transmission method according to an embodiment of the present invention.

Referring to FIG. 39, the AP transmits a trigger frame (that is, an NDP trigger frame) 3901 for triggering transmission of the UL NDP.

Respective STAs designated by the NDP trigger frame 3901 transmit a UL NDP frame 3902 to the AP by the UL OFDMA or UL MU-MIMO scheme after the SIFS.

The UL NDP frame 3902 may be comprised of the legacy preamble (L-preamble), the HE-SIG-A, and the HE-STF/LTF. Herein, the HE-LTF may be configured in an HE-LTF structure for multi-streams in order to estimate a UL channel status in the AP.

The AP may transmit a UL data trigger frame 3903 in order to trigger the UL data frame transmission to the STAs that transmit the UL NDP frame 3902 after the SIFS. In this case, the procedure of FIG. 36 given above may be similarly performed.

Further, the AP may transmit the NDP trigger frame 3903 in order to trigger the UL NDP trigger frame transmission of other STAs after the SIFS. In this case, the procedure of FIG. 38 may be similarly performed.

Further, the AP may transmit a MU BA/Ack frame 3903 to the STAs transmitting the UL NDP frame 3902 as the response to the UL NDP frame 3902. In this case, the AP may transmit the MU BA/Ack frame 3903 and transmit the UL data trigger frame 3903 or the NDP trigger frame 3903 after a predetermined time (for example, SIFS).

That is, the AP may transmit the trigger frame that allows the STA to transmit the NDP frame in order to know an uplink channel status in addition to the trigger frame for reporting the downlink channel status (see FIG. 38 given above). In this case, the trigger frame may announce configuration information (an HE-LTF type, the number of streams, and the like) of the HE-LTF to be transmitted in addition to the AID, the frequency domain information (herein, the frequency domain information is not a value for a data area but transmission frequency domain information of the HE-STF/LTF because the UL NDP frame does not include the data field) to transmit the UL NDP frame, and the like. The STAs transmit the UL NDP frame according to a command given by the trigger frame.

Further, the AP may trigger UL MU PS-poll frame transmission. This will be described with reference to the following drawings.

FIG. 40 is a diagram illustrating a UL MU transmission method according to an embodiment of the present invention.

Referring to FIG. 40, the AP transmits a trigger frame (that is, a MU PS-poll (MPS) trigger frame) 4001 for triggering the UL MU PS-poll frame transmission.

Respective STAs designated by the MPS trigger frame 4001 transmit a UL MU PS-poll frame 4002 to the AP by the UL OFDMA or UL MU-MIMO scheme after the SIFS.

The UL MU PS-poll frame 4002 may be comprised of the legacy preamble (L-preamble), the HE-SIG-A, the HE-STF/LTF, and data field including the MAC data frame (constituted by the MPDU or AMPDU).

The AP may transmit a DL MU data frame 4003 to the STAs transmitting the UL MU PS-poll frame 4002 after the SIFS.

Further, the AP may transmit a MU BA/Ack frame 4003 to the STAs transmitting the UL MU PS-poll frame 4002 as the response to the UL MU PS-poll frame 4002 after the SIFS. In this case, the AP may transmit the MU BA/Ack frame 4003 and transmit the DL MU data frame 4003 after a predetermined time (for example, SIFS).

Hereinafter, the method for triggering the UL probe request frame which is a kind of the random access will be described in more detail.

In the case of IEEE 802.11ax which is being developed at present, OFDMA technology is under active discussion.

When multi-user OFDMA (MU OFDMA) technology is applied in the uplink, the STA may transmit a signal in a bandwidth smaller than 20 MHz which is the existing minimum transmission bandwidth. In this case, since transmission power of the STA is not changed, the power of the STA concentrates on the smaller bandwidth, and as a result, a transmission distance of the signal increases.

However, if the minimum transmission bandwidth is limited to 20 MHz like the related art when the STA transmits the signal by single-user OFDM (SU-OFDM) in the uplink, the transmission distance becomes shorter than the case where the STA transmits the signal by the MU OFDM.

According to a present 802.11 structure, an association process is available only by SU transmission. Therefore, if there is no mobility of the STA, the UL MU-OFDMA is available only after the association process at the short distance by the SU transmission, and as a result, a transmission distance increase effect by the UL MU-OFDMA technology may not be substantially achieved.

The present invention proposes a method for enabling the STA to perform scanning and association even at a distance longer than the transmittable distance in the present SU-OFDM 20 MHz bandwidth in the IEEE 802.11ax.

FIG. 41 illustrates an 802.11 network environment to which the present invention can be applied.

Referring to FIG. 41, since the transmission power of the AP is larger than the transmission power of the STA, even though the AP transmits the signal in a wideband, the wideband transmission distance by the AP is longer than the transmission distance in the 20 MHz bandwidth by the STA.

However, when the bandwidth in which the STA transmits the signal by using the OFDMA technology is smaller than 20 MHz, the transmission distance increases to secure the same transmission distance as the AP. In FIG. 41, the STA 1 may receive the signal from the 802.11ax AP, but is positioned at a distance where the STA 1 may not transmit the signal in the 20 MHz bandwidth. That is, the STA 1 may perform passive scanning, but may not find the 802.11ax AP through active scanning. The reason is that in the present active scanning, the signal needs to be transmitted only in the 20 MHz bandwidth.

However, when the STA 1 transmits the signal in the bandwidth smaller than the 20 MHz bandwidth, the STA 1 may transmit the signal to the AP. In FIG. 41, 5 MHz is arbitrarily illustrated, but all bandwidths (for example, 26-tone unit subband (alternatively, resource unit)) smaller than 20 MHz may be adopted.

Hereinafter, the active scanning process is described based on the 5 MHz band for easy description, but other bandwidths may be similarly adopted.

First, a method in which an 11ax STA may perform scanning at a longer transmission distance is proposed. That is, in FIG. 42, a method in which the STA 1 performs the active scanning in the 5 MHz bandwidth with the AP is illustrated.

FIG. 42 is a diagram illustrating an active scanning process according to an embodiment of the present invention.

Referring to FIG. 42, first, the AP periodically transmits a trigger frame 4211 to designate a probing duration for active scanning.

The probing duration is available up to a time indicated by the trigger frame from a time immediately after the AP transmits the trigger frame.

An STA which intends to receive network information of a corresponding AP or an STA which wants to establish association among STAs that receive the trigger frame 4211 and has not yet been associated with the AP transmits probe request frames 4221 and 4231 in contention.

The AP that successfully receives the probe request frames 4221 and 4231 transmits ACK frames 4212 and 4213 to the STA that transmits the corresponding probe request frames 4212 and 4213 as the response.

After the probing duration ends, the AP transmits a probe response frame 4214 to the STAs that transmit the probe request frames 4221 and 4231 during the probing duration. In this case, the MU-OFDMA or MU-MIMO technique may be used.

The STA that receives the probe response frame 4214 transmits ACK frames 4222 and 4232 as the response.

In FIG. 42, the respective STAs transmit the probe request frame in contention, but the probe request frame may be transmitted at an interval of the SIFS after the trigger frame.

FIG. 43 is a diagram illustrating an active scanning process according to an embodiment of the present invention.

Referring to FIG. 43, first, the AP periodically transmits a trigger frame 4311 for the active scanning.

An STA which intends to receive the network information of the corresponding AP or an STA which wants to establish the association among STAs that receive the trigger frame 4311 and has not yet been associated with the AP transmits a probe request frame 4321 after the SIFS.

The AP that successfully receives the probe request frame 4321 transmits an ACK frame 4312 to the STA that transmits the corresponding probe request frame 4321 as the response after the SIFS.

In addition, another STA which intends to receive the network information of the corresponding AP or another STA which wants to establish the association among STAs that receive the trigger frame 4311 and has not yet been associated with the AP transmits a probe request frame 4331 after the SIFS.

The AP that successfully receives the probe request frame 4331 transmits an ACK frame 4313 to the STA that transmits the corresponding probe request frame 4331 as the response after the SIFS.

As described above, the STAs arbitrarily determine transmission orders thereof and consecutively transmit the probe request frames 4321 and 4331 at the interval of the SIFS according to the transmission orders.

When two or more STAs determine the same order and the probe request frames thus collide with each other, the AP does not transmit the ACK frame, and as a result, the STAs verifies whether the collision occurs.

The AP transmits an association response frame (alternatively, a probe response frame) 4314 to the STAs that transmit the probe request frames 4321 and 4331. In this case, the MU-OFDMA or MU-MIMO technique may be used.

The STA that receives the association response frame (alternatively, the probe response frame) 4314 transmits ACK frames 4322 and 4332 as the response.

FIG. 44 is a diagram illustrating an active scanning process according to an embodiment of the present invention.

In FIG. 44, the same active scanning procedure as FIG. 43 is performed, but a case in which no STA transmits the probe request frame in the corresponding order after the trigger frame is illustrated.

As described above, when no STA transmits the probe request frame in the corresponding order after the trigger frame, the AP transmits a trigger frame 4412 at an interval of PIFS after a previous trigger frame 4411 to maintain a transmission opportunity (TXOP). Since a subsequent process is the same as the process of FIG. 43 given above, the corresponding will be hereinafter omitted.

FIG. 45 is a diagram illustrating an active scanning process according to an embodiment of the present invention.

Referring to FIG. 45, first, the AP periodically transmits a trigger frame 4511 for the active scanning.

An STA which intends to receive the network information of the corresponding AP or an STA which wants to establish the association among STAs that receive the trigger frame 4511 and has not yet been associated with the AP transmits probe request frames 4521 and 4531 by the UL MU transmission scheme after the SIFS after receiving the trigger frame 4511.

In this case, each STA may determine the subband (alternatively, resource unit) in which each STA will transmit the probe request frames 4521 and 4531.

The AP that successfully receives the probe request frames 4521 and 4531 transmits an ACK frame 4512 to the STA that transmits the corresponding probe request frames 4521 and 4531 as the response after the SIFS. In this case the ACK frame 4512 may be transmitted by the MU-OFDMA or MU-MIMO technique.

The AP transmits an association response frame (alternatively, a probe response frame) 4513 to the STAs that transmit the probe request frames 4521 and 4531. In this case, the MU-OFDMA or MU-MIMO technique may be used.

The STA that receives the association response frame (alternatively, the probe response frame) 4513 transmits ACK frames 4522 and 4532 as the response.

Meanwhile, in the active scanning procedure described in the examples of FIGS. 42 to 45 given above, when the number of STAs that transmit the probe request frame is very large, the collision may very frequently occur. In order to distribute the transmission, the AP may designate the STA capable of transmitting the probe request frame through the trigger frame.

For example, the AP may designate a range of an MAC address of the STA. In this case, only when the MAC address of the STA corresponds to one of MAC addresses in which the trigger frame is designated, the STA may transmit the probe request frame. On the contrary, when the MAC address of the STA does not correspond to the MAC address in which the trigger frame is designated, the STA may waits for a next trigger frame or move to another channel.

Alternatively, the AP may announce a random value to transmit the probe request frame through the trigger frame. For example, when the AP announces 15 and 7, the STA may select one random value among 0 to 15 and thereafter, transmit the probe request frame only when the selected random value is 7 or less.

As described above, the STA capable of transmitting the probe request frame through the trigger frame is designated to decrease a collision probability.

The trigger frame illustrated in FIGS. 42 to 45 given above may be configured differently from the structure of the trigger frame described in FIGS. 33 and 34 given above.

Hereinafter, in describing the present invention, for distinguishment from the NDP type trigger frame illustrated in FIG. 33, the trigger frame for the active scanning operation (that is, probe request frame transmission) of the STA illustrated in FIGS. 42 to 45 given above will be referred to as a broadcast trigger frame.

Hereinafter, the present invention proposes the structure of the broadcast trigger frame and contents transferred in the broadcast trigger frame.

The broadcast trigger frame may be continuously transmitted in the bandwidth of 20 MHz. Further, the broadcast trigger frame is used for triggering the random access, the STA ID field for the STA that receives the broadcast trigger frame is not required, and as a result, the HE-SIG2 field (alternatively, HE-SIG-B field) need not be transmitted.

Accordingly, the HE-SIG1 field (alternatively, HE-SIG-A field) may indicate the frame type in order to distinguish the broadcast trigger frame from the general NDP type trigger frame.

Therefore, the following structure of the broadcast trigger frame is proposed.

FIG. 46 is a diagram illustrating the structure of a broadcast trigger frame according to an embodiment of the present invention.

Referring to FIG. 46, in the broadcast trigger frame, L-LTF 4612 may follow L-STF 4611, L-SIG 4613 may follow the L-LTF 4612, and an HE-SIG1 field (alternatively, HE-SIG-A field) 4614 may follow the L-SIG 4613.

Information included in the L-SIG 4613 is described below.

A length field of the L-SIG 4613 indicates the probing duration (see FIG. 42 given above) to set the TXOP.

Alternatively, when the probing duration is more than 5 ms, the HE-SIG1 field 4614 may indicate length information.

Further, the length information may be previously fixed through the beacon frame, and the like or in advance.

The information included in the HE-SIG1 4614 is described below.

1) The HE-SIG1 4614 may include a field for announcing whether the corresponding frame is the broadcast trigger frame or the general NDP type trigger frame.

That is, the HE-SIG1 4614 may include a frame type indication field and a sub type indication field.

The frame type indication field announces whether the corresponding frame is the NDP type trigger frame or the MAC frame type.

In addition, when the corresponding frame is the NDP type trigger frame, the sub type indication field announces whether the corresponding frame is the broadcast trigger frame.

Further, all of the information may be, at once, announced only with the frame type indication. For example, '00' may be defined to indicate the MAC frame type trigger frame, '01' may be defined to indicate the broadcast trigger frame, and '10' may be defined to indicate the general NDP type trigger frame (that is, except for the broadcast trigger frame).

Further, since the trigger frame exists only in the DL, this field may be interpreted as the NDP type frame in the UL frame.

2) The HE-SIG1 4614 may include the length field.

In the case of the NDP type trigger frame, a value (that is, a length value) of the length field may be used for setting the TXOP. That is, the TXOP may be set by the length information of the L-SIG 4613 as described above, but if not, the length information may be included in the HE-SIG1 4614. Alternatively, if the length information is not required in the NDP, the length information may be omitted.

3) The HE-SIG1 4614 may contain information required for the STAs to transmit the probe request frame, and the like.

When the corresponding frame is the broadcast trigger frame in the frame type, the corresponding frame may be interpreted or the information required for the STAs to send the probe request frame, and the like may be additionally sent. For example, the HE-SIG1 4614 may include a transmission period of the broadcast trigger frame or a transmission time of the next broadcast trigger frame.

Alternatively, the HE-SIG1 4614 may include resource allocation information. For example, 00 may be set as four 5 MHz channels, 01 may be set as two 10 MHz channels, 10 may be set as one 20 MHz channel, and 11 may be set as reserved. The STA transmits the probe request frame by selecting the transmission band according to the resource allocation information.

4) Further, besides, the HE-SIG1 4614 may include common SIG1 information including a color bit, a CRC, a padding bit, and the like. However, in the case of the broadcast trigger frame, the bandwidth information may not be included.

Meanwhile, in FIG. 46, it is described that the trigger frame for triggering the probe request frame transmission is the broadcast trigger frame as an example, but the structure of FIG. 33 or 34 described above may be used as the structure of the trigger frame for triggering the probe request frame transmission. In this case, the information described in FIG. 46 given above may be included in the trigger frame having the structure of FIG. 33 or 34.

General Apparatus to which the Present Invention May be Applied

FIG. 47 is a block diagram exemplifying a wireless apparatus according to an embodiment of the present invention.

Referring to FIG. 47, an apparatus 4710 according to the present invention may include a processor 4711, a memory 4712, and a radio frequency (RF) unit 4713. The apparatus 4710 may be an AP or a non-AP STA for implementing the embodiments of the present invention.

The RF unit 4713 is connected to the processor 4711 to transmit/receive a wireless signal. For example, the RF unit 4713 may implement the physical layer according to the IEEE 802.11 system.

The processor 4711 is connected to the RF unit 4713 to implement the physical layer and/or MAC layer according to the IEEE 802.11 system. The processor 4711 may be configured to perform the operations according to the various embodiments of the present invention according to FIGS. 1 to 47 above. In addition, a module that implements the operations of the AP and/or the STA according to the various embodiments of the present invention according to FIGS. 1 to 46 above may be stored in the memory 4712 and executed by the processor 4711.

The memory 4712 is connected to the processor 4711 and stores various pieces of information for driving the processor 4711. The memory 4712 may be included in the processor 4711, or installed exterior to the processor 4711 and connected to the processor 4711 with a known means.

Further, the apparatus 4710 may have a single antenna or multiple antennas.

Such a detailed configuration of the apparatus 4710 may be implemented such that the features described in various embodiments of the present invention described above are independently applied or two or more embodiments are simultaneously applied.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

In the wireless communication system, the example in which the uplink single-user or multi-user transmission method is applied to the IEEE 802.11 system is primarily described, but the uplink multi-user transmission method can be applied to various wireless communication systems in addition to the IEEE 802.11 system.

What is claimed is:

1. A method for performing uplink (UL) multi-user (MU) transmission by a station (STA) in a wireless communication system, the method comprising:
receiving a Medium Access Control (MAC) frame from an access point (AP), the MAC frame comprising a MAC header, a frame body and a Frame Check Sequence (FCS), the MAC header including a field indicating whether a type of the MAC frame is a trigger frame; and
transmitting a UL frame in response to the MAC frame to the AP, when the type of the MAC frame is the trigger frame,
wherein the trigger frame includes information for the UL MU transmission and information indicating a type of the trigger frame,
wherein the type of the trigger frame includes a type for triggering transmission of UL MU data frames or a type for triggering transmission of buffer status report frames, and
wherein the UL frame is a UL MU data frame when the type of the trigger frame includes the type for triggering transmission of UL MU data frames.

2. The method of claim 1, wherein, when type of the trigger frame is for triggering transmission of the UL MU data frames, the trigger frame includes an association identifier (AID) for each of STA performing the UL MU transmission, space resource indication information for a UL MU frame of each STA identified by the AID and frequency resource indication information for the UL MU frame of each STA identified by the AID.

3. The method of claim 2, wherein the trigger frame further includes a modulation and coding scheme (MCS) level index of the UL MU frame of each STA identified by the AID and a coding type of the UL MU frame of each STA identified by the AID.

4. The method of claim 1, wherein, when the type of trigger frame is for triggering transmission of the buffer status report, the trigger frame includes an association identifier (AID) for each of STA performing the UL MU transmission, and the UL frame is a buffer status report frame.

5. The method of claim 1, wherein, when the type of the trigger frame is for triggering transmission of the UL MU data frames, the trigger frame further includes resource information of the UL MU frames.

6. The method of claim 5, wherein the UL MU frame is transmitted through a resource which the STA arbitrarily selects based on the resource information.

7. The method of claim 5, wherein the trigger frame further includes the information indicating whether the modulation and coding scheme (MCS) level index and the space time block coding (STBC) are applied to the UL MU frame, transmittable frequency resource indication information of the UL MU frame, and the length information of the UL MU frame.

8. A method for supporting uplink (UL) multi-user (MU) transmission by an access point (AP) in a wireless communication system, the method comprising:
transmitting a Medium Access Control (MAC) frame to a station (STA), the MAC frame comprising a MAC header, a frame body and a Frame Check Sequence (FCS), the MAC header including a field indicating whether a type of the MAC frame is a trigger frame; and
receiving a UL frame in response to the MAC frame to the AP, when the type of the MAC frame is the trigger frame,
wherein the trigger frame includes information for the UL MU transmission and information indicating a type of the trigger frame,
wherein the type of the trigger frame includes a type for triggering transmission of UL MU data frames or a type for triggering transmission of buffer status report frames, and
wherein the UL frame is a UL MU data frame when the type of the trigger frame includes the type for triggering transmission of UL MU data frames.

9. A station (STA) device for performing uplink (UL) multi-user (MU) transmission in a wireless communication system, the station device comprising:
a radio frequency (RF) unit, including a transceiver, for transmitting and receiving a wireless signal; and
a processor,
wherein the processor is configured to:
receive a Medium Access Control (MAC) frame from an access point (AP), the MAC frame comprising a MAC header, a frame body and a Frame Check Sequence (FCS), the MAC header including a field indicating whether a type of the MAC frame is a trigger frame; and
transmit a UL frame in response to the MAC frame to the AP, when the type of the MAC frame is the trigger frame,
wherein the trigger frame includes information for the UL MU transmission and information indicating a type of the trigger frame,
wherein the type of the trigger frame includes a type for triggering transmission of UL MU data frames or a type for triggering transmission of buffer status report frames, and
wherein the UL frame is a UL MU data frame when the type of the trigger frame includes the type for triggering transmission of UL MU data frames.

10. The station device of claim 9, wherein, when the type of the trigger frame is for triggering transmission of the UL MU data frames, the trigger frame includes an association identifier (AID) for each of STA performing the UL MU transmission, space resource indication information for a UL MU frame of each STA identified by the AID and frequency resource indication information for the UL MU frame of each STA identified by the AID.

11. The station device of claim 10, wherein the trigger frame further includes a modulation and coding scheme (MCS) level index of the UL MU frame of each STA identified by the AID and a coding type of the UL MU frame of each STA identified by the AID.

12. The station device of claim 9, wherein, when the type of trigger frame is for triggering transmission of the buffer status report, the trigger frame includes an association identifier (AID) for each of STA performing the UL MU transmission.

13. The method of claim 8, wherein, when the type of trigger frame is for triggering transmission of the buffer status report, the trigger frame includes an association identifier (AID) for each of STA performing the UL MU transmission.

* * * * *